United States Patent
Tsuzuki

(10) Patent No.: US 12,180,344 B2
(45) Date of Patent: Dec. 31, 2024

(54) CELLULOSE NANOFIBER-CONTAINING AQUEOUS DISPERSION

(71) Applicant: Asahi Kasei Kabushiki Kaisha, Tokyo (JP)

(72) Inventor: Junichi Tsuzuki, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 1010 days.

(21) Appl. No.: 17/049,884

(22) PCT Filed: Apr. 15, 2019

(86) PCT No.: PCT/JP2019/016217
§ 371 (c)(1),
(2) Date: Oct. 22, 2020

(87) PCT Pub. No.: WO2019/208313
PCT Pub. Date: Oct. 31, 2019

(65) Prior Publication Data
US 2021/0246273 A1  Aug. 12, 2021

(30) Foreign Application Priority Data

Apr. 23, 2018 (JP) ................................ 2018-082268
May 18, 2018 (JP) ................................ 2018-096460
Oct. 12, 2018 (JP) ................................ 2018-193575
Nov. 13, 2018 (JP) ................................ 2018-213081

(51) Int. Cl.
| | |
|---|---|
| C08J 5/04 | (2006.01) |
| B82Y 30/00 | (2011.01) |
| B82Y 40/00 | (2011.01) |
| C08J 3/05 | (2006.01) |
| C08K 5/00 | (2006.01) |
| C08K 7/02 | (2006.01) |
| C08L 71/02 | (2006.01) |

(52) U.S. Cl.
CPC ................ *C08J 5/045* (2013.01); *C08J 3/05* (2013.01); *C08K 5/005* (2013.01); *C08K 7/02* (2013.01); *C08L 71/02* (2013.01); *B82Y 30/00* (2013.01); *B82Y 40/00* (2013.01); *C08J 2371/02* (2013.01); *C08J 2401/02* (2013.01); *C08K 2201/011* (2013.01)

(58) Field of Classification Search
CPC . C08J 5/045; C08J 3/05; C08J 2371/02; C08J 2401/02; C08K 5/005; C08K 7/02; C08K 2201/011; C08L 71/02; B82Y 30/00; B82Y 40/00
See application file for complete search history.

(56) References Cited

U.S. PATENT DOCUMENTS

2006/0194902 A1  8/2006  Nie et al.
2009/0054542 A1  2/2009  Schoengerger
2011/0275728 A1  11/2011  Schonberger et al.
2014/0377881 A1  12/2014  Kitahara et al.
2016/0333116 A1  11/2016  Nakatani et al.
2016/0369093 A1  12/2016  Komuro et al.
2017/0001162 A1  1/2017  Imai et al.
2018/0037737 A1  2/2018  Semba et al.
2018/0362405 A1  12/2018  Tsujii et al.

FOREIGN PATENT DOCUMENTS

| CN | 107429071 A | 12/2017 |
|---|---|---|
| CN | 107825726 A | 3/2018 |
| EP | 3447085 A1 | 2/2019 |
| JP | S56-147850 A | 11/1981 |
| JP | H08-151481 A | 6/1996 |
| JP | 2000-511061 A | 8/2000 |
| JP | 2006-016418 A | 1/2006 |
| JP | 2010-536965 A | 12/2010 |
| JP | 2012-102324 A | 5/2012 |
| JP | 2012-515811 A | 7/2012 |
| JP | 2012-201767 A | 10/2012 |
| JP | 2013-166818 A | 8/2013 |
| JP | 2013-217006 A | 10/2013 |

(Continued)

OTHER PUBLICATIONS

DKS Co. Ltd., Product Index (Output Date: Mar. 15, 2023) cited in JP Opposition document (see partial English translation).
Office Action issued in corresponding Japanese Patent Application No. 2020-516247 dated Sep. 9, 2021.
Written Argument of Japanese Patent Application No. 2020-516247 dated Nov. 10, 2021.

(Continued)

*Primary Examiner* — Ling Siu Choi
*Assistant Examiner* — Andrea Wu
(74) *Attorney, Agent, or Firm* — Morgan, Lewis & Bockius LLP

(57) ABSTRACT

This invention relates to providing a resin composition and a resin molded article having sufficient mechanical properties and thermal properties, and also having excellent wear resistance and moldability when in use. This invention provides a cellulose nanofiber-containing aqueous dispersion including (A) cellulose nanofibers, (B) a surface treatment agent, and water. In one embodiment, (B) a surface treatment agent has an HLB value of 0.1 or greater but less than 8.0. This invention provides a dispersion liquid including (B) a surface treatment agent, (D) a binder component, and water, wherein (B) the surface treatment agent is a water-soluble polymer having a hydrophilic segment and a hydrophobic segment, and having a number average molecular weight of 200 to 30,000, and (D) the binder component is polyurethane. This invention provides a cellulose nanofiber resin composition including (A) cellulose nanofibers, (B) a surface treatment agent, and (F) a thermoplastic resin.

23 Claims, No Drawings

(56) References Cited

FOREIGN PATENT DOCUMENTS

| | | |
|---|---|---|
| JP | 2014-009290 A | 1/2014 |
| JP | 2015-010154 A | 1/2015 |
| JP | 2015-513007 A | 4/2015 |
| JP | 2015-117340 A | 6/2015 |
| JP | 2016-030809 A | 3/2016 |
| JP | 2016-104865 A | 6/2016 |
| JP | 2016-196711 A | 11/2016 |
| JP | 2016-210893 A | 12/2016 |
| JP | 2017-105983 A | 6/2017 |
| JP | 2017-218595 A | 12/2017 |
| JP | 2018-505285 A | 2/2018 |
| JP | 2018-044054 A | 3/2018 |
| JP | 2018-044100 A | 3/2018 |
| JP | 2018-048218 A | 3/2018 |
| JP | 2018-510931 A | 4/2018 |
| JP | 2020-007496 A | 1/2020 |
| WO | 97/45024 A1 | 12/1997 |
| WO | 2010/131602 A1 | 11/2010 |
| WO | 2013/035461 A1 | 3/2013 |
| WO | 2013/100146 A1 | 7/2013 |
| WO | 2013/123137 A1 | 8/2013 |
| WO | 2014/034071 A1 | 3/2014 |
| WO | 2015/107995 A1 | 7/2015 |
| WO | 2016/132690 A1 | 8/2016 |
| WO | 2016/132691 A1 | 8/2016 |
| WO | 2018/123150 A1 | 7/2018 |

OTHER PUBLICATIONS

Written Opinion Argument issued in related Japanese Patent Application No. 2020-007496 dated Jul. 13, 2022 cited in JP Information Offer.

Builes et al., "Unsaturated Polyester Nanocomposites modified with fibrillated cellulose and PEO-b-PPO-b-PEO block copolymer," Composites Science and Technology, 89: 120-126 (2013).

Apostolopoulou-Kalkavoura et al., "Thermal conductivity of hygroscopic foams based on cellulose nanofibrils and a nonionic polyoxamer," Cellulose, 25 (2): 1117-1126 (2018).

Saito, "Pluronic Surfactants," Journal of Japan Oil Chemists' Society, 49 (10): 1071-1080 (2000) (see English abstract).

International Search Report issued in corresponding International Patent Application No. PCT/JP2019/016217 dated Jul. 16, 2019.

International Preliminary Report and Written Opinion issued in corresponding International Patent Application No. PCT/JP2019/016217 dated Nov. 5, 2020.

Supplementary European Search Report issued in corresponding European Patent Application No. 19792058.0 dated May 12, 2021.

Nagalakshmaiah et al., "Surface adsorption of triblock copolymer (PEO-PPO-PEO) on cellulose nanocrystals and their melt extrusion with polyethylene," RSC Advances, 6 (70): 66224-66232 (2016).

Church et al., "A simple and effective method to ameliorate the interfacial properties of cellulosic fibre based bio-composites using poly (ethylene glycol) based amphiphiles," European Polymer Journal, 64: 70-78 (2015).

Emami et al., "Use of surfactants in cellulose nanowhisker/epoxy nanocomposites: effect on filler dispersion and system properties," Cellulose, 22 (5): 3161-3176 (2015).

CELLULOSE NANOFIBER-CONTAINING AQUEOUS DISPERSION

FIELD

The present invention relates to a cellulose nanofiber aqueous dispersion and to its dried form, as well as to a cellulose nanofiber resin composition and molded resin.

BACKGROUND

Thermoplastic resins are light and have excellent processing characteristics, and are therefore widely used for a variety of purposes including automobile members, electrical and electronic parts, business machine housings, precision parts and the like. With resins alone, however, the mechanical properties, slidability, thermal stability and dimensional stability are often inadequate, and it is common to use composites of resins with different types of inorganic materials.

Resin compositions comprising thermoplastic resins reinforced with reinforcing materials consisting of inorganic fillers such as glass fibers, carbon fibers, talc or clay have high specific gravity, and therefore the obtained molded resins have higher weight. In recent years, cellulose has come to be used as a new reinforcing material for resins because of its lower environmental burden.

In terms of simple properties, cellulose is known to have a high elastic modulus similar to aramid fibers, and a lower linear expansion coefficient than glass fibers. In addition, it exhibits a low true density of 1.56 $g/cm^3$, which is overwhelmingly lighter than glass (density: 2.4 to 2.6 $g/cm^3$) or talc (density: 2.7 $g/cm^3$), used as a common reinforcing material for thermoplastic resins.

Cellulose is obtained from a variety of sources, including trees as starting materials, as well as hemp, cotton, kenaf and cassava starting materials. Bacterial celluloses are also known, typical of which is nata de coco. These natural resources that can serve as starting materials are abundant throughout the Earth, and a great deal of effort has been focused on techniques for exploiting cellulose as fillers in resins so that they can be effectively utilized.

CNF (cellulose nanofibers) are obtained using pulp or the like as starting material, hydrolyzing the hemicellulose portion to weaken the pulp, and then defibrating it using a pulverizing method with a high-pressure homogenizer, microfluidizer, ball mill or disk mill, and in water they form a highly dispersed state and network on a level known as a fine nanodispersion.

For distribution of CNF in a resin it is necessary to dry the CNF into a powder form, but with CNF it has been a problem that they change from a microdispersed state to strong aggregates during the course of separation from water, making their redispersion difficult. The aggregating force is exhibited due to hydrogen bonding by the hydroxyl groups of the cellulose, and it is considered to be extremely strong.

In order to exhibit adequate performance, therefore, it is necessary to relax the hydrogen bonding by the hydroxyl groups of the cellulose. Even when relaxation of hydrogen bonding is achieved, however, it is still difficult to maintain a disentangled state (nanometer size (<1 μm)) in the resin.

Compositions have been proposed that are composites of such CNF with various resins as fillers. For example, PTLs 1 and 2 describe techniques using dispersing agents for compositing of cellulose and resins.

CITATION LIST

Patent Literature

[PTL 1] Japanese Patent Publication No. 5797129
[PTL 2] International Patent Publication No. WO2018/123150

SUMMARY

Technical Problem

PTL 1 describes a technique using an ether-type nonionic surfactant with an HLB value of 8 to 13 for dispersion of cellulose nanofibers, and it teaches addition of a surfactant to a low-concentration CNF slurry for excellent dispersibility of the CNF for a certain time even after stirring, as well as mentioning the use of polypropylene. However, since the level of dispersion of the cellulose nanofibers described in PTL 1 still leaves discernible cellulose nanofiber aggregates in X-ray CT, the effect on improving the mechanical properties and thermal properties is very minimal. In addition, nothing is mentioned regarding the slidability, odor and moldability of the thermoplastic resin.

PTL 2 describes a technique using an organic component for dispersion of cellulose, but here as well, the effect on improving the mechanical properties and thermal properties is very minimal and nothing is mentioned regarding the slidability, odor and moldability of the thermoplastic resin. It remains as a problem, therefore, that these patent documents are unsuitable for practical use.

At the current time, it has not been possible to obtain a cellulose nanofiber aqueous dispersion or dried cellulose nanofibers wherein the cellulose is microdispersed in a resin composition in a sufficient amount to exhibit mechanical properties desired for a molded resin, and that ensures high mechanical properties and thermal properties (especially reduced thermal expansion) and can yield a cellulose nanofiber-containing molded resin with excellent abrasion resistance (especially abrasion resistance during sliding) and moldability.

It is an object of one aspect of the invention to solve these problems by providing a cellulose nanofiber aqueous dispersion that allows easy redispersion of cellulose nanofibers in water or an organic solvent even after drying, and has excellent dispersibility of the cellulose nanofibers in resins, as well as dried cellulose nanofibers that can exhibit sufficient mechanical properties and thermal properties to a resin composition when dispersed in a resin, while also exhibiting excellent abrasion resistance and excellent moldability and/or coatability for practical use. It is an object of another aspect of the invention to provide a resin composition and molded resin having excellent mechanical properties and thermal properties, while also exhibiting excellent abrasion resistance and excellent moldability and/or coatability for practical use. It is an object of yet another aspect of the invention to provide a resin composition and molded resin that are superior in terms of slidability and in terms of reducing changes in outer appearance before and after molding, and/or reducing odor.

Solution to Problem

As a result of avid research with the aim of solving the problems described above, the present inventors have completed this invention upon finding that they can be solved by using a cellulose nanofiber aqueous dispersion that includes a specific surface treatment agent.

Specifically, the present invention encompasses the following aspects.

[1] A cellulose nanofiber aqueous dispersion comprising cellulose nanofibers (A), a surface treatment agent (B) and water, wherein the surface treatment agent (B) has an HLB value of 0.1 or greater and less than 8.0.

[2] The cellulose nanofiber aqueous dispersion according to aspect 1, wherein a number-average molecular weight of the surface treatment agent (B) is 200 to 30,000.

[3] The cellulose nanofiber aqueous dispersion according to aspect 1 or 2, wherein a cloud point of the surface treatment agent (B) is 10° C. or higher.

[4] The cellulose nanofiber aqueous dispersion according to any one of aspects 1 to 3, wherein the surface treatment agent (B) has a hydrophilic segment and a hydrophobic segment.

[5] The cellulose nanofiber aqueous dispersion according to aspect 4, wherein the hydrophilic segment includes a polyoxyethylene block and the hydrophobic segment includes a polyoxypropylene block.

[6] The cellulose nanofiber aqueous dispersion according to aspect 4 or 5, wherein the molecular structure of the surface treatment agent (B) is one selected from among ABA-type triblock structures, 3-branch structures and 4-branch structures.

[7] The cellulose nanofiber aqueous dispersion according to aspect 6, wherein the molecular structure of the surface treatment agent (B) is a hydrophilic segment-hydrophobic segment-hydrophilic segment triblock structure.

[8] The cellulose nanofiber aqueous dispersion according to any one of aspects 4 to 7, wherein a ratio of the hydrophobic segment mass fraction to the hydrophilic segment mass faction (hydrophobic segment mass fraction hydrophilic segment mass fraction) of the surface treatment agent (B) is 0.1 to 3.

[9] The cellulose nanofiber aqueous dispersion according to any one of aspects 1 to 8, wherein the surface treatment agent (B) is a nonionic surfactant.

[10] The cellulose nanofiber aqueous dispersion according to aspect 9, wherein the surface treatment agent (B) is an ether-type nonionic surfactant.

[11] The cellulose nanofiber aqueous dispersion according to any one of aspects 1 to 10, which comprises the surface treatment agent (B) at 0.1 to 100 parts by mass with respect to 100 parts by mass of the cellulose nanofibers (A).

[12] The cellulose nanofiber aqueous dispersion according to any one of aspects 1 to 11, which further comprises a water-soluble organic solvent (C).

[13] The cellulose nanofiber aqueous dispersion according to any one of aspects 1 to 12, which further comprises a binder component (D).

[14] The cellulose nanofiber aqueous dispersion according to aspect 13, wherein:
the surface treatment agent (B) is a water-soluble polymer, and
the binder component (D) is a polyurethane having a soft segment and a hard segment.

[15] The cellulose nanofiber aqueous dispersion according to aspect 13 or 14, which comprises the surface treatment agent (B) at 0.1 to 100 parts by mass and the binder component (D) at 0.1 to 100 parts by mass, with respect to 100 parts by mass of the cellulose nanofibers (A).

[16] The cellulose nanofiber aqueous dispersion according to any one of aspects 1 to 15, which further comprises an antioxidant (E).

[17] The cellulose nanofiber aqueous dispersion according to aspect 16, which comprises the antioxidant (E) at 0.01 to 100 parts by mass with respect to 100 parts by mass of the surface treatment agent (B).

[18] The cellulose nanofiber aqueous dispersion according to aspect 16 or 17, wherein the antioxidant (E) is selected from the group consisting of hindered phenol-based antioxidants, sulfur-based antioxidants and phosphorus-based antioxidants.

[19] Dried cellulose nanofibers, which are the dried product of a cellulose nanofiber aqueous dispersion according to any one of aspects 1 to 18.

[20] A cellulose nanofiber resin composition comprising cellulose nanofibers (A), a surface treatment agent (B) and a thermoplastic resin (F), wherein the surface treatment agent (B) has an HLB value of 0.1 or greater and less than 8.0.

[21] The cellulose nanofiber resin composition according to aspect 20, wherein a number-average molecular weight of the surface treatment agent (B) is 200 to 30,000.

[22] The cellulose nanofiber resin composition according to aspect 20 or 21, wherein a cloud point of the surface treatment agent (B) is 10° C. or higher.

[23] The cellulose nanofiber resin composition according to any one of aspects 20 to 22, wherein the surface treatment agent (B) has a hydrophilic segment and a hydrophobic segment.

[24] The cellulose nanofiber resin composition according to aspect 23, wherein the hydrophilic segment includes a polyoxyethylene block and the hydrophobic segment includes a polyoxypropylene block.

[25] The cellulose nanofiber resin composition according to aspect 23 or 24, wherein the molecular structure of the surface treatment agent (B) is one selected from among ABA-type triblock structures, 3-branch structures and 4-branch structures.

[26] The cellulose nanofiber resin composition according to aspect 25, wherein the molecular structure of the surface treatment agent (B) is a hydrophilic segment-hydrophobic segment-hydrophilic segment triblock structure.

[27] The cellulose nanofiber resin composition according to any one of aspects 23 to 26, wherein a ratio of the hydrophobic segment mass fraction to the hydrophilic segment mass fraction (hydrophobic segment mass fraction/ hydrophilic segment mass fraction) of the surface treatment agent (B) is 0.1 to 3.

[28] The cellulose nanofiber resin composition according to any one of aspects 23 to 27, wherein the surface treatment agent (B) is a nonionic surfactant.

[29] The cellulose nanofiber resin composition according to aspect 28, wherein the surface treatment agent (B) is an ether-type nonionic surfactant.

[30] The cellulose nanofiber resin composition according to any one of aspects 20 to 29, which comprises the surface treatment agent (B) at 0.1 to 100 parts by mass with respect to 100 parts by mass of the cellulose nanofibers (A).

[31] The cellulose nanofiber resin composition according to any one of aspects 20 to 30, comprising the cellulose nanofibers (A) at 1 to 200 parts by mass and the surface treatment agent (B) at 0.1 to 200 parts by mass with respect to 100 parts by mass of the thermoplastic resin (F), wherein:
the surface treatment agent (B) has a number-average molecular weight of 200 to 25,000.

[32] The cellulose nanofiber resin composition according to any one of aspects 20 to 31, which further comprises water and is in the form of an aqueous dispersion.

[33] The cellulose nanofiber resin composition according to aspect 32, which further comprises a water-soluble organic solvent (C).

[34] The cellulose nanofiber resin composition according to any one of aspects 20 to 31, which is in a dried form.

[35] The cellulose nanofiber resin composition according to any one of aspects 20 to 34, which further comprises a binder component (D).

[36] The cellulose nanofiber resin composition according to aspect 35, wherein:
the surface treatment agent (B) is a water-soluble polymer, and
the binder component (D) is a polyurethane having a soft segment and a hard segment.

[37] The cellulose nanofiber resin composition according to aspect 35 or 36, which comprises the surface treatment agent (B) at 0.1 to 100 parts by mass and the binder component (D) at 0.1 to 100 parts by mass, with respect to 100 parts by mass of the cellulose nanofibers (A).

[38] The cellulose nanofiber resin composition according to any one of aspects 35 to 37, which comprises the cellulose nanofibers (A) at 1 to 50 mass %, the surface treatment agent (B) at 0.1 to 50 mass %, the binder component (D) at 0.1 to 50 mass % and the thermoplastic resin (F) at 1 to 98.8 mass %.

[39] The cellulose nanofiber resin composition according to any one of aspects 35 to 38, which comprises the cellulose nanofibers (A) at 1 to 200 parts by mass and the binder component (D) at 0.01 to 200 parts by mass, with respect to 100 parts by mass of the thermoplastic resin (F).

[40] The cellulose nanofiber resin composition according to any one of aspects 35 to 39, wherein the binder component (D) is bonded to or adsorbed on the cellulose nanofibers (A).

[41] The cellulose nanofiber resin composition according to any one of aspects 35 to 40, wherein the binder component (D) is bonded to or adsorbed on the thermoplastic resin (F).

[42] The cellulose nanofiber resin composition according to any one of aspects 20 to 41, which further comprises an antioxidant (E).

[43] The cellulose nanofiber resin composition according to aspect 42, which comprises the antioxidant (E) at 0.01 to 100 parts by mass with respect to 100 parts by mass of the surface treatment agent (B).

[44] The cellulose nanofiber resin composition according to aspect 42 or 43, wherein the antioxidant (E) is selected from the group consisting of hindered phenol-based antioxidants, sulfur-based antioxidants and phosphorus-based antioxidants.

[45] The cellulose nanofiber resin composition according to any one of aspects 20 to 44, wherein the thermoplastic resin (F) is selected from the group consisting of polyolefin-based resins, polyamide-based resins, polyester-based resins, polyacetal-based resins, polyacrylic-based resins, polyphenylene ether-based resins and polyphenylene sulfide-based resins, and mixtures of any two or more of the same.

[46] The cellulose nanofiber resin composition according to any one of aspects 20 to 45, wherein the tensile yield strength increase calculated by the following formula (1):

$$\text{Tensile yield strength increase}=(b/c-1)/a \qquad (1),$$

from the mass content of the cellulose nanofibers (A) in the resin composition (a), a tensile yield strength of the resin composition (b) and the tensile yield strength of the thermoplastic resin (F) (c), is larger than 1.0.

[47] The cellulose nanofiber resin composition according to any one of aspects 20 to 46, wherein a flexural modulus increase calculated by the following formula (2):

$$\text{Flexural modulus increase}=(d/e-1)/a,$$

from the mass content of the cellulose nanofibers (A) in the resin composition (a), the flexural modulus of the resin composition (d) and the flexural modulus of the thermoplastic resin (F) (e), is larger than 3.0.

[48] A molded resin formed from a cellulose nanofiber resin composition according to any one of aspects 20 to 47.

[49] A method for producing a cellulose nanofiber resin composition according to any one of aspects 20 to 47, wherein the method includes:
kneading at least the cellulose nanofibers (A), the surface treatment agent (B) with an HLB value of 0.1 or greater and less than 8.0, and the thermoplastic resin (F).

[50] A method for producing a cellulose nanofiber resin composition according to any one of aspects 20 to 47, wherein the method includes:
preparing a cellulose aqueous dispersion according to any one of aspects 1 to 18, and
kneading the cellulose aqueous dispersion with at least the thermoplastic resin (F).

[51] A dispersion comprising a surface treatment agent (B), a binder component (D) and water, wherein:
the surface treatment agent (B) is a water-soluble polymer with a hydrophilic segment and a hydrophobic segment, and having a number-average molecular weight of 200 to 30,000, and
the binder component (D) is polyurethane.

[52] A cellulose nanofiber aqueous dispersion comprising cellulose nanofibers (A), a surface treatment agent (B), a binder component (D) and water, wherein:
the surface treatment agent (B) is a water-soluble polymer with a hydrophilic segment and a hydrophobic segment, and having a number-average molecular weight of 200 to 30,000, and
the binder component (D) is polyurethane.

[53] Dried cellulose nanofibers, which are the dried product of a cellulose nanofiber aqueous dispersion according to aspect 52.

[54] A cellulose nanofiber resin composition comprising cellulose nanofibers (A), a surface treatment agent (B), a binder component (D) and a thermoplastic resin (F), wherein:
the surface treatment agent (B) is a water-soluble polymer with a hydrophilic segment and a hydrophobic segment, and having a number-average molecular weight of 200 to 30.000, and
the binder component (D) is polyurethane.

[55] The cellulose nanofiber resin composition according to aspect 54, wherein the polyurethane is one or more selected from the group consisting of blocked isocyanates and polyurethanes bonded to the cellulose nanofibers (A) or the thermoplastic resin (F) or both.

[56] A molded resin formed from a cellulose nanofiber resin composition according to aspect 54 or 55.

Advantageous Effects of Invention

According to one aspect of the invention there is provided a resin composition having sufficient mechanical properties and thermal properties for a molded resin, while also exhibiting excellent abrasion resistance and excellent moldability and/or coatability for practical use. According to another aspect of the invention there is provided a cellulose nanofiber aqueous dispersion that allows easy redispersion of cellulose nanofibers in water or an organic solvent after drying, and has excellent dispersibility of the cellulose nanofibers in resins, as well as dried cellulose nanofibers that can exhibit sufficient mechanical properties and thermal properties to a resin composition when dispersed in a resin, while also exhibiting excellent abrasion resistance and excellent moldability and/or coatability for practical use.

DESCRIPTION OF EMBODIMENTS

Exemplary modes of the present invention will now be described in detail, with the understanding that they are not limitative on the invention.

First Embodiment

<Cellulose Nanofibers (A)>

The cellulose nanofibers (A) are cellulose with a mean fiber size of 1000 nm or smaller. Preferred examples of cellulose nanofibers (A) include, but are not limited to, one or more types from among cellulose nanofibers obtained using cellulose pulp starting materials, and modified forms of such cellulose. From the viewpoint of stability and performance, it is preferable to use one or more types of modified cellulose. The mean fiber size of the cellulose nanofibers (A) is 1000 nm or smaller, preferably 500 mu or smaller and more preferably 200 nm or smaller, from the viewpoint of obtaining satisfactory mechanical strength (especially tensile modulus) for the molded resin. While a smaller mean fiber size is preferred, it is preferably 10 nm or greater, more preferably 20 nm or greater and even more preferably 30 nm or greater from the viewpoint of easier processing. The mean fiber size is the value determined to be the equivalent spherical diameter (volume-average particle diameter) of the particles at a cumulative volume of 50% using a laser diffraction/scattering method-based particle size distribution meter.

The mean fiber size can be measured by the following method. The cellulose nanofibers (A) at a solid content of 40 mass % are kneaded for 30 minutes in a planetary mixer (for example, a 5DM-03-R by Shinagawa Machinery Works Co., Ltd., hook-type stirring blade) at 126 rpm, room temperature, ordinary pressure, and then a purified water suspension is prepared to 0.5 mass %, a high-shear homogenizer (for example, an "Excel ED-7 Autohomogenizer", trade name of Nippon Seiki Co., Ltd., processing conditions) is used for dispersion at rotational speed: 15,000 rpm×5 minutes, a centrifugal separator (for example, a "Model 6800 Centrifugal Separator", trade name of Kubota Corp., Rotor type Model RA-400) is used for centrifugation under conditions with a centrifugal force of 39,200 m$^2$/s for 10 minutes, a supernatant is obtained, the supernatant is centrifuged at 116,000 m$^2$/s for 45 minutes, and the centrifugation supernatant is obtained. The supernatant liquid is used to measure the 50% cumulative particle diameter, as the volume-average particle diameter (specifically, the equivalent spherical diameter of particles at a cumulative volume of 50% with respect to the total volume of the particles), in the volume frequency particle size distribution obtained using a laser diffraction/scattering method-based particle size distribution meter (for example, an "LA-910" or "LA-950", trade names of Horiba, Ltd., ultrasonic treatment for 1 minute, refractive index: 1.20).

According to a typical aspect, the L/D ratio of the cellulose nanofibers (A) with a mean fiber size of 1000 nm or smaller is 20 or greater. The lower limit for L/D of the cellulose nanofibers is preferably 30, more preferably 40, even more preferably 50, yet more preferably 80, even yet more preferably 100, especially preferably 120 and most preferably 150. The upper limit is not particularly restricted but is preferably 10,000 or lower, or 1000 or lower, from the viewpoint of handleability. The L/D ratio of the cellulose nanofibers is preferably within this range to exhibit satisfactory mechanical properties for the resin composition of this disclosure using a small amount of cellulose nanofibers.

The cellulose nanofibers (A) may be cellulose obtained by treating pulp or the like with hot water or the like at 100° C. or higher, hydrolyzing the hemicellulose portion to weaken it, and then defibrating by a pulverizing method using a high-pressure homogenizer, microfluidizer, ball mill or disk mill. According to one aspect, the cellulose nanofibers (A) are a type with an L/D ratio of 30 or greater, and not classified as cellulose pulp (typically having an L/D ratio of 40 or greater and a fiber diameter of larger than 1000 nm).

The method of producing the cellulose pulp is not particularly restricted, and for example, it may be treatment of cut starting pulp with hot water at 100° C. or higher, hydrolysis of the hemicellulose portion to weaken it, and then defibrating by a pulverizing method using a high-pressure homogenizer, microfluidizer, ball mill or disk mill. According to a typical aspect, the cellulose pulp has an L/D ratio of 40 or greater and a fiber diameter of larger than 1000 nm.

The lower limit for the L/D of the cellulose pulp is more preferably 50, yet more preferably 80 and most preferably 100. The upper limit is not particularly restricted but is preferably 10,000 or lower from the viewpoint of handleability. The L/D ratio of the cellulose pulp is preferably in the range specified above in order for the resin composition to exhibit satisfactory mechanical properties.

For the present disclosure, the length, diameter and L/D ratio of the cellulose nanofibers or cellulose pulp, or the cellulose whiskers described below, are determined by preparing aqueous dispersions of the cellulose nanofibers, cellulose pulp and cellulose whiskers, respectively, each aqueous dispersion being dispersed using a high-shear homogenizer (for example, an "Excel ED-7 Autohomogenizer", trade name of Nippon Seiki Co., Ltd.), under processing conditions of rotational speed: 15,000 rpm×5 minutes, diluting the aqueous dispersion with purified water to 0.1 to 0.5 mass %, casting this onto mica, and using the air-dried product as a measuring sample for measurement with an optical microscope, a high-resolution scanning microscope (SEM) or an atomic force microscope (AFM). Specifically, in an observational field with magnification adjusted to observe at least 100 cellulose nanofibers, cellulose pulp fibers or cellulose whiskers, the length (L) and diameter (D) is measured for 100 randomly selected cellulose nanofibers, cellulose pulp fibers or cellulose whiskers, and the ratio (L/D) is calculated. The lengths and diameters of the cellulose nanofibers, cellulose pulp fibers or cellulose whiskers of the disclosure are the number-average values for the 100 cellulose fibers. According to one aspect, fibers with a ratio (L/D) of less than 20 may be classified as cellulose whiskers, and those with a ratio of 20 or greater may be classified as cellulose fibers (with cellulose pulp being classified as a fiber diameter of larger than 1000 nm and a ratio (L/D) of 40 or greater).

The length, diameter and L/D ratio of the cellulose nanofibers, cellulose pulp fibers or cellulose whiskers in the resin composition and molded resin can be confirmed by dissolving the resin component in the composition in an organic or inorganic solvent capable of dissolving the resin component of the composition, separating the cellulose, thoroughly rinsing it with the solvent, and then replacing the solvent with purified water or a dispersible organic solvent to form an aqueous dispersion, diluting the cellulose concentration to 0.1 to 0.5 mass % with purified water, casting the dispersion onto mica, and performing measurement by the measuring method described above using the air-dried product as the measuring sample. The cellulose is measured using 100 randomly selected fibers.

Alternatively, the length, diameter and L/D ratio of the cellulose nanofibers, cellulose pulp fibers and cellulose whiskers in the composition can be confirmed by dissolving the resin component of the composition in an organic or inorganic solvent capable of dissolving the resin component of the composition, separating the cellulose, thoroughly rinsing it with the solvent, and then replacing the solvent with purified water or a dispersible organic solvent to form an aqueous dispersion, diluting the cellulose concentration to 0.1 to 0.5 mass % with purified water, casting the dispersion onto mica, and performing measurement by the measuring method described above using the air-dried product as the measuring sample. The cellulose is measured using 100 randomly selected fibers.

The cellulose nanofibers (A) of this disclosure may be either unmodified or modified. Modified types may be any ones modified using one or more modifying agents selected from among esterifying agents, silylating agents, isocyanate compounds, alkylating halide agents, alkylene oxides and/or glycidyl compounds. According to a preferred aspect, the cellulose nanofibers (A) are unmodified, or are modified by lacking oxoacid-modified groups (i.e. sites where the hydroxyl groups of the cellulose are converted with oxoacids (such as carboxylic acids) or their salts (such as carboxylic acid salts)), preferred examples of modified forms being forms modified with the modifying agents mentioned above.

An esterifying agent used as a modifying agent includes any organic compound having at least one functional group capable of reacting with the hydroxyl groups on the surfaces of the cellulose nanofibers (A) to esterify them. The esterification may be carried out by the method described in paragraph [0108] of International Patent Publication No. WO2017/159823. The esterifying agent used may be a commercially available reagent or product.

Preferred examples of esterifying agents include, but are not limited to, aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid and phenylacetic acid, and mixtures of any arbitrarily selected among these, as well as symmetrical anhydrides (acetic anhydride, maleic anhydride, cyclohexane-carboxylic anhydride, benzene-sulfonic acid anhydride), mixed acid anhydrides ((butyric acid-valeric acid anhydride), cyclic anhydrides (succinic anhydride, phthalic anhydride, naphthalene-1,8:4,5-tetracarboxylic dianhydride, cyclohexane-1,2,3,4-tetracarboxylic acid-3,4-anhydride) and ester acid anhydrides (acetic acid 3-(ethoxycarbonyl)propanoic anhydride, benzoylethyl carbonate).

Preferred for use among these from the viewpoint of reactivity, stability and cost are acetic acid, propionic acid, butyric acid, valeric acid, caproic acid, caprylic acid, lauric acid, tridecanoic acid, myristic acid, palmitic acid, stearic acid, benzoic acid, acetic anhydride, maleic anhydride, succinic anhydride and phthalic anhydride.

A silylating agent used as a modifying agent may be any Si-containing compound having at least one reactive group that can react with the hydroxyl groups on the surface of the cellulose, or groups remaining after their hydrolysis. The silylating agent may be a commercially available reagent or product.

Preferred examples of silylating agents include, but are not limited to, chlorodimethylisopropylsilane, chlorodimethylbutyisilane, chlorodimethyloctylsilane, chlorodimethyldodecylsilane, chlorodimethyloctadecylsilane, chlorodimethylphenylsilane, chloro(1-hexenyl)dimethylsilaue, dichlorohexylmethylsilane, dichloroheptylmethylsilane, trichlorooctylsilane, hexamethyldisilazane, 1,3-divinyl-1,1,3,3-tetramethyldisilazane, 1,3-divinyl-1,3-diphenyl-1,3-dimethyl-disilazane, 1,3-N-dioctyltetramethyl-disilazane, diisobutyltetramethyldisilazane, diethyltetramethyldisilazane, N-dipropyltetramethyldisilazane, N-dibutyltetramethyldisilazane or 1,3-di(pam-t-butylphenethyl)tetramethyldisilazane, N-trimethylsilylacetamide, N-methyldiphenylsilylacetamide, N-triethylsilylacetamide, 1-butyldiphenylmethoxysilane, octadecyldimethylmethoxysilane, dimethyloctylmethoxysilane, octylmethyldimethoxysilane, octyltrimethoxysilane, trimethylethoxysilane and octyltriethoxysilane.

Preferred for use among these from the viewpoint of reactivity, stability and cost are hexamethyldisidazane, octadecyldimethylmethoxysilane, dimethyloctylmethoxysilane and trimethylethoxysilane.

An alkylating halide agent used as a modifying agent may be any organic compound having at least one functional group capable of reacting with the hydroxyl groups on the surface of cellulose to form an alkylated halide. The alkylating halide agent used may be a commercially available reagent or product.

Preferred examples of alkylating halide agents include, but are not limited to, chloropropane, chlorobutane, bromopropane, bromohexane, bromoheptane, iodomethane, iodoethane, iodooctane, iodooctadecane and iodobenzene. Preferred for use among these from the viewpoint of reactivity, stability and cost are bromohexane and iodooctane.

An isocyanate compound used as a modifying agent may be any organic compound having at least one isocyanate group capable of reacting with the hydroxyl groups on the surfaces of the cellulose nanofibers (A). The isocyanate compound may be a blocked isocyanate compound that allows the blocking groups to dissociate at a specific temperature to regenerate isocyanate groups, or a polyisocyanate dimer or trimer, or a modified isocyanate biuret or polymethylene polyphenyl polyisocyanate (polymeric MDI). They may be commercially available reagents or products.

Preferred examples of isocyanate compounds include, but are not limited to, polyisocyanates such as aliphatic polyisocyanates, alicyclic polyisocyanates, aromatic polyisocyanates and aromatic-aliphatic polyisocyanates, and blocked isocyanate compounds. Examples include tetramethylene diisocyanate, dodecamethylene diisocyanate, hexamethylene diisocyanate, 2,24-trimethylhexamethylene diisocyanate, 2,4,4-trimethylhexamethylene diisocyanate, lysine diisocyanate, 2-methylpentane-1,5-diisocyanate, 3-methylpentane-1,5-diisocyanate, isophorone diisocyanate, hydrogenated xylylene diisocyanate, 4,4'-dicyclohexyhnethane diisocyanate, 1,4-cyclohexane diisocyanate, methylcyclohexylene diisocyanate, 1,3-bis(isocyanatomethyl)cyclohexane), tolylene diisocyanate (TDI), 2,2'-diphenylmethane diisocyanate, 2,4'-diphenylmethane diisocyanate, 4,4'-diphenylmethane diisocyanate (MDI), 4,4'-dibenzyl diisocyanate, 1,5-naphthylene diisocyanate, xylylene diisocyanate, 1,3-phenylene diisocyanate, 1,4-phenylene diisocyanate), dialkyldiphenylmethane disocyanates, tetraalkyldiphenylmethane diisocyanates, α,α,α,α-tetramethylxylylene diisocyanate, and blocked isocyanate compounds obtained by reacting these isocyanate compounds with oxime-based blocking agents, phenol-based blocking agents, lactam-based blocking agents, alcohol-based blocking agents, activated methylene-based blocking agents, amine-based blocking agents, pyrazole-based blocking agents, bisulfite-based blocking agents or imidazole-based blocking agents.

Preferred for use among these from the viewpoint of reactivity, stability and cost are TDI, MDI, hexamethylene diisocyanate, and blocked isocyanates obtained using hexamethylene diisocyanate-modified compounds and hexamethylene diisocyanate as starting materials.

The dissociation temperature of the blocking groups of these blocked isocyanate compounds is at maximum preferably 210° C., more preferably 190° C. and even more preferably 150° C., from the viewpoint of reactivity and stability. The minimum is preferably 70° C. more preferably 80° C. and even more preferably 110° C. Blocking agents with blocking group dissociation temperatures in this range include methyl ethyl ketone oxime, ortho-secondary butylphenol, caprolactam, sodium bisulfite, 3,5-dimethylpyrazole and 2-methylimidazole.

An alkylene oxide and/or glycidyl compound used as a modifying agent may be any organic compound having at least one alkylene oxide, glycidyl and/or epoxy group capable of reacting with the hydroxyl groups on the surface of cellulose. The alkylene oxide and/or glycidyl compound may be a commercially available reagent or product.

Preferred examples of alkylene oxide and/or glycidyl compounds include, but are not limited to, glycidyl ethers such as methyl glycidyl ether, ethyl glycidyl ether, butyl glycidyl ether, 2-ethylhexyl glycidyl ether, 2-methyloctyl glycidyl ether, phenyl glycidyl ether, p-tertiary butylphenyl glycidyl ether, sec-butylphenyl glycidyl ether, n-butylphenyl glycidyl ether, phenylphenol glycidyl ether, cresyl glycidyl ether and dibromocresyl glycidyl ether; glycidyl esters such as glycidyl acetate and glycidyl stearate; and polyhydric alcohol glycidyl ethers such as ethyleneglycol diglycidyl ether, propyleneglycol diglycidyl ether, 1,4-butanediol diglycidyl ether, hexamethyleneglycol diglycidyl ether, resorcinol diglycidyl ether, bisphenol A diglycidyl ether, polyethyleneglycol diglycidyl ether, polypropyleneglycol diglycidyl ether, polybutyleneglycol diglycidyl ether, glycerol triglycidyl ether, trimethylolpropane-triglycidyl ether, pentaerythritol tetraglycidyl ether, sorbitol polyglycidyl ether, sorbitan polyglycidyl ether, polyglycerol polyglycidyl ether and diglycerol polyglycidyl ether.

Preferred for use among these from the viewpoint of reactivity, stability and cost are 2-methyloctyl glycidyl ether, hexamethyleneglycol diglycidyl ether and pentaerythritol tetraglycidyl ether.

Cellulose nanofibers (A) can be confirmed by dissolving the resin component of the composition in an organic or inorganic solvent capable of dissolving the resin component of the resin composition, separating the cellulose and thoroughly rinsing it with the solvent, and then subjecting the separated cellulose to thermal decomposition or hydrolysis. Alternatively, they can be confirmed by direct $^1$H-NMR or $^{13}$C-NMR measurement.

As one aspect, the content of the cellulose nanofibers (A) in the cellulose nanofiber aqueous dispersion and dried cellulose nanofibers is preferably 1 mass % or greater, preferably 5 mass % or greater and more preferably 10 mass % or greater, from the viewpoint of satisfactory redispersibility, while from the viewpoint of obtaining sufficient mechanical properties for the resin composition or molded resin, it is preferably 50 mass % or lower, more preferably 40 mass % or lower and even more preferably 20 mass % or lower.

As another aspect, the content of the cellulose nanofibers (A) in the resin composition and molded resin is preferably 1 mass % or greater, more preferably 3 mass % or greater and even more preferably 5 mass % or greater, from the viewpoint of satisfactory mechanical properties, thermal stability and durability, while from the viewpoint of obtaining sufficient moldability, it is preferably 50 mass % or lower, more preferably 40 mass % or lower and even more preferably 20 mass % or lower.

From the viewpoint of satisfactory mechanical properties, thermal stability and durability, the content of the cellulose nanofibers (A) with respect to 100 parts by mass of the thermoplastic resin (F) is 1 part by mass or greater, preferably 2 parts by mass or greater and more preferably 3 parts by mass or greater, while from the viewpoint of obtaining sufficient moldability it is 200 parts by mass or less, preferably 100 parts by mass or less and more preferably 50 parts by mass or less.

The amount of cellulose nanofibers (A) in the cellulose nanofiber aqueous dispersion and in the dried cellulose nanofibers can be easily confirmed by a method commonly known to those skilled in the art. The confirmation method is not restricted, and the following is an example. For dried cellulose nanofibers, water is added to prepare a cellulose nanofiber aqueous dispersion. The cellulose nanofiber aqueous dispersion is then centrifuged. This allows separation into a precipitate (cellulose nanofibers and polyurethane) and a surface treatment agent dispersion. A rinsing solvent is then added to the precipitate and the mixture is suction-filtered, for separation into an insoluble portion 1 (cellulose nanofibers). The isolated cellulose nanofibers are dried and the weight is measured so that the content can be calculated. The isolated cellulose nanofibers can be qualitatively analyzed (identified) using an analyzer for pyrolysis GC-MS, $^1$H-NMR or $^{13}$C-NMR.

The amount of cellulose nanofibers (A) in the resin composition and in the molded resin can be easily confirmed by a method commonly known to those skilled in the art. The confirmation method is not restricted, and the following is an example. A fragment of the resin composition and molded article is used to dissolve the resin composition in a solvent that dissolves the resin, separating a soluble portion 1 (resin and surface treatment agent) and an insoluble portion 1 (cellulose and resin). The separated insoluble portion 1 is dissolved in a resin-dissolving solvent to separate it into a soluble portion 2 (resin and surface treatment agent) and an insoluble portion 2 (cellulose). A rinsing solvent is then added to the insoluble portion 2 (cellulose) and the mixture is suction-filtered, for separation into cellulose nanofibers. The isolated cellulose nanofibers are dried and the weight is measured so that the content can be calculated. The isolated cellulose nanofibers can be qualitatively analyzed using pyrolysis GC-MS, $^1$H-NMR, $^{13}$C-NMR or wide-angle X-ray diffraction.

<Surface Treatment Agent (B)>

The surface treatment agent (B) of the disclosure preferably has an HLB value of 0.1 or greater and less than 8.0. According to the disclosure, the HLB value is the value determined by the following formula based on the Griffin method. In the following formula 1, the "sum of formula weights of hydrophilic groups/molecular weight" is the mass % of the hydrophilic group. Formula 1) Griffin method: HLB value=20×(sum of formula weights of hydrophilic groups/molecular weight)

From the viewpoint of easier solubility in water, the lower limit for the HLB value of the surface treatment agent (B) of the disclosure is not particularly restricted but is 0.1, preferably 0.2 and more preferably 1. From the viewpoint of redispersibility of the cellulose nanofibers in water or an organic solvent, the upper limit for the HLB value is less than 8.0, preferably no greater than 7.5, more preferably no greater than 7.4 and more preferably no greater than 7.0. The HLB value is most preferably 4.0 or greater and 7.6 or lower. The HLB value of the surface treatment agent (B) is preferably within the range specified above for excellent redispersibility of the cellulose nanofibers in water or an organic solvent. Excellent redispersibility in organic solvents means excellent dispersibility in resins. The HLB value is a value representing the balance between hydrophobicity and hydrophilicity of the surfactant, being represented as a value of 1 to 20, with a smaller value indicating stronger hydrophobicity and a larger value indicating stronger hydrophilicity.

According to one aspect, the surface treatment agent (B) is a water-soluble polymer. According to another aspect, the surface treatment agent (B) has a hydrophilic segment and a hydrophobic segment. According to yet another aspect, the number-average molecular weight of the surface treatment agent (B) is 200 to 30,000. For the purpose of the present disclosure, "water-soluble" means dissolving to 0.1 g or greater in 100 g of water at 23° C. The surface treatment agent (B) differs from the thermoplastic resin (F) by either being a modified form (such as an acid-modified polymer or a copolymer) of the same polymer as the thermoplastic resin (F) of the disclosure, or a polymer of a different type than the thermoplastic resin (F). According to a typical aspect, the thermoplastic resin (F) is not water-soluble while the surface treatment agent (B) is water-soluble. The surface treatment agent (B) may be mixed with the other components (such as the cellulose nanofibers (A) and binder component (D)) in the form of an aqueous dispersion that contains the surface treatment agent (B) at high concentration, for example. The surface treatment agent (B) may be a commercially available reagent or product.

According to a preferred aspect, the surface treatment agent (B) is a surfactant (that is, it is a compound with a hydrophilic segment and a hydrophobic segment in the molecule). According to a preferred aspect, the surface treatment agent (B) is an ether-type surfactant (that is, it is a compound with the hydrophilic segment and hydrophobic segment ether-bonded), from the viewpoint of high affinity with both the cellulose nanofibers (A) and the thermoplastic resin (F).

The hydrophilic segment of the surface treatment agent (B) has good affinity with the cellulose surfaces. The hydrophobic segment can inhibit aggregation between the cellulose molecules through the hydrophilic segments. Therefore, the hydrophilic segment and hydrophobic segment in the surface treatment agent (B) are preferably present in the same molecule.

According to a typical aspect, the hydrophilic segment includes a hydrophilic structure (for example, one or more hydrophilic groups selected from among hydroxyl, carboxy, carbonyl, amino, ammonium, amide and sulfo groups), and it is therefore a portion exhibiting satisfactory affinity with the cellulose nanofibers (A). Examples of hydrophilic segments include polyoxyethylene block segments (i.e. segments with multiple oxyethylene units) (PEG block), segments with repeating units containing quaternary ammonium salt structures, polyvinyl alcohol segments, polyvinylpyrolidone segments, polyacrylic acid segments, carboxyvinyl polymer segments, cationized guar gum segments, hydroxyethyl cellulose segments, methyl cellulose segments, carboxymethyl cellulose segments and polyurethane soft segments (specifically, diol segments). According to a preferred aspect, the hydrophilic segment includes an oxyethylene unit.

Examples of hydrophobic segments include segments having alkylene oxide units of 3 or more carbon atoms (such as polyoxypropylene blocks (PPG blocks)), and segments containing any of the following polymer structures: an acrylic polymer, styrene-based resin, vinyl chloride-based resin, vinylidene chloride-based resin, polyolefin-based resin, or a polycondensate of an organic dicarboxylic acid of 4 to 12 carbon atoms and an organic diamine of 2 to 13 carbon atoms, such as polyhexamethyleneadipamide (nylon 6,6), polyhexamethylene azeramide (nylon 6,9), polyhexamethylene sebacamide (nylon 6,10), polyhexamethylenedodecanoamide (nylon 6,12) or polybis(4-aminnocyclohexyl)methanedodecane, a polycondensate of an ω-amino acid (for example, ω-aminoundecanoic acid) (such as polyundecaneamide (nylon 11)), an amino acid lactam containing a lactam ring-opening polymer, such as the ε-aminocaprolactam ring-opening polymer polycapramide (nylon 6) or the ε-aminolaurolactam ring-opening polymer polylauriclactam (nylon 12), a polymer composed of a diamine and a dicarboxylic acid, a polyacetal-based resin, polycarbonate-based resin, polyester-based resin, polyphenylene sulfide-based resin, polysulfone-based resin, polyether ketone-based resin, polyimide-based resin, fluorine-based resin, hydrophobic silicone-based resin, melamine-based resin, epoxy-based resin or phenol-based resin.

The surface treatment agent (B) may have a graft copolymer structure and/or a block copolymer structure. These may be used alone or in combinations of two or more. When two or more are used in combination, they may be used as a polymer alloy. Partial modified forms or terminal modified (acid-modified) forms of these copolymers may also be used.

The structure of the surface treatment agent (B) is not particularly restricted, and if the hydrophilic segment is represented as A and the hydrophobic segment as B, it may be an AB block copolymer, ABA block copolymer, BAB block copolymer, ABAB block copolymer, ABABA block copolymer or BABAB copolymer, a 3-branch copolymer containing A and B, a 4-branch copolymer containing A and B, a star-shaped copolymer containing A and B, a monocyclic copolymer containing A and B, a polycyclic copolymer containing A and B, or a semicircular copolymer containing A and B.

The structure selected for the surface treatment agent (B) is preferably an AB block structure, ABA triblock structure, a 3-branch structure including A and B or a 4-branch structure including A and B, and more preferably it is an ABA triblock structure, a 3-branch structure including A and B or a 4-branch structure including A and B. The structure of the surface treatment agent (B) is preferably a structure as described above in order to ensure satisfactory affinity with the cellulose nanofibers (A).

Preferred examples for the surface treatment agent (B) include copolymers obtained using one or more from among compounds that provide hydrophilic segments (for example, polyethylene glycol) and compounds that provide hydrophobic segments (for example, polypropylene glycol, poly(tetramethylene ether) glycol (PTMEG) and polybutadienediol) (for example, block copolymers of propylene oxide and ethylene oxide or block copolymers of tetrahydrofuran and ethylene oxide). Such surface treatment agents may be used alone or in combinations of two or more. When two or more are used in combination, they may be used as a polymer alloy. A modified copolymer may also be used (for example, modified with one or more compounds selected from among unsaturated carboxylic acids and their acid anhydrides or derivatives).

Preferred among these, from the viewpoint of heat resistance (odor), coatability and mechanical properties, are copolymers of polyethylene glycol and polypropylene glycol, copolymers of polyethylene glycol and poly(tetramethylene ether) glycol (PTMEG), and mixtures thereof, with copolymers of polyethylene glycol and polypropylene glycol being more preferred from the viewpoint of handleability and cost.

According to one aspect, the surface treatment agent (B) is present at least on the surfaces of the cellulose nanofibers (A). In this case, the surface treatment agent (B) will lie between the cellulose nanofibers (A) and the thermoplastic resin (F) in the cellulose nanofiber resin composition, so that the cellulose nanofibers (A) will be satisfactory dispersed in the thermoplastic resin (F). The fiber diameters of the cellulose nanofibers (A) have a certain original distribution. The following method can be used to confirm that the surface treatment agent (B) is present on the surfaces of the cellulose nanofibers (A). Specifically, when the surface treatment agent (B) is present on the surface of cellulose with large fiber diameters in a resin composition, the surface treatment agent is also present as well on the surfaces of the cellulose nanofibers. Therefore, it can be judged that the surface treatment agent (B) is present on the surfaces of the cellulose nanofibers (A) if the surface treatment agent is found to be present on the surface of (even large fiber diameter) cellulose that is observable under a microscope.

According to one aspect, the surface treatment agent (B) is bonded to or adsorbed on the cellulose nanofibers (A).

According to another aspect, the surface treatment agent (B) is bonded to or adsorbed on the thermoplastic resin (F).

According to yet another aspect, the surface treatment agent (B) has at least one functional group that can chemically or physically bond or interact with the thermoplastic resin (F) and/or the cellulose nanofibers (A)(i.e., a reactive functional group according to the disclosure). According to still another aspect, the reactive functional group of the surface treatment agent (B) is a group that exhibits a bonding or absorbing property at least between hydroxyl groups. Reactive functional groups include hydroxyl, carboxyl, formyl, acyl, amino, azo, azi, imino, carbonyl, thiocarbonyl, diimide, thiol, epoxy, isocyanate, isothiocyanate, sulfone, cyano, nitro, isonitrile, vinyl, allyl, alkoxy and acid anhydride groups, and carbon-carbon double bonds, ester bonds, thioester bonds, ether bonds, thioether bonds, disulfide bonds, amide bonds, imide bonds and urethane bonds. These reactive functional groups may be single or multiple groups of one or more types in the molecule.

Preferred among these are hydroxyl, carboxyl, formyl, amino, carbonyl and isocyanate groups, from the viewpoint of reactivity with the thermoplastic resin (F) and/or cellulose nanofibers (A).

According to one aspect, the surface treatment agent (B) is a surfactant. The surfactant may be a commercially available reagent or product. The surfactant contributes to improved dispersibility of the cellulose nanofibers (A) in the thermoplastic resin (F). The preferred amount for the surfactant is 50 parts by mass or less with respect to 100 parts by mass of the cellulose nanofibers (A). The more preferred upper limit is 45 parts by mass, more preferably 40 parts by mass, even more preferably 35 parts by mass and most preferably 30 parts by mass. There is no particular lower limit, but the handleability can be increased by addition at 0.1 part by mass or greater with respect to 100 parts by mass of the cellulose nanofibers (A). The lower limit is more preferably 0.5 part by mass and most preferably 1 part by mass.

Typical surfactants include those having carbon atoms as the basic backbone, and with a functional group comprising elements selected from among carbon, hydrogen, oxygen, nitrogen, chlorine, sulfur and phosphorus. As long as the aforementioned structure is in the molecule, inorganic compounds with the aforementioned functional groups chemically bonded are also suitable.

The surfactant may be a single one, or a mixture of two or more surfactants. In the case of a mixture, the characteristic values of the surfactant for this disclosure (for example, static surface tension, dynamic surface tension and SP value) are the values for the mixture.

The static surface tension of the surfactant is preferably 20 mN/m or greater. The static surface tension is the surface tension measured by the Wilhelmy method. When a liquid surfactant is to be used at room temperature, the value measured at 25° C. is used. When a surfactant (E) that is solid or semi-solid at room temperature is to be used, the surfactant is heated to the melting point or higher and measurement is performed in the molten state, using the value corrected for a temperature of 25° C. According to the present disclosure, "room temperature" means 25° C. For the purpose of facilitating addition, the surfactant may be dissolved or diluted with an organic solvent or water. The static surface tension, in such cases, is the static surface tension of the surfactant itself.

If the static surface tension of the surfactant is within the range specified above, an effect of improved dispersibility of the cellulose nanofibers (A) in the resin composition will be exhibited. While the reason is not fully understood, it is believed that the hydrophilic functional groups in the surfactant cover the surfaces of the cellulose nanofibers (A) via hydrogen bonding with the hydroxyl groups or reactive groups of the cellulose nanofibers (A), thus inhibiting formation of interfaces between the thermoplastic resin (F) and cellulose nanofibers (A). If the hydrophilic groups of the surfactant (E) are situated on the cellulose nanofiber (A) side, the thermoplastic resin (F) side will be a hydrophobic environment, thus increasing the affinity between the thermoplastic resin (F) and the cellulose nanofibers (A).

The preferred lower limit for the static surface tension of the surfactant is 23 mN/m, more preferably 25 mN/m, even more preferably 30 mN/m, yet more preferably 35 mN/m and most preferably 39 mN/m. The preferred upper limit for the static surface tension of the surfactant is 72.8 mN/m, more preferably 60 mN/n, even more preferably 50 mN/m and most preferably 45 mN/m.

The static surface tension of the surfactant is preferably within the specified range from the viewpoint of obtaining both affinity of the surfactant with the thermoplastic resin (F) and affinity with the cellulose nanofibers (A), and exhibiting improved properties including microdispersibility of the cellulose nanofibers (A) in the thermoplastic resin (F), fluidity of the resin composition, and strength and elongation of the molded resin.

The static surface tension of the surfactant of the disclosure can be measured using a commercially available surface tension measuring apparatus. As a specific example, measurement may be carried out by the Wilhelmy method using an automatic surface tension measuring apparatus (for example, a "Model CBVP-Z", trade name of Kyowa Interface Science Co., Ltd., with use of accessory glass cell). During this time, when surfactant (E) is a liquid at room temperature, it is charged in to a height of 7 mm to 9 mm from the bottom of the accessory stainless steel dish to the liquid level, and after adjusting the temperature to 25° C.±1° C., measurement is performed and calculation is by the following formula.

$$\gamma=(P-mg+sh\rho g)/L\cos\theta$$

Here, $\gamma$: static surface tension, P: balancing force, m: plate mass, g: gravitational constant. L: plate circumferential length, $\theta$: contact angle between plate and liquid, s: plate cross-sectional area, h: sunken depth from liquid level (until forces balanced), p: liquid density.

Since a solid at room temperature cannot have its surface tension measured by this method, the surface tension measured at a temperature of melting point +5° C. is used for convenience. For an unknown substance, the melting point can be measured by first measuring the melting point by a visual melting point measuring method (JIS K6220), heating to the melting point or above to cause melting, and then adjusting the temperature to the melting point+5° C. and measuring the surface tension by the aforementioned Wilhelmy method.

The dynamic surface tension of the surfactant is preferably 60 mN/m or lower. A more preferred upper limit for the dynamic surface tension is 55 mN/m, more preferably 50 mN/m, even more preferably 45 mN/m and most preferably 40 mN/m. A preferred lower limit for the dynamic surface tension of the surfactant is 10 mN/m. A more preferred lower limit is 15 mN/m, with 20 mN/m being most preferred.

The dynamic surface tension referred to here is the surface tension measured by the maximum bubble pressure method (a method of running air through a tubule ("probe") inserted into a liquid to generate air bubbles, measuring the maximum pressure (maximum bubble pressure) when air bubbles are generated, and calculating the surface tension). Specifically, the dynamic surface tension of the invention is the value of the surface tension measured by preparing a measuring solution of the surfactant (E) dissolved or dispersed in ion-exchanged water to 5 mass %, adjusting the temperature to 25° C. and then using a dynamic surface tension meter (for example, a Theta Science Model t-60, product name of Eko Instruments, probe (capillary TYPE I (made of PEEK resin), single mode)), for measurement with an air bubble generation cycle of 10 Hz. The dynamic surface tension at each cycle is calculated by the following formula.

$$\sigma=\Delta P\cdot r/2$$

Here, $\sigma$: dynamic surface tension, $\Delta P$: differential pressure (maximum pressure−minimum pressure), r: capillary radius.

The dynamic surface tension measured by the maximum bubble pressure method is the dynamic surface tension of the surfactant at its location of fastest movement. The surfactant will usually form micelles in water. A low dynamic surface tension indicates a rapid diffusion rate of the surfactant molecules from the micelle state, while a high dynamic surface tension indicates a slow diffusion rate of the molecules.

It is advantageous for the dynamic surface tension of the surfactant to be within the range specified above, from the standpoint of exhibiting an effect of notably increasing dispersion of the cellulose nanofibers (A) in the resin composition. While the reason for the increased dispersion is not understood in detail, it is believed that a surfactant with low dynamic surface tension has excellent diffusibility in the extruder, allowing it to be localized at the interface between the cellulose nanofibers (A) and the thermoplastic resin (F) and to satisfactorily cover the surfaces of the cellulose nanofibers (A), thus contributing to an effect of increasing the dispersibility. The effect of improved dispersibility of the cellulose nanofibers (A), obtained by limiting the dynamic surface tension of the surfactant to below a specified value, also produces a notable effect of eliminating strength defects in the molded article.

The surfactant is preferably one having a higher boiling point than water. Having a higher boiling point than water means having a boiling point that is higher than the boiling point of water at each pressure on a vapor pressure curve (100° C. at below 1 atmosphere, for example).

If a surfactant having a higher boiling point than water is selected, then in the step of drying the cellulose nanofibers (A) that have been dispersed in water in the presence of the surfactant to obtain dried cellulose nanofibers (A), for example, the water and surfactant will be exchanged during the course of water evaporation, causing the surfactant to remain on the surfaces of the cellulose nanofibers (A) so that an effect can be exhibited of greatly inhibiting aggregation of the cellulose nanofibers (A).

From the viewpoint of handleability, the surfactant that is used is preferably a liquid at room temperature (i.e. 25° C.). A surfactant that is a liquid at ordinary temperature is advantageous in that it will have better affinity with the cellulose nanofibers (A), and will also penetrate more easily into the thermoplastic resin (F).

The surfactant that is used is more preferably one having a solubility parameter (SP value) of 7.25 or greater. If the surfactant has an SP value in this range, the dispersibility of the cellulose nanofibers (A) in the thermoplastic resin (F) will increase.

According to a publication by Foders (R. F. Foders: Polymer Engineering & Science, vol. 12(10), p. 2359-2370 (1974)), the SP value depends on both the cohesive energy density and the molar molecular weight of the substance, which in turn are believed to depend on the type and number of substituents of the substance, and SP values $(cal/cm^3)^{1/2}$ for the major existing solvents used in the examples described below have been publicly disclosed, as published by Ueda et al. (Toryo no Kenkyu, No. 152, October 2010).

The SP value of the surfactant can be experimentally determined from the soluble/insoluble boundary obtained when the surfactant has been dissolved in different solvents with known SP values. For example, it can be judged based on whether or not total dissolution takes place when 1 mL of the surfactant has been dissolved for a period of 1 hour at room temperature while stirring with a stirrer, in various solvents (10 mL) having different SP values shown in the tables indicated in the Examples. When the surfactant is soluble in diethyl ether, for example, the SP value of the surfactant is 7.25 or greater.

Surfactants include compounds having a chemical structure in which a hydrophilic substituent and a hydrophobic substituent are covalently bonded, and any ones utilized for a variety of purposes including consumption and industrial use may be used. For example, the following may be used, either alone or in combinations of two or more. According to a particularly preferred aspect, the surfactant is one having the dynamic surface tension specified above.

A surfactant used may be any anionic surfactant, nonionic surfactant, amphoteric ionic surfactant or cationic surfactant, but from the viewpoint of affinity with the cellulose component, an anionic surfactant or nonionic surfactant is preferred, and a nonionic surfactant is more preferred.

Anionic surfactants include fatty acid-based (anionic) ones such as sodium fatty acid salts, potassium fatty acid salts and sodium alpha-sulfo fatty acid esters, straight-chain alkylbenzene-based ones include straight-chain sodium alkylbenzenesulfonates, higher alcohol-based (anionic) ones include sodium alkylsulfuric acid esters and sodium alkylether sulfuric acid esters, alpha-olefin-based ones include alpha-sodium olefin sulfonates and normal paraffinic ones include sodium alkylsulfonates, any of which may be used either alone or in combinations of two or more.

Nonionic surfactants include fatty acid-based (nonionic) ones such as glycolipids including sucrose fatty acid esters, sorbitan fatty acid esters and polyoxyethylenesorbitan fatty acid esters, and fatty acid alkanolamides, higher alcohol-based (nonionic) ones such as polyoxyethylenealkyl ethers, and alkylphenol-based ones such as polyoxyethylenealkylphenyl ethers, any of which may be used either alone or in combinations of two or more.

Zwitterionic surfactants include amino acid-based ones such as alkylamino fatty acid sodium salts, betaine-based ones such as alkyl betaines, and amine oxide-based ones such as alkylamine oxides, any of which may be used either alone or in combinations of two or more.

Cationic surfactants include quaternary ammonium salt-based ones such as alkyltrimethylammonium salts and dialkyldimethylammonium salts, any of which may be used either alone or in combinations of two or more.

The surfactant may be a fat or oil derivative. The fat or oil may be an ester of a fatty acid and glycerin, and this normally refers to one in the form of a triglyceride (tri-O-acylglycerin). Fatty oils are categorized as drying oils, semidrying oils or non-drying oils, in order of their tendency to be oxidized and harden, and any ones utilized for a variety of purposes including consumption and industrial use may be used, such as one or more of the following, for example.

Examples of animal or vegetable oils, as fats or oils, include terpin oil, tall oil, rosin, refined oil, corn oil, soybean oil, sesame oil, rapeseed oil (canola oil), rice bran oil, rice bran oil, camellia oil, safflower oil (safflower oil), coconut oil (palm kernel oil), cottonseed oil, sunflower oil, perilla oil, linseed oil, olive oil, peanut oil, almond oil, avocado oil, hazelnut oil, walnut oil, grapeseed oil, mustard oil, lettuce oil, fish oil, whale oil, shark oil, liver oil, cacao butter, peanut butter, palm oil, lard (pig fat), tallow (beef tallow), chicken fat, rabbit fat, mutton tallow, horse fat, schmaltz, milk fat (butter, ghee and the like), hydrogenated oils (margarine, shortening and the like), castor oil (vegetable oil), and the like.

Particularly preferred among these animal or vegetable oils are terpin oils, tall oils and rosins, from the viewpoint of affinity with the cellulose component surfaces and homogeneous coatability.

Terpin oil is an essential oil obtained by steam distillation of chips from trees of the pine family, or pine rosin obtained from such trees, and it is also referred to as pine essential oil or turpentine. Examples of terpin oils include gum turpentine oil (obtained by steam distillation of pine rosin), wood turpentine oil (obtained by steam distillation or dry distillation of chips from trees of the pine family), sulfate turpentine oils (obtained by distillation during heat treatment of chips during sulfate pulp production) and sulfite turpentine oils (obtained by distillation during heat treatment of chips during sulfite pulp production), and these are essentially colorless to pale yellow liquids, with α-pinene and β-pinene as major components in addition to sulfite turpentine oil. Sulfite turpentine oil, unlike other turpentine oils, is composed mainly of p-cymene. So long as it has the aforementioned component, any derivative included in terpin oil, either alone or as a mixture of more than one, may be used as the surfactant of the invention.

Tall oil is an oil composed mainly of resin and fatty acids, obtained as a by-product in the manufacture of Kraft pulp using pine wood as the starting material. The tall oil used may be tall fat composed mainly of oleic acid and linoleic acid, or it may be tall rosin composed mainly of a C20 diterpenoid compound such as abietic acid.

A rosin is a natural resin composed mainly of a rosinic acid (abietic acid, palustric acid, isopimaric acid or the like), as the residue remaining after collecting balsams such as pine rosin as sap from plants of the pine family and distilling off the turpentine essential oil. It is also known as colophony or colophonium. Among these, tall rosin, wood rosin and gum rosin are preferred for use. Rosin derivatives that have been obtained by stabilizing treatment, esterification treatment or purifying treatment of these rosins may be used as surfactants. Stabilizing treatment is hydrogenation, disproportionation, dehydrogenation or polymerization of the rosins. Esterification treatment is reaction of the rosins or the stabilized rosins with alcohols to form rosin esters. Various known alcohols or epoxy compounds may be used for production of the rosin esters. Examples of alcohols include monohydric alcohols such as n-octyl alcohol, 2-ethylhexyl alcohol, decyl alcohol and lauryl alcohol; dihydric alcohols such as ethylene glycol, diethylene glycol, triethylene glycol, propylene glycol and neopentyl glycol; trihydric alcohols such as glycerin, trimethylolethane, trimethylolpropane and cyclohexanedimethanol; and tetrahydric alcohols such as pentaerythritol and diglycerin. There may also be used polyhydric alcohols such as isopentyldiol, ethylhexanediol, erythrulose, ozonized glycerin, caprylyl glycol, glycol, (C15-18)glycol, (C20-30)glycol, glycerin, diethylene glycol, diglycerin, dithiaoctanediol, DPG, thioglycerin, 1,10-decanediol, decylene glycol, triethylene glycol, trimethylhydroxymethylcyclohexanol, phytantriol, phenoxypropanediol, 1,2-butanediol, 2,3-butanediol, butylethylpropanediol, BG, PG, 1,2-hexanediol, hexylene glycol, pentylene glycol, methylpropanediol, menthanediol and lauryl glycol. Polyhydric alcohols also include those classified as sugar alcohols, such as inositol, erythritol, xylitol, sorbitol, maltitol, mannitol and lactitol.

Alcoholic water-soluble polymers may be used as alcohols as well. Alcoholic water-soluble polymers include polysaccharides and mucopolysaccharides, those classified as starches, those classified as polysaccharide derivatives, those classified as natural resins, those classified as cellulose and its derivatives, those classified as proteins and peptides, those classified as peptide derivatives, those classified as synthetic homopolymers, those classified as acrylic (methacrylic) acid copolymers, those classified as urethane-based polymers, those classified as laminates, those classified as cationization polymers and those classified as other synthetic polymers, while polymers that are water-soluble at ordinary temperature may also be used. More specifically, they include cationic polymers such as sodium polyacrylate, cellulose ether, calcium alginate, carboxyvinyl polymers, ethylene/acrylic acid copolymers, vinylpyrrolidone-based polymers, vinyl alcohol/vinylpyrrolidone copolymers, nitrogen-substituted acrylamide-based polymers, polyacrylamide and cationized guar gum, dimethylacrylanuonium-based polymers, acrylic (methacrylic) acid-acrylic copolymers, POE/POP copolymers, polyvinyl alcohol, pullulan, agar, gelatin, tamarind seed polysaccharides, xanthan gum, carrageenan, high-methoxyl pectin, low-methoxyl pectin, guar gum, gum arabic, cellulose whiskers, arabinogalactan, karaya gum, tragacanth gum, alginic acid, albumin, casein, curdlan, gellan gum, dextran, cellulose (other than the cellulose fibers and cellulose whiskers of the present disclosure), polyethyleneimine, polyethylene glycol and cationized silicone polymers.

Among the different rosin esters mentioned above, esterified rosins and water-soluble polymers are preferred, and rosin and polyethylene glycol ester compounds (also known as rosin-ethylene oxide addition products, polyoxyethylene glycol resin acid esters or polyoxyethylene rosinic acid esters) are particularly preferred, as they tend to further promote coating onto the surfaces of cellulose components, and dispersibility of the cellulose formulation in resins.

Examples of hydrogenated castor oil-type surfactants include compounds having hydrogenated hydrophobic groups, and having in the structure hydroxyl groups covalently bonded with hydrophilic groups such as PEO chains, which are obtained using castor oil as a type of vegetable oil obtained from seeds of castor beans of *Euphorbia helioscopia* as the starting material. The components of castor oil are glycerides of unsaturated fatty acids (87% ricinolic acid, 7% oleic acid and 3% linoleic acid), and small amounts of saturated fatty acids (3% palmitic acid, stearic acid and the like). Typical POE group structures include those with 4 to 40, and typically 15 to 30 ethylene oxide (EO) residues. The number of EO residues of nonylphenol ethoxylate is preferably 15 to 30, more preferably 15 to 25 and most preferably 15 to 20.

Examples of mineral oil derivatives include greases such as calcium soap-based grease, calcium composite soap-based grease, sodium soap-based grease, aluminum soap-based grease and lithium soap-based grease.

The surfactant may be an alkylphenyl-type compound, examples of which include alkylphenol ethoxylates, i.e. compounds obtained by ethoxylation of alkylphenols with ethylene oxide. Alkylphenol ethoxylates are nonionic surfactants. They are also referred to as poly(oxyethylene) alkylphenyl ethers, because they have hydrophilic polyoxyethylene (POE) chains linked with hydrophobic alkylphenol groups by ether bonds. Mixtures of multiple compounds with different alkyl chain lengths and POE chain lengths exist as product series with different average chain lengths that are generally available on the market. Alkyl chain lengths of 6 to 12 carbon atoms (excluding phenyl groups) are commercially available, and the structures of the typical alkyl groups include nonylphenol ethoxylate and octylphenol ethoxylate. Typical POE group structures include those with 5 to 40, and typically 15 to 30 ethylene oxide (EO) residues. The number of EO residues of nonylphenol ethoxylate is preferably 15 to 30, more preferably 15 to 25 and most preferably 15 to 20.

The surfactant may be a β-naphthyl-type compound, examples of which include β-monosubstituted compounds including naphthalene in part of the chemical structure and having the carbon at the 2-, 3-, 6- or 7-position of the aromatic ring covalently bonded with a hydroxyl group, and compounds with covalent bonding of hydrophilic groups such as PEO chains.

Typical POE group structures include those with 4 to 40, and typically 15 to 30 ethylene oxide (EO) residues. The number of EO residues is preferably 15 to 30, more preferably 15 to 25 and most preferably 15 to 20.

The surfactant may be a bisphenol A-type compound, examples of which include compounds having bisphenol A (chemical formula: $(CH_3)_2C(C_6H_4OH)_2$) in the chemical structure, with the two phenol groups in the structure covalently bonded with hydrophilic groups such as PEO chains. Typical POE group structures include those with 4 to 40, and typically 15 to 30 ethylene oxide (EO) residues. The number of EO residues of nonylphenol ethoxylate is preferably 15 to 30, more preferably 15 to 25 and most preferably 15 to 20. When two ether bonds are present in a single molecule, the number of EO residues is the average value of the two combined.

The surfactant may be a styrenated phenyl-type compound, examples of which include compounds having a styrenated phenyl group in the chemical structure, with the phenol group in the structure covalently bonded with hydrophilic groups such as PEO chains. A styrenated phenyl group has a structure with 1 to 3 styrene molecules added to the benzene ring of a phenol residue. Typical POE group structures include those with 4 to 40, and typically 15 to 30 ethylene oxide (EO) residues. The number of EO residues of nonylphenol ethoxylate is preferably 15 to 30, more preferably 15 to 25 and most preferably 15 to 20. When two ether bonds are present in a single molecule, the number of EO residues is the average value of the two combined.

Specific preferred examples of surfactants include anionic surfactants, including acylamino acid salts such as acylglutamic acid salts, higher alkyl sulfuric acid ester salts such as sodium laurate, sodium palmitate, sodium lauryl sulfate and potassium lauryl sulfate, alkyl ether sulfuric acid ester salts such as polyoxyethylene triethanolamine lauryl sulfate and polyoxyethylene sodium lauryl sulfate, and N-acylsarcosinic acid salts such as lauroylsarcosine sodium; cationic surfactants, including alkyltrimethylammonium salts such as stearyltrimethylammonium chloride and lauryltrimethylammonium chloride, alkylpyridinium salts such as distearyldimethylammonium chloride dialkyldimethylammonium salts, (N,N'-dimethyl-3,5-methylenepiperidinium) chloride and pyrdinium cetyl chloride, alkyl quaternary ammonium salts, alkylamine salts of polyoxyethylenealkylamines, and amyl alcohol fatty acid derivatives such as polyamine fatty acid derivatives; amphoteric surfactants, including imidazoline-based amphoteric surfactants such as 2-undecyl-N,N,N-(hydroxyethylcarboxymethyl) 2-imidazoline sodium and 2-cocoyl-2-imidazoliniumhydroxido-1-carboxyethyloxy disodium salt, and betaine-based amphoteric surfactants such as 2-heptadecyl-N-carboxymethyl-N-hydroxyethyl imidazolinium betaine, betaine lauryldimethylaminoacetate, alkyl betaines, amidebetaine and sulfobetaine; and nonionic surfactants, including sorbitan fatty acid esters such as sorbitan monooleate, sorbitan monoisostearate, sorbitan monolaurate, sorbitan monopalmitate, sorbitan monostearate, sorbitan sesquioleate, sorbitan trioleate, diglycerolsorbitan penta-2-ethylhexanoate and diglycerolsorbitan tetra-2-ethylhexanoate, glycerin-polyglycerin fatty acids such as glycerin monostearate, glycerin pyroglutamate α,α'-oleate and glycerin malate monostearate, propyleneglycol fatty acid esters such as propyleneglycol monostearate, hydrogenated castor oil derivatives, glycerin alkyl ethers, polyoxyethylene-sorbitan fatty acid esters such as polyoxyethylene-sorbitan monostearate, polyoxyethylene-sorbitan monooleate and polyoxyethylene-sorbitan tetraoleate, polyoxyethylene-glycerin fatty acid esters such as polyoxyethylene-sorbitol monolaurate, polyoxyethylene-sorbitol monooleate, polyoxyethylene-sorbitol pentaoleate, polyoxyethylene-sorbitol monostearate, polyoxyethylene-glycerin monoisostearate and polyoxyethylene-glycerin triisostearate, polyoxyethylene fatty acid esters such as polyoxyethylene monooleate, polyoxyethylene distearate, polyoxyethylene monodioleate and ethyleneglycol distearate, and polyoxyethylene castor oil hydrogenated castor oil derivatives such as polyoxyethylene hydrogenated castor oil, polyoxyethylene castor oil, polyoxyethylene hydrogenated castor oil monoisostearate, polyoxyethylene hydrogenated castor oil triisostearate, polyoxyethylene hydrogenated castor oil monopyroglutamic acid monoisostearic acid diester and polyoxyethylene hydrogenated castor oil maleate.

Among the above, from the viewpoint of affinity with the cellulose component, surfactants having polyoxyethylene chains, carboxylic acid groups or hydroxyl groups as hydrophilic groups are preferred, polyoxyethylene-based surfactants with polyoxyethylene chains as hydrophilic groups (polyoxyethylene derivatives) are more preferred, and nonionic polyoxyethylene derivatives are even more preferred. The polyoxyethylene chain length of a polyoxyethylene derivative is preferably 3 or greater, more preferably 5 or greater, even more preferably 10 or greater and most preferably 15 or greater. A longer chain length will increase the affinity with the cellulose component, but for balance with the coating property (localization of the resin and cellulose component at the interface), the upper limit is preferably no greater than 60, more preferably no greater than 50, even more preferably no greater than 40, especially preferably no greater than 30 and most preferably no greater than 20.

When the cellulose component is to be added to a hydrophobic resin (for example, a polyolefin or polyphenylene ether), it is preferred to use one having a polyoxypropylene chain instead of a polyoxyethylene chain as the hydrophilic group. The polyoxypropylene chain length is preferably 3 or greater, more preferably 5 or greater, even more preferably 10 or greater and most preferably 15 or greater. A longer chain length will increase the affinity with the cellulose component, but for balance with the coating property, the upper limit is preferably no greater than 60, more preferably no greater than 50, even more preferably no greater than 40, especially preferably no greater than 30 and most preferably no greater than 20.

Of the aforementioned surfactants, it is especially preferred to use those with alkyl ether-type, alkylphenyl ether-type, rosin ester-type, bisphenol A-type, β-naphthyl-type, styrenated phenyl-type or hydrogenated castor oil-type hydrophobic groups, because of their high affinity with resins. The alkyl chain length (the number of carbon atoms excluding the phenyl group in the case of alkylphenyl) is a carbon chain of preferably 5 or greater, more preferably 10 or greater, even more preferably 12 or greater and most preferably 16 or greater. When the resin is a polyolefin, the upper limit is not established since a greater number of carbon atoms will increase affinity with the resin, but it is preferably 30 and more preferably 25.

Among these hydrophobic groups there are preferred those having a cyclic structure, or having a bulky polyfunctional structure, those with a cyclic structure including alkylphenyl ether-type, rosin ester-type, bisphenol A-type, β-naphthyl-type and styrenated phenyl-type groups, and especially those with a polyfunctional structure including hydrogenated castor oil-type groups. Most preferred among these are rosin ester types and hydrogenated castor oil types.

Therefore, according to a particularly preferred aspect, the surfactant is one or more selected from the group consisting of rosin derivatives, alkylphenyl derivatives, bisphenol A derivatives, β-naphthyl derivatives, styrenated phenyl derivatives and hydrogenated castor oil derivatives.

From the viewpoint of satisfactory mechanical properties, thermal stability and durability, the content of the surfactant with respect to 100 parts by mass of the thermoplastic resin (F) is preferably 0.01 part by mass or greater, more preferably 0.1 part by mass or greater and even more preferably 0.5 part by mass or greater, while from the viewpoint of obtaining sufficient moldability it is 200 parts by mass or less, preferably 100 parts by mass or less and more preferably 10 parts by mass or less.

According to a typical aspect, the surface treatment agent (B) has a cloud point. This is a phenomenon in which increasing the temperature of a transparent or semi-transparent aqueous solution of a nonionic surfactant solution having a polyether chain such as a polyoxyethylene chain as the hydrophilic site, causes the solution to become opaque at a certain temperature (called the cloud point). Specifically, heating the transparent or semi-transparent aqueous solution at low temperature results in rapid reduction in the solubility of the nonionic surfactant around a borderline temperature, causing the previously dissolved surfactant to aggregate and become cloudy, separating from the water. This is thought to occur because high temperature results in loss of hydrating power by the nonionic surfactant (the hydrogen bonds between the polyether chains and water are broken, rapidly lowering the solubility in water). The cloud point tends to be lower with longer polyether chains. Since dissolution in water occurs in an arbitrary proportion at temperatures below the cloud point, the cloud point is a reference for the hydrophilicity of the surface treatment agent (B).

The cloud point of the surface treatment agent (B) can be measured by the following method. A tuning fork vibration viscometer (such as SV-10A by A&D Co., Ltd.) is used for measurement in a temperature range of 0 to 100° C. adjusting the aqueous solution of the surface treatment agent (B) to 0.5 mass %, 1.0 mass % and 5 mass %. The cloud point is the part at each concentration exhibiting an inflection point (the point at which the viscosity increase changes, or the aqueous solution becomes clouded).

From the viewpoint of handleability, the lower limit for the cloud point of the surface treatment agent (B) is preferably 10° C., more preferably 20° C. and most preferably 30° C. The upper limit for the cloud point is not particularly restricted but is preferably 120° C., more preferably 110° C., even more preferably 100° C. and most preferably 60° C. In order to ensure satisfactory affinity with the cellulose nanofibers (A), the cloud point of the surface treatment agent (B) is preferably in the range specified above.

From the viewpoint of plasticization of the resin composition, the lower limit for the melting point of the surface treatment agent (B) is preferably −50° C., more preferably −35° C., even more preferably −30° C., yet more preferably −10° C. and most preferably 0° C., and from the viewpoint of operability the upper limit is preferably 70° C., more preferably 60° C., even more preferably 55° C., yet more preferably 30° C. and most preferably 10° C.

The lower limit for the mass ratio of the hydrophilic segment and hydrophobic segment of the surface treatment agent (B) (hydrophobic segment molecular weight/hydrophilic segment molecular weight) is not particularly restricted but is preferably 1.5, more preferably 1.55 and most preferably 1.60, as this will allow the HLB value to be easily adjusted to below the predetermined value. From the viewpoint of allowing the HLB value to be easily adjusted to above the predetermined value, and for solubility in water, the upper limit for the mass ratio of the hydrophilic segment and hydrophobic segment (hydrophobic segment molecular weight/hydrophilic segment molecular weight) is preferably 199, more preferably 100, even more preferably 50 and most preferably 20. In order to ensure satisfactory affinity with the cellulose nanofibers (A), this ratio for the surface treatment agent (B) is preferably in the range specified above.

From the viewpoint of improving the odor property during preparation of the resin composition and the moldability during molding, the lower limit for the number-average molecular weight of the surface treatment agent (B) is preferably 200, more preferably 250, even more preferably 300 and most preferably 500. From the viewpoint of handleability, the upper limit for the number-average molecular weight is preferably 30.000, more preferably 25,000, even more preferably 23,000, yet more preferably 20,000, even yet more preferably 10,000 and most preferably 5000. The number-average molecular weight of the surface treatment agent (B) is preferably in the range specified above in order to ensure satisfactory affinity with the cellulose nanofibers (A).

From the viewpoint of affinity with the cellulose nanofibers, the lower limit for the molecular weight of the hydrophilic segment of the surface treatment agent (B) is preferably 100, more preferably 150 and most preferably 200, and from the viewpoint of solubility in water, the upper limit is preferably 20,000, more preferably 15,000 and most preferably 10,000.

From the viewpoint of dispersibility of the cellulose nanofibers in the resin, the lower limit for the molecular weight of the hydrophobic segment of the surface treatment agent (B) is preferably 100, more preferably 150 and most preferably 200, and from the viewpoint of solubility in water the upper limit is preferably 10,000, more preferably 5000 and most preferably 4000.

In the cellulose nanofiber aqueous dispersion according to one aspect, the preferred amount of the surface treatment agent (B) is 0.1 to 60 mass % with respect to the total dispersion. The upper limit is more preferably 50 mass %, more preferably 40 mass %, more preferably 35 mass %, more preferably 30 mass %, more preferably 20 mass %, more preferably 10 mass %, more preferably 5 mass % and most preferably 3 mass %. There is no particular restriction on the lower limit, but it is preferably 0.1 mass %, more preferably 0.2 mass %, even more preferably 0.5 mass % and most preferably 1 mass %. If the upper limit for the amount of the surface treatment agent (B) is as specified above, then the viscosity of the dispersion will not excessively increase and it will be easier to use the dispersion to prepare a homogeneous cellulose nanofiber aqueous dispersion. If the lower limit for the amount of the surface treatment agent (B) is as specified above, it will be possible to increase the redispersibility of the cellulose nanofibers (that is, the dispersibility of the cellulose nanofibers when dried cellulose nanofibers prepared using the cellulose nanofiber aqueous dispersion have been dispersed in water).

The preferred amount of the surface treatment agent (B) for both the resin composition and the molded resin is in the range of 0.1 to 50 mass % of the surface treatment agent (B) with respect to the total resin composition or molded resin. The upper limit is preferably 18 mass %, more preferably 15 mass %, even more preferably 10 mass % and most preferably 5 mass %. There is no particular restriction on the lower limit, but it is preferably 0.1 mass %, more preferably 0.2 mass % and most preferably 0.5 mass %. Such an upper limit on the surface treatment agent (B) will inhibit plasticization of the resin composition and can maintain satisfactory strength. Such a lower limit on the surface treatment agent (B) can increase the dispersibility of the cellulose nanofibers (A) in the thermoplastic resin (F).

The preferred amount of the surface treatment agent (B) for the cellulose nanofiber aqueous dispersion, the dried cellulose nanofibers, the resin composition and the molded resin is in the range of 0.1 to 100 parts by mass of the surface treatment agent (B) with respect to 100 parts by mass of the cellulose nanofibers (A). The upper limit is preferably 99 parts by mass, more preferably 90 parts by mass, even more preferably 80 parts by mass, yet more preferably 70 parts by mass, even yet more preferably 50 parts by mass and most preferably 40 parts by mass. There is no particular restriction on the lower limit, but it is preferably 0.1 part by mass, more preferably 0.5 part by mass and most preferably 1 part by mass. Such an upper limit for the amount of surface treatment agent (B) will inhibit plasticization of the resin composition and molded resin and can maintain satisfactory strength. Such a lower limit on the surface treatment agent (B) can increase the redispersibility of the cellulose nanofibers (A).

The lower limit for the amount of the surface treatment agent (B) in both the resin composition and the molded resin is 0.1 part by mass, preferably 0.5 part by mass, more preferably 1 part by mass and even more preferably 2 parts by mass, and the upper limit is 200 parts by mass, preferably 50 parts by mass, more preferably 10 parts by mass and even more preferably 5 parts by mass, with respect to 100 parts by mass of the thermoplastic resin (F). Such an upper limit on the surface treatment agent (B) will inhibit plasticization of the thermoplastic resin (F) and can maintain satisfactory strength. Such a lower limit on the surface treatment agent (B) can increase the dispersibility of the cellulose nanofibers (A) in the thermoplastic resin (F).

The amount of the surface treatment agent (B) in the cellulose nanofiber aqueous dispersion and in the dried cellulose nanofibers can be easily confirmed by a method commonly known to those skilled in the art. The confirmation method is not restricted, and the following is an example. For dried cellulose nanofibers, water is added to prepare a cellulose nanofiber aqueous dispersion. The cellulose nanofiber aqueous dispersion is then centrifuged. This allows separation into a precipitate (cellulose nanofibers) and a surface treatment agent dispersion. The surface treatment agent dispersion is concentrated (drying, air-drying, reduced pressure drying) to allow quantitation of the surface treatment agent (B). Identification and molecular weight measurement of the concentrated surface treatment agent (B) can be carried out by the methods described above.

The amount of surface treatment agent (B) in both the resin composition and the molded resin can be easily confirmed by a method commonly known to those skilled in the art. The confirmation method is not restricted, and the following is an example. When the resin composition is dissolved in a solvent that dissolves the thermoplastic resin (F), using a fragment of the resin composition or molded resin, a soluble portion 1 (resin and surface treatment agent) and an insoluble portion 1 (cellulose and surface treatment agent) separate. The soluble portion 1 is reprecipitated with a solvent that does not dissolve the resin but dissolves the surface treatment agent, separating an insoluble portion 2 (resin) and soluble portion 2 (surface treatment agent). The insoluble portion 1 is dissolved in a solvent that dissolves the surface treatment agent, separating a soluble portion 3 (surface treatment agent) and an insoluble portion 3 (cellulose). The soluble portion 2 and soluble portion 3 are concentrated (drying, air-drying, reduced pressure drying) to allow quantitation of the surface treatment agent (B). Identification and molecular weight measurement of the concentrated surface treatment agent (B) can be carried out by the methods described above.

According to one aspect, the amount of the surface treatment agent (B) in both the resin composition and the molded resin containing polyurethane as the binder component (D) (described below) can be easily confirmed by a method commonly known to those skilled in the art. The confirmation method is not restricted, and the following is an example. When the resin composition is dissolved in a solvent that dissolves the thermoplastic resin (F), using a fragment of the resin composition or molded resin, a soluble portion 1 (resin and surface treatment agent) and an insoluble portion 1 (cellulose, polyurethane and surface treatment agent) separate. The soluble portion 1 is reprecipitated with a solvent that does not dissolve the polyurethane but dissolves the surface treatment agent, separating an insoluble portion 2 (resin) and soluble portion 2 (surface treatment agent). The insoluble portion 1 is dissolved in a solvent that dissolves the polyurethane, separating a soluble portion 3 (polyurethane and surface treatment agent) and an insoluble portion 3 (cellulose). The soluble portion 3 is reprecipitated with a solvent that does not dissolve the polyurethane but dissolves the surface treatment agent, separating an insoluble portion 4 (polyurethane) and soluble portion 4 (surface treatment agent). The surface treatment agent (B) can be quantified by concentrating the surface treatment agent (soluble portion 2 and soluble portion 4) that has been isolated by the procedure described above. Identification and molecular weight measurement of the concentrated surface treatment agent (B) can be carried out by the methods described above.

The method of adding the surface treatment agent (B) during preparation of the cellulose nanofiber aqueous dispersion is not particularly restricted, and it may be a method of dissolving the surface treatment agent (B) in water and then adding the cellulose nanofibers (A) to the obtained aqueous surface treatment agent solution and mixing to obtain a cellulose nanofiber aqueous dispersion, or a method of dispersing the cellulose nanofibers (A) in water and then adding the surface treatment agent (B) to the obtained cellulose nanofiber (A) dispersion and mixing to obtain a dispersion.

The method of adding the surface treatment agent (B) during preparation of the resin composition is also not particularly restricted, and it may be a method of premixing and melt kneading the thermoplastic resin (F), cellulose nanofibers (A) and surface treatment agent (B), a method of first adding the surface treatment agent (B) to the thermoplastic resin (F) and pre-kneading if necessary and then adding the cellulose nanofibers (A) and melt kneading, a method of premixing the cellulose nanofibers (A) and surface treatment agent (B) and then melt kneading the mixture with the thermoplastic resin (F), or a method of adding the surface treatment agent (B) into a dispersion comprising the cellulose nanofibers (A) dispersed in water, drying the mixture to prepare dry cellulose, and then adding the dried product to the thermoplastic resin (F).

<Water-Soluble Organic Solvent (C)>

According to one aspect, the cellulose nanofiber aqueous dispersion and dried cellulose both include a water-soluble organic solvent (C). The water-soluble organic solvent (C) is a solvent that is "water-soluble" as defined in the present disclosure. The water-soluble organic solvent (C) imparts the advantage of dissolving the surface treatment agent (B) on the surfaces of the cellulose nanofibers (A) to evenly coat the surface treatment agent (B) onto the cellulose nanofibers (A), with in turn provides the advantage of allowing satisfactory redispersion of the dried cellulose nanofibers in water. The water-soluble organic solvent (C) may be a protic organic solvent or an aprotic organic solvent.

A protic organic solvent is an organic solvent having a relatively highly acidic hydrogen bonded to an oxygen atom and acting as a hydrogen bond donor. An aprotic organic solvent, on the other hand, is an organic solvent without a highly acidic hydrogen. The water-soluble organic solvent (C) may also be a commercially available reagent or product.

Specific examples that are suitable for use as the water-soluble organic solvent (C) include aprotic organic solvents such as 1,4-dioxane, anisole, diethyleneglycol dimethyl ether, cyclohexanone, N,N-dimethylformamide, N-methylacetamide, N,N-dimethylacetamide, N-methyl-2-pyrrolidone, hexamethylphosphoric acid triamide, triethyl phosphate, succinonitrile, benzonitrile, pyridine, nitromethane, morpholine, ethylenediamine, dimethyl sulfoxide, sulfolane, propylene carbonate, diethyleneglycol ethyl methyl ether, diethyleneglycol diethyl ether, triethyleneglycol dimethyl ether, triethyleneglycol diethyl ether, diethyleneglycol dibutyl ether and triethyleneglycol butyl methyl ether. Protic organic solvents include isobutyl alcohol, isopentyl alcohol, cyclohexanol, ethylene glycol, propylene glycol, 2-methoxyethanol, 2-ethoxyethanol, phenol, benzyl alcohol, diethylene glycol, triethylene glycol, glycerin, diethyleneglycol monomethyl ether, triethyleneglycol monomethyl ether and polyethyleneglycol monomethyl ether.

Preferred aprotic organic solvents among these from the viewpoint of heat resistance and ready availability are diethyleneglycol dimethyl ether, N,N-dimethylformamide, N,N-dimethylacetamide, N-methyl-2-pyrrolidone, hexamethylphosphoric acid triamide, dimethyl sulfoxide, sulfolane, triethyleneglycol dimethyl ether, with N,N-dimethylformamide, N,N-dimethylacetamide, N-methyl-2-pyrrolidone, dimethyl sulfoxide, sulfolane and triethyleneglycol dimethyl ether being more preferred from the viewpoint of handleability and cost.

From the viewpoint of heat resistance and ready availability, preferred protic organic solvents are isobutyl alcohol, isopentyl alcohol, ethylene glycol, propylene glycol, 2-methoxyethanol, 2-ethoxyethanol, diethylene glycol, triethylene glycol, glycerin and triethyleneglycol monomethyl ether, with isobutyl alcohol, ethylene glycol, propylene glycol, 2-methoxyethanol, 2-ethoxyethanol, diethylene glycol, triethylene glycol and triethyleneglycol monomethyl ether being more preferred from the viewpoint of handleability and cost.

According to a typical aspect, the lower limit for the molecular weight of the water-soluble organic solvent (C) is 50, preferably 100, more preferably 300 and most preferably 1000. The upper limit of the number-average molecular weight is not particularly restricted but is preferably 2000 or lower from the viewpoint of handleability. These ranges are preferred from the viewpoint of satisfactorily dissolving the surface treatment agent (B) and bonding or adsorption with the thermoplastic resin (F) and/or cellulose nanofibers (A) in the resin composition.

According to a typical aspect, the lower limit for the boiling point of the water-soluble organic solvent (C) is 100° C., preferably 110° C. more preferably 120° C., even more preferably 150° C. and most preferably 180° C. According to a preferred aspect, the upper limit for the boiling point is 300° C., more preferably 290° C., even more preferably 280° C., yet more preferably 260° C. and most preferably 240° C. If the lower limit for the boiling point of the water-soluble organic solvent (C) is within this range, it is presumed that an environment is created for the dried cellulose nanofibers in which the moisture is gasified in advance and the surface treatment agent (B) and water-soluble organic solvent (C) can coexist. Such an environment is advantageous for dissolving the surface treatment agent (B) on the surfaces of the cellulose nanofibers (A) to evenly coat the cellulose nanofibers (A) with the surface treatment agent (B), and also contributes to satisfactory redispersion of the dried cellulose nanofibers in water or organic solvents and satisfactory dispersion of the cellulose nanofiber aqueous dispersion and dried cellulose nanofibers in the resin composition. If the upper limit for the boiling point of the water-soluble organic solvent (C) is in the range specified above, it will be possible to adequately gasify the water-soluble organic solvent (C) during production of the resin composition. This will tend to inhibit plasticization of the resin composition by the water-soluble organic solvent (C), allowing satisfactory strength to be maintained.

According to a typical aspect, the lower limit for the relative permittivity of the water-soluble organic solvent (C) at 25° C. is 1, preferably 2, more preferably 3, even more preferably 5 and most preferably 7. The upper limit for the relative permittivity at 25° C. is preferably 80, more preferably 70, even more preferably 60 and most preferably 50. If the relative permittivity of the water-soluble organic solvent (C) is within this range, it is presumed that this allows the surface treatment agent (B) to be evenly dispersed in the dispersion and can reduce precipitation during the drying process, even at above the cloud point of the surface treatment agent (B).

The preferred amount of the water-soluble organic solvent (C) in the cellulose nanofiber aqueous dispersion is in the range of 0.1 to 100 parts by mass of the water-soluble organic solvent (C) with respect to 100 parts by mass of the cellulose nanofibers (A). The upper limit is more preferably 80 parts by mass, even more preferably 50 parts by mass and most preferably 20 parts by mass. There is no particular restriction on the lower limit, but it is preferably 0.5 part by mass, more preferably 1 part by mass and most preferably 5 parts by mass. If the upper limit for the amount of the water-soluble organic solvent (C) is as specified above, it will be possible to evenly coat the cellulose nanofibers with the surface treatment agent, and if the lower limit for the amount of the water-soluble organic solvent (C) is as specified above, it will be possible to improve redispersibility of the dried cellulose nanofibers in water. Dispersion of the cellulose nanofiber aqueous dispersion and dried cellulose nanofibers in the resin composition will also tend to be satisfactory.

The upper limit for the content of the water-soluble organic solvent (C) in the cellulose nanofiber aqueous dispersion is more preferably 50 mass %, even more preferably 30 mass %, yet more preferably 20 mass % and most preferably 10 mass %, with respect to 100 mass % as the entire dispersion. There is no particular restriction on the lower limit, but it is preferably 0.1 mass %, more preferably 0.5 mass % and most preferably 1 mass %. If the upper limit for the amount of the water-soluble organic solvent (C) is as specified above it will be possible to prepare a highly economical dispersion. If the lower limit for the amount of the water-soluble organic solvent (C) is as specified above, redispersibility of the dried cellulose nanofibers in water can be increased. Dispersion of the cellulose nanofiber aqueous dispersion and dried cellulose nanofibers in the resin composition will also tend to be satisfactory.

The content of the water-soluble organic solvent (C) in the dried cellulose nanofibers is in the range of 0 to 10,000 ppm of the water-soluble organic solvent (C) based on the total mass of the dried form. The upper limit is more preferably 5000 ppm, even more preferably 3000 ppm, yet more preferably 2500 ppm, even yet more preferably 2000 ppm, especially preferably 1500 ppm and most preferably 1200 ppm. There is no particular restriction on the lower limit, but it is preferably 100 ppm, more preferably 150 ppm and most preferably 300 ppm. If the upper limit for the amount of the water-soluble organic solvent (C) is as specified above, the cellulose nanofibers will tend to be evenly coated by the surface treatment agent. If the lower limit for the amount of the water-soluble organic solvent (C) is as specified above, redispersibility of the dried cellulose nanofibers in water and dispersibility in the resin composition will tend to be satisfactory.

In the resin composition and molded resin according to one aspect, the content of the water-soluble organic solvent (C) is in the range of 0 to 5000 ppm of the water-soluble organic solvent (C) based on the total mass of the resin composition. The upper limit is more preferably 4000 ppm, even more preferably 3500 ppm, yet more preferably 2500 ppm, even yet more preferably 1800 ppm, especially preferably 1500 ppm, particularly preferably 1200 ppm and most preferably 1000 ppm. There is no particular restriction on the lower limit, but it is preferably 0.1 ppm, more preferably 1 ppm and most preferably 10 ppm. If the upper limit for the amount of the water-soluble organic solvent (C) is as specified above, it will be possible to inhibit plasticization of the thermoplastic resin (F) and maintain satisfactory strength. If the lower limit for the amount of the water-soluble organic solvent (C) is as specified above, it will be possible to increase the dispersibility of the cellulose nanofibers (A) in the thermoplastic resin (F).

The amount of the water-soluble organic solvent (C) in the cellulose nanofiber aqueous dispersion, in the dried cellulose nanofibers, in the resin composition or in the molded resin, can be easily confirmed by a method commonly known to those skilled in the art. The confirmation method is not restricted, and the following is an example. The water-soluble organic solvent (C) can be qualitatively analyzed by supplying the cellulose nanofiber aqueous dispersion or the dried cellulose nanofibers directly, or fragments of the resin composition or molded resin, to pyrolysis GCMS, and identifying it from the chromatogram and mass spectrum. The detected water-soluble organic solvent (C) may be used to draw a calibration curve under the same conditions, to allow quantitation of the content in the cellulose nanofiber aqueous dispersion, in the dried cellulose nanofibers, in the resin composition or in the molded resin.

The amount of the water-soluble organic solvent (C) in the dispersion can be easily confirmed by a method commonly known to those skilled in the art. The confirmation method is not restricted, and the following is an example. The dispersion may be supplied directly to pyrolysis GCMS, and the water-soluble organic solvent (C) qualitatively identified from the chromatogram and mass spectrum. The detected water-soluble organic solvent (C) may be used to draw a calibration curve under the same conditions, allowing quantitation of the content in the dispersion.

The amount of the water-soluble organic solvent (C) in the cellulose nanofiber aqueous dispersion and in the dried cellulose nanofibers can be easily confirmed by a method commonly known to those skilled in the art. The confirmation method is not restricted, and the following is an example. The cellulose nanofiber aqueous dispersion or dried cellulose nanofibers may be supplied directly to pyrolysis GCMS to allow qualitative identification of the water-soluble organic solvent (C) from the chromatogram and mass spectrum. The detected water-soluble organic solvent (C) may be used to draw a calibration curve under the same conditions, to allow quantitation of the content in the cellulose nanofiber aqueous dispersion and in the dried cellulose nanofibers.

The amount of water-soluble organic solvent (C) in the resin composition and in the molded resin can be easily confirmed by a method commonly known to those skilled in the art. The confirmation method is not restricted, and the following is an example. A fragment of the resin composition or molded resin may be supplied to pyrolysis GCMS to allow qualitative identification of the water-soluble organic solvent (C) from the chromatogram and mass spectrum. The detected water-soluble organic solvent (C) may be used to draw a calibration curve under the same conditions, allowing quantitation of the content in the resin composition or in the molded resin.

<Thermoplastic Resin (F)>

According to one aspect, the cellulose nanofiber aqueous dispersion, or the dried cellulose nanofibers obtained by drying it, further includes a thermoplastic resin (F). Both the cellulose nanofiber aqueous dispersion and the dried cellulose nanofibers are cellulose nanofiber resin compositions according to this embodiment. The thermoplastic resin (F) to be used for the invention will typically have a number-average molecular weight of 5000 or greater. The lower limit for the number-average molecular weight of the thermoplastic resin (F) is preferably 5500, more preferably 10.000 and most preferably 13,000, and the upper limit is preferably 1,000,000, more preferably 500,000 and most preferably 300,000. The number-average molecular weight of the thermoplastic resin (F) is the value measured in terms of standard polymethyl methacrylate, using GPC (gel permeation chromatography). The thermoplastic resin (F) may be a crystalline resin with a melting point in the range of 100° C. to 350° C., or an amorphous resin with a glass transition temperature in the range of 100 to 250° C. The thermoplastic resin (F) may be constructed of one or more different polymers, which may be homopolymers or copolymers.

The melting point of the crystalline resin referred to here is the peak top temperature of the endothermic peak appearing when the temperature is increased from 23° C. at a temperature-elevating rate of 10° C./min using a differential scanning calorimeter (DSC). When two or more endothermic peaks appear, it represents the peak top temperature of the endothermic peak that is furthest at the high-temperature end. The enthalpy of the endothermic peak is preferably 10 J/g or greater and more preferably 20 J/g or greater. During the measurement, preferably the sample is heated once to temperature conditions of melting point+20° C. or higher, and after the resin has been melted, it is cooled to 23° C. at a temperature-lowering rate of 10° C./min and used as the sample.

The glass transition temperature of the amorphous resin referred to here is the peak top temperature of the peak with high reduction in storage modulus and maximum loss modulus, during measurement with an applied frequency of 10 Hz while increasing the temperature from 23° C. at a temperature-elevating rate of 2° C./min, using a dynamic viscoelasticity measuring apparatus. When two or more loss modulus peaks appear, it represents the peak top temperature of the peak that is furthest at the high-temperature end. The measuring frequency during this time is preferably one or more times in at least 20 seconds, in order to increase the measuring precision. The method of preparing the measuring sample is not particularly restricted, but from the viewpoint of eliminating the effect of molding strain it is preferred to use a strip cut out from a hot press molded article, the size (width or thickness) of the cut out strip preferably being as small as possible, from the viewpoint of heat conduction.

The thermoplastic resin (F) may be a polyamide-based resin, polyester-based resin, polyacetal-based resin, polycarbonate-based resin, polyacrylic-based resin, polyphenylene ether-based resin (including modified polyphenylene ethers modified by blending or graft polymerization of polyphenylene ether with other resins), polyallylate-based resin, polysulfone-based resin, polyphenylene sulfide-based resin, polyethersulfone-based resin, polyketone-based resin, polyphenylene ether ketone-based resin, polyimide-based resin, polyamideimide-based resin, polyetherimide-based resin, polyurethane-based resin, polyolefin-based resin (such as an α-olefin (co)polymer), or any of various ionomers.

Specific examples that are preferred for the thermoplastic resin (F) include high-density polyethylene, low-density polyethylene (such as linear low-density polyethylene), polypropylene, polymethylpentene, cyclic olefin-based resins, poly 1-butene, poly 1-pentene, polymethylpentene, ethylene/α-olefin copolymer, ethylene-butene copolymer, EPR (ethylene-propylene copolymer), modified ethylene-butene copolymer, EEA (ethylene-ethyl acrylate copolymer), modified EEA, modified EPR, modified EPDM (ethylene-propylene-diene terpolymer), ionomers, α-olefin copolymers, modified IR (isoprene rubber), modified SEBS (styrene-ethylene-butylene-styrene copolymer), isobutylene-paramethylstyrene halide copolymer, ethylene-acrylic acid-modified polymer, ethylene-vinyl acetate copolymer and its acid-modified forms, copolymers of (ethylene and/or propylene) and (unsaturated carboxylic acids and/or unsaturated carboxylic acid esters), polyolefins obtained by forming metal salts with at least some of the carboxyl groups of copolymers of (ethylene and/or propylene) and (unsaturated carboxylic acids and/or unsaturated carboxylic acid esters), block copolymers of conjugated dienes and vinylaromatic hydrocarbons, hydrogenated forms of block copolymers of conjugated dienes and vinylaromatic hydrocarbons, copolymers of other conjugated diene compounds with nonconjugated olefins, natural rubber, various butadiene rubbers, various styrene-butadiene copolymer rubbers, isoprene rubber, butyl rubber, bromides of isobutylene and p-methylstyrene copolymers, butyl halide rubber, acrylonitrilobutadiene rubber, chloroprene rubber, ethylene-propylene copolymer rubber, ethylene-propylene-diene copolymer rubber, styrene-isoprene copolymer rubber, styrene-isoprene-butadiene copolymer rubber, isoprene-butadiene copolymer rubber, chlorosulfonated polyethylene, acrylic rubber, epichlorohydrin rubber, polysulfide rubber, silicone rubber, fluorine rubber, urethane rubber, polyvinyl chloride, polystyrene, acrylic polymers such as polyacrylic acid esters and polymethacrylic acid esters, acrylonitrile-based copolymers composed mainly of acrylonitrile, acrylonitrile-butanediene-styrene (ABS) resins, acrylonitrile-styrene (AS) resins, cellulosic resins such as cellulose acetate, and saponification products of vinyl chloride/ethylene copolymer, vinyl chloride/vinyl acetate copolymer, ethylene/vinyl acetate copolymer and ethylene/vinyl acetate copolymer.

These may be used alone or in combinations of two or more. When two or more are used in combination, they may be used as a polymer alloy. The thermoplastic resin used may be modified with one or more compounds selected from among unsaturated carboxylic acids and their acid anhydrides or derivatives.

From the viewpoint of heat resistance, moldability, design properties and mechanical properties, it is preferred to select one or more resins from the group consisting of polyolefin-based resins, polyamide-based resins, polyester-based resins, polyacetal-based resins, polyacrylic-based resins, polyphenylene ether-based resins and polyphenylene sulfide-based resins.

More preferred, from the viewpoint of handleability and cost, are one or more resins selected from the group consisting of polyolefin-based resins, polyamide-based resins, polyester-based resins, polyacetal-based resins, polyacrylic-based resins, polyphenylene ether-based resins and polyphenylene sulfide-based resins, and especially one or more resins selected from the group consisting of polyamide-based resins and polyacetal-based resins.

The polyolefin-based resin is a polymer obtained by polymerizing a monomer unit that includes an olefin (such as an α-olefin). Specific examples of polyolefin-based resins include, but are not limited to, ethylene-based (co)polymers such as low-density polyethylene (for example, linear low-density polyethylene), high-density polyethylene, ultralow-density polyethylene and ultrahigh molecular weight polyethylene, polypropylene-based (co)polymers such as polypropylene, ethylene-propylene copolymer and ethylene-propylene-diene copolymer, and copolymers of α-olefins such as ethylene with other monomer units, including ethylene-acrylic acid copolymer, ethylene-methyl methacrylate copolymer and ethylene-glycidyl methacrylate copolymer.

The most preferred polyolefin-based resin is polypropylene. Particularly preferred is polypropylene, which has a melt mass-flow rate (MFR) of between 3 g/10 min and 30 g/10 min, inclusive, as measured at 230° C. with a load of 21.2 N, according to ISO1133. The lower limit for MFR is more preferably 5 g/10 min, even more preferably 6 g/10 min and most preferably 8 g/10 min. The upper limit for MFR is more preferably 25 g/10 min, even more preferably 20 g/10 min and most preferably 18 g/10 min. The MFR preferably is not above this upper limit from the viewpoint of increased toughness of the composition, and it is preferably not less than the lower limit from the viewpoint of the flow property of the composition.

An acid-modified polyolefin-based resin may also be suitably used in order to increase the affinity with cellulose. The acid may be appropriately selected from among maleic acid, fumaric acid, succinic acid, phthalic acid and their anhydrides, or polycarboxylic acids such as citric acid. Preferred among these are maleic acid or its anhydride, for an increased modification rate. While the modification method is not particularly restricted, a common method involves heating the resin to above the melting point in the presence of or in the absence of a peroxide, for melt kneading. The polyolefin resin to be acid modified may be any of the aforementioned polyolefin-based resins, but polypropylene is most suitable for use.

The acid-modified polyolefin-based resin may be used alone, but it is preferably used in admixture with a non-modified polyolefin-based resin in order to adjust the modification rate of the composition. For example, when using a mixture of a non-modified polypropylene and an acid-modified polypropylene, the proportion of the acid-modified polypropylene is preferably 0.5 mass % to 50 mass % with respect to the total polypropylene. The lower limit is more preferably 1 mass %, even more preferably 2 mass %, yet more preferably 3 mass %, even yet more preferably 4 mass % and most preferably 5 mass %. The upper limit is more preferably 45 mass %, even more preferably 40 mass %, yet more preferably 35 mass %, even yet more preferably 30 mass % and most preferably 20 mass %. In order to maintain interfacial strength with the cellulose it is preferably higher than the lower limit, and in order to maintain ductility as a resin it is preferably lower than the upper limit.

The melt mass-flow rate (MFR) of the acid-modified polypropylene as measured at 230° C. with a load of 21.2 N according to ISO1133 is preferably 50 g/10 min or higher, in order to increase affinity with the cellulose interface. A more preferred lower limit is 100 g/10 min, with 150 g/10 min being more preferred and 200 g/10 min being most preferred. There is no particular upper limit, and it may be 500 g/10 min in order to maintain mechanical strength. An MFR within this range will provide an advantage of residing more easily at the interface between the cellulose and the resin.

Examples of preferred polyamide-based resins for the thermoplastic resin include, but are not limited to, polyamide 6, polyamide 11 and polyamide 12 obtained by polycondensation reaction of lactams, or polyamide 6,6, polyamide 6,10, polyamide 6,11, polyamide 6,12, polyamide 6,T, polyamide 6,T, polyamide 9,T, polyamide 10,T, polyamide 2M5,T, polyamide MXD,6, polyamide 6,C or polyamide 2M5,C obtained as copolymers between diamines such as 1,6-hexanediamine, 2-methyl-1,5-pentanediamine, 1,7-heptanediamine, 2-methyl-1-6-hexanediamine, 1,8-octanediamine, 2-methyl-1,7-heptanediamine, 1,9-nonanediamine, 2-methyl-1,8-octanediamine, 1,10-decanediamine, 1,11-undecanediamine, 1,12-dodecanediamine and m-xylylenediamine, and dicarboxylic acids such as butanedioic acid, pentanedioic acid, hexanedioic acid, heptanedioic acid, octanedioic acid, nonanedioic acid, decanedioic acid, benzene-1,2-dicarboxylic acid, benzene-1,3-dicarboxylic acid, benzene-1,4-dicarboxylic acid, cyclohexane-1,3-dicarboxylic acid and cyclohexane-1,4-dicarboxylic acid, as well as copolymers obtained by copolymerizing the foregoing (examples of which include polyamide 6,T/6,I).

More preferred among these polyamide-based resins are aliphatic polyamides such as polyamide 6, polyamide 11, polyamide 12, polyamide 6,6, polyamide 6,10, polyamide 6,11 and polyamide 6,12, and alicyclic polyamides such as polyamide 6,C and polyamide 2M5,C.

There are no particular restrictions on the terminal carboxyl group concentration of the polyamide-based resin, but the lower limit is preferably 20 μmol/g and more preferably 30 μmol/g. The upper limit for the terminal carboxyl group concentration is preferably 150 μmol/g, more preferably 100 μmol/g and even more preferably 80 μmol/g.

In the polyamide-based resin, the ratio of carboxyl terminal groups with respect to the total terminal groups ([COOH]/[total terminal groups]) is preferably 0.30 to 0.95. The lower limit for the carboxyl terminal group ratio is more preferably 0.35, yet more preferably 0.40 and most preferably 0.45. The upper limit for the carboxyl terminal group ratio is more preferably 0.90, yet more preferably 0.85 and most preferably 0.80. The carboxyl terminal group ratio is preferably 0.30 or greater from the viewpoint of dispersibility of the cellulose nanofibers (A) in the composition, and it is preferably no greater than 0.95 from the viewpoint of the color tone of the obtained composition.

The method used to adjust the terminal group concentration of the polyamide-based resin may be a publicly known method. For example, the method may be addition of a terminal group adjuster that reacts with the terminal groups, such as a diamine compound, monoamine compound, dicarboxylic acid compound, monocarboxylic acid compound, acid anhydride, monoisocyanate, monoacid halide, monoester or monoalcohol, to the polymerization solution, so as to result in the prescribed terminal group concentration during polymerization of the polyamide.

Examples of terminal group adjusters that react with terminal amino groups include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid and phenylacetic acid; and mixtures of any selected from among the foregoing. Among these, from the viewpoint of reactivity, stability of capped ends and cost, one or more terminal group adjusters selected from among acetic acid, propionic acid, butyric acid, valeric acid, caproic acid, caprylic acid, lauric acid, tridecanoic acid, myristic acid, palmitic acid, stearic acid and benzoic acid are preferred, with acetic acid being most preferred.

Examples of terminal group adjusters that react with terminal carboxyl groups include aliphatic monoamines such as methylamine, ethylamine, propylamine, butylamine, hexylamine, octylamine, decylamine, stearylamine, dimethylamine, diethylamine, dipropylamine and dibutylamine; alicyclic monoamines such as cyclohexylamine and dicyclohexylamine; aromatic monoamines such as aniline, toluidine, diphenylamine and naphthylamine; and any mixtures of the foregoing. Among these, from the viewpoint of reactivity, boiling point, capped end stability and cost, it is preferred to use one or more terminal group adjusters selected from the group consisting of butylamine, hexylamine, octylamine, decylamine, stearylamine, cyclohexylamine and aniline.

The concentration of the amino terminal groups and carboxyl terminal groups is preferably determined from the integral of the characteristic signal corresponding to each terminal group, according to $^1$H-NMR, from the viewpoint of precision and convenience. The recommended method for determining the terminal group concentration is, specifically, the method described in Japanese Unexamined Patent Publication HEI No. 7-228775. When this method is used, heavy trifluoroacetic acid is useful as the measuring solvent. Also, the number of scans in $^1$H-NMR must be at least 300, even with measurement using a device having sufficient resolving power. Alternatively, the terminal group concentration can be measured by a titration method such as described in Japanese Unexamined Patent Publication No. 2003-055549. However, in order to minimize the effects of the mixed additives and lubricant, quantitation is preferably by $^1$H-NMR.

The intrinsic viscosity [η] of the polyamide-based resin, measured in concentrated sulfuric acid at 30° C., is preferably 0.6 to 2.0 dL/g, more preferably 0.7 to 1.4 dL/g, even more preferably 0.7 to 1.2 dL/g and most preferably 0.7 to 1.0 dL/g. If the aforementioned polyamide-based resin having intrinsic viscosity in the preferred range, or the particularly preferred range, is used, it will be possible to provide an effect of drastically increasing the flow property of the resin composition in the die during injection molding, and improving the outer appearance of molded pieces.

Throughout the present disclosure, "intrinsic viscosity" is synonymous with the viscosity commonly known as the limiting viscosity. The specific method for determining the viscosity is a method in which the ηsp/c of several measuring solvents with different concentrations is measured in 96% concentrated sulfuric acid under temperature conditions of 30° C., the relational expression between each ηsp/c and the concentration (c) is derived, and the concentration is extrapolated to zero. The value extrapolated to zero is the intrinsic viscosity. The details are described in Polymer Process Engineering (Prentice-Hall, Inc 1994), p. 291-294.

The number of measuring solvents with different concentrations is preferably at least 4, from the viewpoint of precision. The concentrations of the recommended measuring solutions with different viscosities are preferably at least four: 0.05 g/dL, 0.1 g/dL, 0.2 g/dL and 0.4 g/dL.

Preferred polyester-based resins as thermoplastic resins include, but are not limited to, one or more selected from among polyethylene terephthalate (PET), polybutylene terephthalate (PBT), polyethylene naphthalate (PEN), polybutylene succinate (PBS), polybutylene succinate adipate (PBSA), polybutylene adipate terephthalate (PBAT), polyallylate (PAR), polyhydroxyalkanoic acid (PHA) (a polyester resin composed of 3-hydroxyalkanoic acid), polylactic acid (PLA) and polycarbonate (PC). Preferred polyester-based resins among these include PET, PBS, PBSA, PBT and PEN, with PBS, PBSA and PBT being more preferred.

The terminal groups of the polyester-based resin can be freely altered by the monomer ratio during polymerization and by the presence or absence and amount of stabilizer at the ends, and preferably the carboxyl terminal group ratio with respect to the total terminal groups of the polyester-based resin ([COOH]/[total terminal groups]) is 0.30 to 0.95. The lower limit for the carboxyl terminal group ratio is more preferably 0.35, yet more preferably 0.40 and most preferably 0.45. The upper limit for the carboxyl terminal group ratio is more preferably 0.90, yet more preferably 0.85 and most preferably 0.80. The carboxyl terminal group ratio is preferably 0.30 or greater from the viewpoint of dispersibility of the cellulose nanofibers (A) in the composition, and it is preferably no greater than 0.95 from the viewpoint of the color tone of the obtained composition.

Polyacetal-based resins preferred as thermoplastic resins are commonly homopolyacetals obtained from formaldehyde starting materials and copolyacetals with trioxane as the main monomer and comprising 1,3-dioxolane, for example, as a comonomer component, and although both of these may be used, copolyacetals are preferably used from the viewpoint of thermal stability during working. The amount of comonomer component (for example, 1,3-dioxolane) is more preferably in the range of 0.01 to 4 mol %. The preferred lower limit for the comonomer component amount is 0.05 mol %, more preferably 0.1 mol % and even more preferably 0.2 mol %. The upper limit is more preferably 3.5 mol %, even more preferably 3.0 mol %, yet more preferably 2.5 mol % and most preferably 2.3 mol %. The lower limit is preferably in the range specified above from the viewpoint of thermal stability during extrusion and during molding, and the upper limit is preferably in the range specified above from the viewpoint of mechanical strength.

<Binder Component (D)>

The binder component (D) is a different component from the thermoplastic resin (F), and it will typically have a number-average molecular weight of 1000 or greater. According to one aspect, the binder component (D) is composed of one or more polymers which may be homopolymers or copolymers. The binder component (D) may differ from the thermoplastic resin (F) by either being a modified form (such as an acid-modified polymer) of the same polymer as the thermoplastic resin (F), or the same polymer as the thermoplastic resin (F) but with a different molecular weight, or a polymer of a different type than the thermoplastic resin (F). The binder component (D) may be added by a method of kneading with the resin in the form of an aqueous dispersion or aqueous solution. The binder component (D) may be a commercially available reagent or product.

The lower limit for the number-average molecular weight of the binder component (D) is preferably 1000, more preferably 2000, even more preferably 3000 and most preferably 5000. The upper limit for the number-average molecular weight is not particularly restricted but is preferably 1,000,000 or lower from the viewpoint of handleability. The number-average molecular weight of the binder component (D) is preferably in this range, especially from the viewpoint of satisfactory combination of the binder component (D) and surface treatment agent (B), and satisfactory bonding or adsorption with the thermoplastic resin (F) and/or cellulose nanofibers (A) in the resin composition.

According to a typical aspect, the binder component (D) has at least one functional group that can chemically or physically bond or interact with the thermoplastic resin (F) and/or the cellulose nanofibers (A) (i.e., a "reactive functional group" according to the present disclosure). Bonding typically includes chemical bonding such as ionic bonding and covalent bonding, while interaction typically includes adsorption (chemical or physical adsorption) by intermolecular forces (such as hydrogen bonding, Van der Waals forces or electrostatic attraction). According to one aspect, the reactive functional group of the binder component (D) is a group that exhibits a bonding or absorbing property at least between hydroxyl groups. Reactive functional groups include hydroxyl, carboxyl, formyl, acyl, amino, azo, azi, imino, carbonyl, thiocarbonyl, diimide, thiol, epoxy, isocyanate, isothiocyanate, sulfone, cyano, nitro, isonitrile, vinyl, allyl, alkoxy and acid anhydride groups, and carbon-carbon double bonds, ester bonds, thioester bonds, ether bonds, thioether bonds, disulfide bonds, amide bonds, imide bonds and urethane bonds. These reactive functional groups may be single or multiple groups of one or more types in the molecule.

Preferred among these are hydroxyl, carboxyl, formyl, amino, carbonyl and isocyanate groups, from the viewpoint of reactivity with the thermoplastic resin (F) and/or cellulose nanofibers (A).

The upper limit for the binder component (D) is 200 parts by mass, preferably 150 parts by mass, more preferably 100 parts by mass and even more preferably 50 parts by mass, with respect to 100 parts by mass of the thermoplastic resin (F). The lower limit for the binder component (D) is 0.01 part by mass, preferably 0.05 part by mass, more preferably 0.1 part by 5 mass and even more preferably 5 parts by mass, with respect to 100 parts by mass of the thermoplastic resin. An upper limit in this range can help maintain strength for the resin composition as a whole. A lower limit in this range can help maintain stronger adhesiveness.

Preferred examples for the binder component (D) include, but are not particularly limited to, polyamide-based resins, polyester-based resins, polyacetal-based resins, polycarbonate-based resins, polyphenylene ether-based resins (including modified polyphenylene ethers obtained by modifying polyphenylene ether with other resins by blending or graft polymerization), polyallylate-based resins, polysulfone-based resins, polyphenylene sulfide-based resins, polyether-sulfone-based resins, polyketone-based resins, polyphenylene ether ketone-based resins, polyimide-based resins, polyamideimide-based resins, polyetherimide-based resins, polyurethane-based resins (such as thermoplastic polyurethanes), polyolefin-based resins (such as α-olefin (co)polymers), and various ionomers.

More specific examples for the binder component (D) include high-density polyethylene, low-density polyethylene (such as linear low-density polyethylene), acid-modified polyethylene, polyethylene wax, acid-modified polyethylene wax, polypropylene, polypropylene wax, acid-modified polypropylene, acid-modified polypropylene wax, polymethylpentene, cyclic olefin-based resins, poly 1-butene, poly 1-pentene, polymethylpentene, ethylene/α-olefin copolymer, ethylene-butene copolymer, EPR (ethylene-propylene copolymer), modified ethylene-butene copolymer, EEA (ethylene-ethyl acrylate copolymer), modified EEA, modified EPR, modified EPDM (ethylene-propylene-diene terpolymer), ionomers, α-olefin copolymers, modified IR (isoprene rubber), modified SEBS (styrene-ethylene-butylene-styrene copolymer), isobutylene-paramethylstyrene halide copolymer, ethylene-acrylic acid-modified polymer, ethylene-vinyl acetate copolymer and its acid-modified forms, copolymers of (ethylene and/or propylene) and (unsaturated carboxylic acids and/or unsaturated carboxylic acid esters), polyolefins obtained by forming metal salts with at least some of the carboxyl groups of copolymers of (ethylene and/or propylene) and (unsaturated carboxylic acids and/or unsaturated carboxylic acid esters), block copolymers of conjugated dienes and vinylaromatic hydrocarbons, hydrogenated forms of block copolymers of conjugated dienes and vinylaromatic hydrocarbons, copolymers of other conjugated diene compounds with nonconjugated olefins, natural rubber, various butadiene rubbers, various styrene-butadiene copolymer rubbers, isoprene rubber, butyl rubber, bromides of isobutylene and p-methylstyrene copolymers, butyl halide rubber, acrylonitrilobutadiene rubber, chloroprene rubber, ethylene-propylene copolymer rubber, ethylene-propylene-diene copolymer rubber, styrene-isoprene copolymer rubber, styrene-isoprene-butadiene copolymer rubber, isoprene-butadiene copolymer rubber, chlorosulfonated polyethylene, acrylic rubber, epichlorohydin rubber, polysulfide rubber, silicone rubber, fluorine rubber, urethane rubber, polyvinyl chloride, polystyrene, acrylic polymers such as polyacrylic acid esters and polymethacrylic acid esters, acrylonitrile-based copolymers composed mainly of acrylonitrile, acrylonitrile-butanediene-styrene (ABS) resins, acrylonitrile-styrene (AS) resins, cellulosic resins such as cellulose acetate, and saponification products of vinyl chloride/ethylene copolymer, vinyl chloride/vinyl acetate copolymer, ethylene/vinyl acetate copolymer and ethylene/vinyl acetate copolymer.

From the viewpoint of reactivity with the thermoplastic resin (F) and/or cellulose nanofibers (A), the binder component (D) is preferably a polyamide, polyester, polyurethane (especially thermoplastic polyurethane), an acryl compound such as a polyacrylic acid ester or polymethacrylic acid ester, an acrylonitrile-based copolymer composed mainly of acrylonitrile, or acid-modified polyethylene or acid-modified polypropylene.

According to one aspect, the binder component (D) is an isocyanate compound. Isocyanate compounds include polyisocyanates such as aliphatic polyisocyanates, alicyclic polyisocyanates, aromatic polyisocyanates and aromatic-aliphatic polyisocyanates, and blocked isocyanate compounds (i.e. compounds having blocked isocyanate groups where the isocyanate groups are blocked with a blocking agent). The blocking agent may be an oxime-based blocking agent, phenol-based blocking agent, lactam-based blocking agent, alcohol-based blocking agent, active methylene-based blocking agent, amine-based blocking agent, pyrazole-based blocking agent, bisulfite-based blocking agent or imidazole-based blocking agent. According to a preferred aspect, examples of isocyanate compounds include tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, 3-methylpentane-1,5-diisocyanate, isophorone diisocyanate, hydrogenated xylylene diisocyanate, 4,4'-dicyclohexylmethane diisocyanate, 1,4-cyclohexane diisocyanate, methylcyclohexylene diisocyanate, 1,3-bis(isocyanatomethyl)cyclohexane), tolylene diisocyanate (TDI), 2,2'-diphenylmethane diisocyanate, 2,4'-diphenylmethane diisocyanate, 4,4'-diphenylmethane diisocyanate (MDI), 4,4'-dibenzyl diisocyanate, 1,5-naphthylene diisocyanate, xylylene diisocyanate, 1,3-phenylene diisocyanate, 1,4-phenylene diisocyanate), dialkyldiphenylmethane diisocyanates, tetraalkyldiphenylmethane diisocyanates, α,α,α,α-tetramethylxylylene diisocyanate, and blocked isocyanate compounds obtained by reacting these isocyanate compounds with oxime-based blocking agents, phenol-based blocking agents, lactam-based blocking agents, alcohol-based blocking agents, activated methylene-based blocking agents, amine-based blocking agents, pyrazole-based blocking agents, bisulfite-based blocking agents or imidazole-based blocking agents.

According to one aspect, the binder component (D) is preferably TDI, MDI, hexamethylene diisocyanate, modified hexamethylene diisocyanate or a blocked isocyanate compound obtained using hexamethylene diisocyanate as the starting material, from the viewpoint of reactivity with the thermoplastic resin (F) and/or cellulose nanofibers (A), stability, and cost.

According to another aspect, the isocyanate compound is a polyurethane, and more preferably a modified polyurethane. A modified polyurethane may be a polyisocyanate such as an aliphatic polyisocyanate, alicyclic polyisocyanate, aromatic polyisocyanate or aromatic-aliphatic polyisocyanate, or a blocked isocyanate compound.

The dissociation temperature of the blocking groups of these blocked isocyanate compounds is at maximum preferably 210° C., more preferably 190° C. and even more preferably 150° C., from the viewpoint of reactivity and stability. The minimum is preferably 70° C., more preferably 80° C. and even more preferably 110° C. Blocking agents with blocking group dissociation temperatures in this range include methyl ethyl ketone oxime, ortho-secondary butylphenol, caprolactam, sodium bisulfite, 3,5-dimethylpyrazole and 2-methylimidazole.

According to one aspect, the binder component (D) may be the isocyanate compound-derived portion of the reaction product of an isocyanate compound with the cellulose nanofibers (A) and/or thermoplastic resin (F).

According to another aspect, a polyurethane as the binder component (D) has a number-average molecular weight of 500 or greater or 1000 or greater. The lower limit for the number-average molecular weight of the polyurethane is preferably 500, more preferably 1000 and most preferably 2000, and the upper limit is preferably 100,000, more preferably 50,000 and most preferably 30,000. According to one aspect, the polyurethane has a soft segment and a hard segment. According to another aspect, the soft segment and the hard segment may each be composed of one or more monomers (diisocyanate) or a polymer. The polyurethane may be added by a method of kneading with the resin in the form of an aqueous dispersion or water-soluble solution, for example. The polyurethane may be a commercially available reagent or product.

The polyurethane differs from the thermoplastic resin (F), for example, by being a polymer having a urethane bond with a modified (for example, acid-modified or hydroxyl-modified) form of the same polymer as the thermoplastic resin (F), or being a polymer having a urethane bond with a polymer of the same type as the thermoplastic resin (F) but with a different molecular weight. The polyurethane may be different from the cellulose nanofibers (A) by being a polymer having a urethane bond with the cellulose nanofibers (A), for example. The polyurethane is different from the surface treatment agent (B) by being a polymer having a urethane bond with the surface treatment agent (B), for example. The polyurethane may also be a polymer with one or more urethane bonds with the surface treatment agent (B), the cellulose nanofibers (A) and the thermoplastic resin (F).

According to a preferred aspect, the polyurethane is a modified polyurethane. The polyurethane may be a modified polyurethane that allows the blocking groups to dissociate at a specific temperature to regenerate isocyanate groups, or a polyisocyanate dimer or trimer, or a modified polyurethane such as an isocyanate biuret, or polymethylene polyphenyl polyisocyanate (polymeric MDI). The polyurethane may be added by a method of kneading with the resin in the form of an aqueous dispersion or water-soluble solution, for example. The polyurethane may be a commercially available reagent or product.

The number-average molar mass of a polyurethane soft segment (especially a diol segment) is preferably 500 to 50,000 g/mol and more preferably 1000 to 30,000 g/mol, from the viewpoint of obtaining satisfactory affinity with the cellulose nanofibers (A). The diol segment may be a segment of a polyether diol, polyester diol, polyether ester diol or polycarbonate diol.

Examples of polyether diols include poly(tetramethylene ether)glycol (PTMEG), poly(propylene oxide)glycol, polybutadienediol, and copolymers of the same (for example, propylene oxide and ethylene oxide copolymer, or tetrahydrofuran and ethylene oxide copolymer). Such compounds can be obtained by ring-opening polymerization of ethylene oxide, propylene oxide or tetrahydrofuran, for example.

A polyester diol can be obtained by esterification reaction between a polyether diol or dialcohol (such as ethylene glycol, propylene1,3-glycol, propylene1,2-glycol, 1,4-butanediol, 1,3-butanediol, 2-methylpropanediol, 1,5-pentanediol, 3-methyl-1,5-pentanediol, 1,6-hexanediol, neopentyl glycol, nonanediol or 1,10-decanediol), and a dicarboxylic acid (such as glutaric acid, adipic acid, pimelic acid, suberic acid, sebacic acid, dodecanedioic acid, terephthalic acid or isophthalic acid), or the corresponding transesterification reaction. Such types of polyester diols can be obtained by ring-opening polymerization of lactones (such as caprolactone, propiolactone or valerolactone).

A polycarbonate can be obtained by reaction of a polyether diol or dialcohol (such as ethylene glycol, propylene1,3-glycol, propylene1,2-glycol, 1,4-butanediol, 1,3-butanediol, 2-methylpropanediol, 1,5-pentanediol, 3-methyl-1, 5-pentanediol, 1,6-hexanediol, neopentyl glycol, nonanediol or 1,10-decanediol) with a diphenyl carbonate or phosgene.

Segments containing the following polymer structures are examples of polyurethane hard segments:
Rigid urethane segments (hard segments) of polyurethanes that are reaction products between one or more diisocyanates selected from the group consisting of 4,4'-diphenylmethane diisocyanate (MDI), toluene diisocyanate (TD) (such as the isomers 2,4-toluene diisocyanate and 2,6-toluene diisocyanate, and their mixtures), m-xylylene diisocyanate, p-xylylene diisocyanate, 1,5-naphthylene diisocyanate (NDI), 3,3'-dimethyl-4,4'-diphenylene diisocyanate (TODI), 2,2-diphenylpropane-4,4"-diisocyanate, p-phenylene diisocyanate, m-phenylene diisocyanate, 4,4'-dicyclohexylmethane diisocyanate (H12 MDI), isophorone diisocyanate (IPDI), cyclopentylene-1,3-diisocyanate, 1,6-hexamethylene diisocyanate (HMDI) and 1,4-butylene diisocyanate, and one or more chain extenders selected from the group consisting of the following chain extenders (also known as "crosslinking agents"), i.e. diols (such as ethylene glycol, propylene1,3-glycol, propylene1,2-glycol, 1,4-butanediol, 1,3-butanediol, 1,5-pentanediol, 1,6-hexanediol, 1,4-cyclohexanediol, 2,2-dimethyl-1,3-propanediol, 2,2-diethyl-1,3-propanediol, 2-ethyl-2butyl-1,3-propanediol, 2-methyl-2,4-pentanediol, 2,2,4-trimethyl-1,3-pentanediol, dihydroxy-cyclopentane, 1,4-cyclohexanedimethylol, thiodiglycol, diethylene glycol, dipropylene glycol, 2-methyl-1, 3-propanediol, 2-methyl-2-ethyl-1,3-propanediol, hydroquinone dihydroxyethyl ether and hydrogenated bisphenol A), diamines (such as ethylenediamine, hexamethylenediamine, xylylenediamine and 4,4'-diaminodiphenylmethane) and triols (such as trimethylolpropane and glycerin).

Rigid urethane segments (hard segments) of polyurethanes that are reaction products of one or more selected from the group consisting of acrylic polymers, styrene-based resins, vinyl chloride-based resins, vinylidene chloride-based resins, polyolefin-based resins, polycondensates of organic dicarboxylic acids of 4 to 12 carbon atoms and organic diamines of 2 to 13 carbon atoms, such as polyhexamethylene adipamide (nylon 6,6), polyhexamethylene azeramide (nylon 6.9), polyhexamethylene sebacamide (nylon 6,10), polyhexamethylene dodecanoamide (nylon 6,12) and polybis(4-aminocyclohexyl)methanedodecane, polycondensates of ω-amino acids (such as ω-aminoundecanoic acid) (for example, polyundecaneamide (nylon 11)), amino acid lactams containing lactam ring-opening polymers, such as polycapramide (nylon 6) as a ring-opening polymer of ε-aminocaprolactam or polylauric lactam (nylon 12) as a ring-opening polymer of ε-aminolaurolactam, polymers composed of diamines and dicarboxylic acids, polyacetal-based resins, polycarbonate-based resins, polyester-based resins, polyphenylene sulfide-based resins, polysulfone-based resins, polyether ketone-based resins, polyimide-based resins, fluorine-based resins, hydrophobic silicone-based resins, melamine-based resins, epoxy-based resins and phenol-based resins, with a chain extender.

Among these, from the viewpoint of production, the polyurethane hard segment is preferably composed of one or more selected from the group consisting of 4,4'-diphenylmethane diisocyanate (MDI), toluene diisocyanate (TDI), m-xylylene diisocyanate, p-xylylene diisocyanate, 1,5-naphthylene diisocyanate (NDI), 3,3'-dimethyl-4,4'-diphenylene diisocyanate (TODI), 2,2-diphenylpropane-4,4"-diisocyanate, p-phenylene diisocyanate, m-phenylene diisocyanate, 4,4'-dicyclohexylmethane diisocyanate (H12 MDI), isophorone diisocyanate (IPDI), cyclopentylene-1,3-diisocyanate, 1,6-hexamethylene diisocyanate (HMDI) and 1,4-butylene diisocyanate.

From the viewpoint of obtaining satisfactory affinity with the thermoplastic resin (F), the number-average molar mass of the polyurethane hard segment is preferably 300 to 10,000 g/mol and more preferably 500 to 5000 g/mol.

According to a preferred aspect, the polyurethane is a polyurethane having a soft segment as the hydrophilic segment and a hard segment as the hydrophobic segment, from the viewpoint of satisfactory affinity with the cellulose nanofibers (A) and an anti-aggregation effect, by notably exhibiting both the hydrophilicity of the soft segment and the hydrophobicity of the hard segment.

The preferred amount of the polyurethane in the dispersion according to one aspect is in the range of 0.1 to 50 mass % of the polyurethane with respect to the total dispersion. The upper limit is more preferably 45 mass %, even more preferably 40 mass %, yet more preferably 35 mass % and most preferably 30 mass %. There is no particular restriction on the lower limit, but it is preferably 0.1 mass %, more preferably 1 mass % and most preferably 10 mass %. If the upper limit for the amount of polyurethane is as specified above, then precipitation of the dispersion can be inhibited and the cellulose nanofiber aqueous dispersion and dried cellulose nanofibers can maintain a homogeneous form. If the lower limit for the amount of polyurethane is as specified above, satisfactory mechanical properties can be obtained for the resin composition and molded resin.

The preferred amount of polyurethane in the cellulose nanofiber aqueous dispersion, the dried cellulose nanofibers, the resin composition and the molded resin, according to one aspect, is in the range of 0.1 to 100 parts by mass of the polyurethane with respect to 100 parts by mass of the cellulose nanofibers (A). The preferred upper limit is more preferably 80 parts by mass, even more preferably 70 parts by mass, yet more preferably 50 parts by mass and most preferably 40 parts by mass. There is no particular restriction on the lower limit, but it is preferably 0.1 part by mass, more preferably 0.5 part by mass and most preferably 1 part by mass. If the upper limit for the amount of polyurethane is as specified above, it will be possible to inhibit plasticization of the thermoplastic resin (F) and to maintain satisfactory strength. If the lower limit for the amount of polyurethane is as specified above it will be possible to increase redispersibility of the cellulose nanofibers (A).

The amount of polyurethane in the resin composition and molded resin according to this aspect is in the range of 0.1 to 50 mass % of the polyurethane with respect to the total resin composition. The upper limit is more preferably 45 mass %, even more preferably 40 mass %, yet more preferably 30 mass % and most preferably 20 mass %. There is no particular restriction on the lower limit, but it is preferably 0.1 mass %, more preferably 0.5 mass % and most preferably 1 mass %. If the upper limit for the amount of polyurethane is as specified above, it will be possible to inhibit plasticization of the resin composition as a whole and to maintain satisfactory strength. If the lower limit for the amount of polyurethane is as specified above, it will be possible to increase dispersibility of the cellulose nanofibers (A) in the thermoplastic resin, and to maintain strong adhesiveness.

According to one aspect, the amount of the binder component (D) (especially polyurethane) in the dispersion can be confirmed by a method commonly known to those skilled in the art (more specifically, the following method). The dispersion is subjected to salting out or centrifugal separation. This allows separation of the precipitate (polyurethane) and the rest of the dispersion other than the polyurethane, so that the content of the isolated dry polyurethane can be calculated. The molecular structure of the polyurethane can be qualified (identified) and the molecular weight measured, using pyrolysis GC-MS, $^1$H-NMR or $^{13}$C-NNR.

The amount of polyurethane in the cellulose nanofiber aqueous dispersion and in the dried cellulose nanofibers can be confirmed by a method commonly known to those skilled in the art (more specifically, the following method). For dried cellulose nanofibers, water is added to prepare a cellulose nanofiber aqueous dispersion. The cellulose nanofiber aqueous dispersion is then centrifuged. This allows separation into a precipitate (cellulose nanofibers and polyurethane) and a surface treatment agent dispersion. The precipitate is dissolved in a solvent that dissolves the polyurethane, separating a soluble portion 1 (polyurethane) and an insoluble portion 1 (cellulose). The soluble portion 1 is reprecipitated with a solvent that does not dissolve the polyurethane, to isolate the polyurethane. The isolated polyurethane may be qualitatively and quantitatively analyzed by the methods described above.

The amount of polyurethane in the resin composition and in the molded resin can be confirmed by a method commonly known to those skilled in the art (more specifically, the following method). When the resin composition is dissolved in a solvent that dissolves the resin using a fragment of the resin composition and molded article, a soluble portion 1 (resin and surface treatment agent) and an insoluble portion 1 (cellulose, polyurethane and surface treatment agent) separate. The separated insoluble portion 1 is dissolved in a solvent that dissolves the polyurethane, separating a soluble portion 2 (polyurethane and surface treatment agent) and an insoluble portion 2 (cellulose). The soluble portion 2 is reprecipitated with a solvent that does not dissolve the polyurethane but dissolves the surface treatment agent, isolating the polyurethane. The isolated polyurethane may be qualitatively and quantitatively analyzed by the methods described above.

According to a typical aspect, the thermoplastic resin (F) and binder component (D) differ in their molecular weight and/or functional group structure. Examples of preferred combinations for the thermoplastic resin (F) and binder component (D) include a polyamide resin and polyurethane, a polyamide resin and polyethylene glycol, and a polyamide resin and polyacryl.

The method of adding the binder component (D) during preparation of the resin composition is also not particularly restricted, and it may be a method of premixing and melt kneading the thermoplastic resin (F), cellulose nanofibers (A), binder component (D) and surface treatment agent (B), a method of first adding the binder component (D) and surface treatment agent (B) to the thermoplastic resin (F) and pre-kneading if necessary and then adding the cellulose nanofibers (A) and melt kneading, or a method of premixing the cellulose nanofibers (A), binder component (D) and surface treatment agent (B) and then melt kneading the mixture with the thermoplastic resin (F). Also effective is a method of adding the binder component (D) and surface treatment agent (B) to a dispersion comprising the cellulose nanofibers (A) dispersed in water, drying the mixture to prepare a cellulose formulation, and the adding the formulation to the thermoplastic resin (F).

<Antioxidant (E)>

The antioxidant (E) contributes to satisfactory heat resistance of the resin composition and molded resin, by inhibiting oxidative degradation of the thermoplastic resin (F) in the resin composition during production of the resin composition using the cellulose nanofibers (A) and surface treatment agent (B), and the cellulose nanofiber composition. Using the antioxidant (E) to inhibit degradation of the cellulose nanofibers (A) (that is, the polymer with a very large surface area) is particularly advantageous for improving the heat resistance of the cellulose nanofiber composition and the cellulose nanofiber resin composition.

The antioxidant (E) used may be any compound known to those skilled in the art to be useful as an antioxidant for thermoplastic resins. An antioxidant has the effect of preventing oxidative degradation of the resin by itself in the presence of oxygen. Antioxidants include radical scavengers and peroxide decomposers. Radical scavengers include hindered phenol-based antioxidants and hindered amine-based light stabilizers (HALS). Peroxide decomposers include phosphorus-based antioxidants and sulfur-based antioxidants. The antioxidant may also be a compound with two or more antioxidant sites in the molecule. Examples of such compounds include compounds with both a hindered phenol structure and a thioether structure (which also encompasses hindered phenol-based antioxidants and thioether-based antioxidants). These antioxidants may be used either alone or in combinations of two or more. For example, the antioxidant may also be a compound antioxidant (i.e. two or more antioxidants pre-blended in an appropriate manner).

From the viewpoint of the effect of preventing degradation by heat, the antioxidant is preferably a hindered phenol-based antioxidant, sulfur-based antioxidant or phosphorus-based antioxidant, and more preferably a phosphorus-based antioxidant or hindered phenol-based antioxidant. According to one aspect, a phosphorus-based antioxidant and/or hindered phenol-based antioxidant is preferably used together with a hindered amine-based light stabilizer (HALS). According to another aspect, a hindered phenol-based antioxidant is preferred. The antioxidant may be mixed with the cellulose nanofibers (A) in the form of an aqueous dispersion that contains the surface treatment agent (B) at high concentration, for example. The antioxidant (E) may be a commercially available reagent or product.

When a phosphorus-based antioxidant and/or hindered phenol-based antioxidant is used together with a hindered amine-based light stabilizer (HALS), the proportion is not particularly restricted but is preferably 1/5 to 2/1 and more preferably 1/2 to 1/1, as the mass ratio: (total of phosphorus-based antioxidant and hindered phenol-based antioxidant)/hindered amine-based light stabilizer (HALS).

A hindered phenol-based antioxidant is a compound having one or more phenol structures in the molecule (especially a phenol structure with a steric hindrance-producing substituent). Hindered phenol-based antioxidants (optionally with structures encompassed by thioether-based antioxidants) include pentaerythritoltetrakis(3-(3,5-di-tert-butyl-4-hydroxyphenyl)propionate), thiodiethylenebis[3-(3,5-di-tert-butyl-4-hydroxyphenyl)propionate], octadecyl-3-(3,5-di-tert-butyl-4-hydroxyphenyl)-propionate, N,N'-hexane-1,6-diylbis(3-(3,5-di-tert-butyl-4-hydroxyphenylpropionamide)), benzenepropanoic acid, 3,5-bis(1,1-dimethyl-ethyl)-4-hydroxy-C7 to C9 branched alkyl esters, 3,3',3",5,5',5"-hexa-tert-butyl-α,α',α"-(mesitylene-2,4,6-tolyl)tri-p-cresol, 4,6-bis(octylthiomethyl)-o-cresol, ethylenebis(oxyethylene)bis-(3-(5-tert-butyl-4-hydroxy-m-tolyl)propionate), hexamethylenebis(3-(3,5-di-tert-butyl-4-hydroxyphenyl)propionate), 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazin-2-ylamino)phenol, 4,6-bis(dodecylthiomethyl)-o-cresol, 3,4-dihydro-2,5,7,8-tetramethyl-2-(4,8,12-trimethyltridecyl)-2H-1-benzopyran-6-ol, 2',3-bis[[3-[3,5-di-tert-butyl-4-hydroxyphenyl]propionyl]]propiono hydrazide, 2,2-bis{[3-(dodecylthio)-1-oxopropoxy]methyl}propane-1,3-diylbis[3-(dodecylthio)propionate] and di(tridecyl)3,3'-thiodipropionate.

Commercially available reagents include IRGANOX 1010, IRGANOX 1035, IRGANOX 1076, IRGANOX 1098, IRGANOX 1135, IRGANOX 1330, IRGANOX 1520 L, IRGANOX 245, IRGANOX 259, IRGANOX 3114, IRGANOX 565, IRGANOX 1726, IRGANOX E201 and IRGANOX MD1024 (all available from BASF Japan), ADEKASTAB A0412S and ADEKASTAB A0503 (both available from Adeka Corp.), and SUMITZER GS, SUMILIZER GM and SUMILIZER GA80 (all available from Sumitomo Chemical Co., Ltd.).

A phosphorus-based antioxidant is a compound having a phosphorus-containing structure such as a phosphorous acid ester structure in the molecule. The phosphorus-based antioxidant may be a phosphite-based or phosphonite-based compound. Phosphorus-based antioxidants include tris(2,4-di-ter-butylphenyl)phosphite, 3,9-bis(octadecyloxy)-2,4,8,10-tetraoxa-3,9-diphosphaspiro[5.5]undecane, 3,9-bis(2,6-di-tert-butyl-4-methylphenoxy)-2,4,8,10-tetraoxa-3,9-diphosphaspiro[5.5]undecane, 2,2'-methylenebis(4,6-di-tert-butylphenyl)2-ethylhexyl phosphite, tris(2,4-di-tert-butylphenyl)phosphite, tris(nonylphenyl)phosphite, tetra-C12-15-alkyl(propane-2,2-diylbis(4,1-phenylene))bis(phosphite), 2-ethylhexyldiphenyl phosphite, isodecyldiphenyl phosphite, triisodecyl phosphite and triphenyl phosphite.

Commercially available reagents include Irgafos168 (available from BASF Japan), and ADEKASTAB PEP8, ADEKASTAB PEP36, ADEKASTAB HP10, ADEKASTAB 2112, ADEKASTAB 1178, ADEKASTAB 1500, ADEKASTAB C, ADEKASTAB 135A, ADEKASTAB 3010, and ADEKASTAB TPP (all available from Adeka Corp.).

Sulfur-based antioxidants include compounds with a thioether structure (i.e. thioether-based antioxidants), and compounds with a thioester structure (i.e. thioester-based antioxidants). Tioether-based antioxidants include thiodiethylenebis[3-(3,5-di-tert-butyl-4-hydroxyphenyl)propionate], 4,6-bis(octylthiomethyl)-o-cresol, 2,6-di-tert-butyl-4-(4,6-bis(octylthio)-1,3,5-triazin-2-ylamino)phenol, 4,6-bis(dodecylthiomethyl)-o-cresol, 2,2-bis{[3-(dodecylthio)-1-oxopropoxy]methyl}propane-1,3-diylbis[3-(dodecylthio)propionate] and di(tridecyl)3,3'-thiodipropionate. Thioester-based antioxidants include didodecyl-3,3'-thiodipropionate and dioctadecyl 3,3'-thiodipropionate ester.

Commercially available reagents include IRGANOX PS800FL and IRGANOX PS802FL (both available from BASF Japan).

A hindered amine-based light stabilizer (HALS) is preferably a compound having a 2,2,6,6-tetramethylpiperidine structure in the molecule. Light stabilizers include [1,6-hexanediamine, N,N'-bis(2,2,6,6-tetramethyl-4-piperidinyl)-polymer and reaction products of 2,4,6-trichloro-1,3,5-triazine, N-butyl-1-butaneamine and N-butyl-2,2,6,6-tetramethyl-4-piperidinamine], poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]), poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-5-piperidinyl)imino]]), reaction products of dimethyl butanedioate esters and 4-hydroxy-2,2,6,6-tetramethyl-1-piperidine ethanol, bis(1,2,2,6,6-pentamethyl-4-piperidinyl)-2-butyl-2-(4-hydroxy-3,5-di-tert-butylbenzyl)propane dioate, bis(1,2,2,6,6-pentamethyl-4-piperidyl)sebacate+methyl 1,2,2,6,6-pentamethyl-4-piperidyl sebacate, bis(2,2,6,6-tetramethyl-4-piperidinyl)sebacate, decanedioic acid, bis(2,2,6,6-tetramethyl-1-(octyloxy)-4-piperidinyl) ester, reaction products of 1,1-dimethylethyl hydroperoxide and octane, bis(1,2,2,6,6-pentamethyl-4-piperidinyl)-[[3,5-bis(1,1-dimethylethyl)-4-hydroxyphenyl]methyl]butyl malonate, phenol, 2-(2H-benzotriazol-2-yl)-4-methyl-6-dodecyl, branched and straight-chain bis(1,2,2,6,6-pentamethyl-4-piperidinyl)sebacate, methyl(1,2,2,6,6-pentamethyl-4-piperidinyl)sebacate, bis(2,2,6,6-tetramethyl-4-piperidyl)sebacate, tetrakis(1,2,2,6,6-pentamethyl-4-piperidyl)butane-1,2,3,4-tetracarboxylate, tetrakis(2,2,6,6-tetramethyl-4-piperidyl)butane-1,2,3,4-tetracarboxylate, 1,2,3,4-butanetetracarboxylic acid, tetramethyl ester, reaction products of 1,2,2,6,6-pentamethyl-4-piperidinol and β,β,β',β'-tetramethyl-2,4,8,10-tetraoxaspiro[5,5]undecane-3,9-diethanol, 1,2,3,4-butanetetracarboxylic acid, tetramethyl ester, reaction products of 2,2,6,6-tetramethyl-4-piperidinol and, tetramethyl-2,4,8,10-tetraoxaspiro[5.5]undecane-3,9-diethanol, and bis(1,2,2,6,6-pentamethyl-4-piperidyl)sebacate, bis(2,2,6,6-tetramethyl-4-piperidyl)sebacate, bis(1-undecanoxy-2,2,6,6-tetramethylpiperidin-4-yl)carbonate, 1,2,2,6,6-pentamethyl-4-piperidyl methacrylate and 2,2,6,6-tetramethyl-4-piperidyl methacrylate.

Commercially available reagents include CHIMASSORB 2020FDL, CHIMASSORB 944FDL, CHIMASSORB 944LD, TINUVIN 622SF, TINUVIN PA144, TINUVIN 765, TINUVIN 770DF, TINUVIN XT55FB, TINUVIN 111FDL, TINUVIN 783FDL, TINUVIN 791FB, TINUVIN 249, TINUVIN 123, TINUVIN 144, TINUVIN 171, TINUVIN 292, TINUVIN 5100 and TINUVIN 770DF (all available from BASF Japan), and ADEKASTAB LA52, ADEKASTAB LA57, ADEKASTAB LA63, ADEKASTAB LA68, ADEKASTAB LA72, ADEKASTAB LA77Y, ADEKASTAB LA81, ADEKASTAB LA82, ADEKASTAB LA87, ADEKASTAB LA402AF and ADEKASTAB LA502XP (all available from Adeka Corp.).

A compound antioxidant is typically a combination of a bisphenol-based antioxidant and a phosphorus-based antioxidant. Commercially available reagents as compound antioxidants include ADEKASTAB A611, ADEKASTAB A612, ADEKASTAB A613, ADEKASTAB A512. ADEKASTAB A015, ADEKASTAB A018, ADEKASTAB A037, ADEKASTAB A0412S, ADEKASTAB A0503 and ADEKASTAB A (all available from Adeka Corp.), and SUMILIZER GP (available from Sumitomo Chemical Co., Ltd.).

Preferred among these, from the viewpoint of improved thermal stability of the composition of the cellulose and surface treatment agent, are pentaerythritoltetrakis(3-(3,5-di-tert-butyl-4-hydroxyphenyl)propionate), octadecyl-3-(3,5-di-tert-butyl-4-hydroxyphenyl)-propionate, N,N'-hexane-1,6-diylbis(3-(3,5-di-tert-butyl-4-hvdroxyphenylpropionamide)), ethylenebis(oxyethylene) bis-(3-(5-tert-butyl-4-hydroxy-m-tolyl)propionate) and 2',3-bis[[3-[3,5-di-tert-butyl-4-hydroxyphenyl]propionyl]] propionohydrazide, with commercially available reagents including IRGANOX 1010. IRGANOX 1076, IRGANOX 1098, IRGANOX 245 and IRGANOX MD1024 (all available from BASF Japan).

From the viewpoint of improving the odor property during preparation of the resin composition and the moldability during molding, the lower limit for the molecular weight of the antioxidant (E) is preferably 200, more preferably 250, even more preferably 300 and most preferably 500. From the viewpoint of handleability, the upper limit for the molecular weight is preferably 10,000, more preferably 5000, even more preferably 3000 and most preferably 1000. The molecular weight of the antioxidant (E) is preferably in the range specified above in order to ensure satisfactory affinity with the surface treatment agent (B).

According to one aspect, the amount of the antioxidant (E) is preferably in the range of 0.1 to 2 parts by mass with respect to 100 parts by mass of the thermoplastic resin. Limiting the amount of stabilizer added to within this range can increase the handleability of the resin composition.

According to another aspect, the preferred amount of the antioxidant (E) in the cellulose nanofiber composition (either an aqueous dispersion or dried form) is 0.1 to 20 mass % with respect to the total composition. The upper limit is more preferably 15 mass %, even more preferably 10 mass %, yet more preferably 5 mass % and most preferably 3 mass %. There is no particular restriction on the lower limit, but it is preferably 0.0005 mass %, more preferably 0.005 mass % and most preferably 0.01 mass %.

The preferred amount of the antioxidant (E) for both the resin composition and the molded resin is in the range of 0.01 to 5 mass % of the antioxidant (E) with respect to the total resin composition or molded resin. The upper limit is preferably 4 mass %, more preferably 3 mass %, even more preferably 2 mass % and most preferably 1 mass %. There is no particular restriction on the lower limit, but it is preferably 0.02 mass %, more preferably 0.03 mass % and most preferably 0.05 mass %. Such an upper limit on the antioxidant (E) will inhibit plasticization of the resin composition, and can maintain satisfactory strength. Such a lower limit for the amount of the antioxidant (E) can increase the heat resistance of the cellulose nanofibers (A) in the thermoplastic resin (F).

The preferred amount of the antioxidant (E) for the cellulose nanofiber composition (either an aqueous dispersion or dried form) in both the resin composition and molded resin is in the range of 0.01 to 100 parts by mass of the antioxidant (E) with respect to 100 parts by mass of the surface treatment agent (B). The upper limit is preferably 60 parts by mass, more preferably 30 parts by mass, even more preferably 15 parts by mass, yet more preferably 8 parts by mass and most preferably 5 parts by mass. There is no particular restriction on the lower limit, but it is preferably 0.02 part by mass, more preferably 0.05 part by mass and most preferably 0.1 part by mass. Such an upper limit for the amount of antioxidant (E) will inhibit plasticization of the resin composition and molded resin and can maintain satisfactory strength. If the lower limit for the amount of the antioxidant (E) is as specified above, it will be possible to increase the heat resistance of the composition containing the cellulose nanofibers, surface treatment agent and antioxidant.

The amount of the antioxidant (E) in the cellulose nanofiber composition (either an aqueous dispersion or dried form) can be easily confirmed by a method commonly known to those skilled in the art. The confirmation method is not restricted, and the following is an example. The dried cellulose nanofibers are subjected to a procedure including addition of an organic solvent capable of dissolving the antioxidant (E), extraction, and rinsing. The extract or rinsing solution is concentrated and the surface treatment agent and antioxidant are quantified. The concentrated antioxidant (E) can be identified and its molecular weight measured using a pyrolysis GC-MS, $^1$H-NMR or $^{13}$C-NMR analyzer.

The amount of antioxidant (E) in both the resin composition and the molded resin can be easily confirmed by a method commonly known to those skilled in the art. The confirmation method is not restricted, and the following is an example. When the resin composition is dissolved in a solvent that dissolves the thermoplastic resin (F), using a fragment of the resin composition or molded resin, a soluble portion 1 (resin, surface treatment agent and antioxidant) and an insoluble portion 1 (cellulose, surface treatment agent and antioxidant) separate. The soluble portion 1 is reprecipitated with a solvent that does not dissolve the resin but dissolves the surface treatment agent, separating an insoluble portion 2 (resin) and soluble portion 2 (surface treatment agent and antioxidant). The insoluble portion 1 is dissolved in a solvent that dissolves the surface treatment agent and antioxidant, separating a soluble portion 3 (surface treatment agent and antioxidant) and an insoluble portion 3 (cellulose). The soluble portion 2 and soluble portion 3 are concentrated (drying, air-drying, reduced pressure drying) to allow quantitation of the antioxidant (E). Identification and molecular weight measurement of the concentrated antioxidant (E) can be carried out by the methods described above.

The method of adding the antioxidant (E) during preparation of the cellulose nanofiber composition is not particularly restricted. For example, the method of preparing the cellulose nanofiber aqueous dispersion may be, but is not limited to, a method in which the surface treatment agent (B) is dissolved in water, and the antioxidant (E) and cellulose nanofibers (A) are added to and mixed with the obtained surface treatment agent aqueous solution to obtain a cellulose nanofiber aqueous dispersion, a method in which the cellulose nanofibers (A) are dispersed in water and the surface treatment agent (B) and antioxidant (E) are added to and mixed with the obtained cellulose nanofiber (A) dispersion to obtain a dispersion, or a method in which the antioxidant (E) is dissolved in a solvent that can dissolve it, and the surface treatment agent (B) is separately dissolved in water and added to and mixed with the obtained aqueous solution of the surface treatment agent, after which the cellulose nanofibers (A) are added and mixed to obtain a cellulose nanofiber aqueous dispersion.

The method of adding the antioxidant (E) during preparation of the resin composition is also not particularly restricted, and it may be a method of premixing and melt kneading the thermoplastic resin (F), cellulose nanofibers (A), surface treatment agent (B) and antioxidant (E), a method of first adding the surface treatment agent (B) and antioxidant (E) to the thermoplastic resin (F) and pre-kneading if necessary and then adding the cellulose nanofibers (A) and melt kneading, a method of premixing the cellulose nanofibers (A), surface treatment agent (B) and antioxidant (E) and then melt kneading the mixture with the thermoplastic resin (F), or a method of adding the surface treatment agent (B) and antioxidant (E) into a dispersion comprising the cellulose nanofibers (A) dispersed in water, drying the mixture to prepare dry cellulose, and then adding the dried product to the thermoplastic resin (F).

<Other Components>

Other components that may be used for the invention will now be described in detail. According to one aspect, the cellulose nanofiber aqueous dispersion also includes cellulose whiskers in addition to the cellulose fibers. For the purpose of this disclosure, cellulose whiskers are crystalline cellulose remaining after using pulp or the like as starting material, cutting it and then dissolving the amorphous portion of the cellulose in an acid such as hydrochloric acid or sulfuric acid, and their length/diameter ratio (L/D ratio) is less than 20. The mean diameter of the cellulose whiskers is preferably 1000 nm or smaller, 500 nm or smaller or 200 mu or smaller, and preferably 10 nm or larger, 20 nm or larger or 30 nm or larger. The mean diameter is the value measured by the same method as for the mean fiber size of the cellulose nanofibers (A).

The upper limit for the L/D of the cellulose whiskers is more preferably 15, even more preferably 10 and most preferably 5. The lower limit is not particularly restricted, but may be greater than 1. The L/D ratio of the cellulose whiskers is preferably in the range specified above in order for the resin composition to exhibit satisfactory slidability. According to one aspect, the cellulose whiskers may have the same properties as mentioned above for the cellulose nanofibers (A) (in unmodified or modified form), except for their size.

The content of cellulose whiskers in the cellulose nanofiber aqueous dispersion, dried cellulose nanofibers, resin composition and molded resin is preferably 0.1 part by mass or greater, 0.3 part by mass or greater or 0.5 part by mass or greater, and preferably 30 parts by mass or less, 20 parts by mass or less or 10 parts by mass or less, with respect to 100 parts by mass of the cellulose nanofibers (A).

According to one aspect, the content of the cellulose whiskers with respect to the total cellulose nanofiber aqueous dispersion or dried cellulose nanofibers is preferably within this range from the viewpoint of uniformly dispersing the cellulose nanofibers.

According to another aspect, the content of the cellulose whiskers with respect to the resin composition or molded resin is preferably within the aforementioned range from the viewpoint of obtaining uneven orientation of the cellulose nanofibers so as to obtain uniform mechanical properties.

According to yet another aspect, the content of the cellulose whiskers with respect to 100 parts by mass of the thermoplastic resin (F) is preferably 0.5 part by mass or greater, 0.8 part by mass or greater or 1.0 part by mass or greater, and preferably 20 parts by mass or less, 10 parts by mass or less or 5 parts by mass or less, from the viewpoint of maintaining the properties of the thermoplastic resin.

The resin composition of this embodiment may also contain various stabilizers used in thermoplastic resins of the prior art, in ranges that do not interfere with the object of the embodiment. Examples of stabilizers include, but are not limited to, inorganic fillers, heat stabilizers and lubricant oils. These may be used alone, or two or more may be used in combination. They may be commercially available reagents or products.

The inorganic filler may be, but is not particularly limited to, one or more compounds selected from the group consisting of filamentous particles, tabular particles and inorganic pigments. According to one aspect, the filamentous particles and tabular particles may be particles with a mean aspect ratio of 5 or greater. The amount of inorganic filler added is not particularly restricted, but it is preferably in the range of 0.002 to 50 parts by mass of the inorganic filler with respect to 100 parts by mass of the thermoplastic resin. Limiting the amount of inorganic filler added to within this range can increase the handleability of the resin composition.

The lower limit for the molecular weight of the lubricant oil is preferably 100, more preferably 400 and even more preferably 500. The upper limit is preferably 5,000.000, more preferably 2,000,000 and even more preferably 1,000,000. The lower limit for the melting point of the lubricant oil is preferably −50° C., more preferably −30° C. and even more preferably −20° C. The upper limit for the melting point of the lubricant oil is preferably 50° C., more preferably 30° C. and even more preferably 20° C. A molecular weight of 100 or greater will tend to result in satisfactory slidability of the lubricant oil. If the molecular weight is 5,000,000 or lower, and especially 1,000,000 or lower, dispersion of the lubricant oil will tend to be satisfactory and the abrasion resistance will tend to be improved. If the melting point is −50° C. or higher, the fluidity of the lubricant oil on the molded article surface will be maintained and abrasive wear will be reduced, thus tending to improve the abrasion resistance of the molded article. By limiting the melting point to 50° C. or lower, kneading with the thermoplastic resin is facilitated and dispersibility of the lubricant oil tends to be improved. It is from this viewpoint that the molecular weight and melting point of the lubricant oil are preferably within the ranges specified above. According to a preferred aspect, the melting point is a temperature 2.5° C. lower than the pour point of the lubricant oil. The pour point can be measured according to JIS K2269.

Lubricant oils that may be used for this embodiment include, but are not limited to, any substances that can improve the abrasion/wear properties of the molded thermoplastic resin, examples being natural oils such as engine oils and cylinder oils, synthetic hydrocarbons including paraffinic oils (such as Diana Process Oil PS32 by Idemitsu Kosan Co., Ltd.), naphthene-based oils (such as Diana Process Oil NS90S by Idemitsu Kosan Co., Ltd.) and aroma oils (such as Diana Process Oil AC12 by Idemitsu Kosan Co., Ltd.), and silicone-based oils (such as G30 Series by Shin-Etsu Chemical Co., Ltd.) (polydimethylsiloxane and other silicone oils, or silicone rubber or modified silicone rubber), appropriately selected among common commercially available lubricant oils, and used either directly or in appropriate combinations as desired. Paraffinic oils and silicone-based oils are preferred because they are superior from the viewpoint of slidability, and are also readily available in the industry. These lubricant oils may be used alone or in combinations.

The lower limit for the lubricant oil content is not particularly restricted, but it is preferably 0.1 part by mass, more preferably 0.2 part by mass and even more preferably 0.3 part by mass, with respect to 100 parts by mass of the thermoplastic resin (F). The upper limit for the content is not particularly restricted, but it is preferably 5.0 parts by mass, more preferably 4.5 parts by mass and even more preferably 4.2 parts by mass. If the lubricant oil content is within this range, the abrasion resistance of the cellulose nanofiber resin composition will tend to be improved. Sufficient slidability can be ensured and the abrasion resistance tends to be improved particularly when the lubricant oil content is 0.1 part by mass or greater. If the lubricant oil content is 5.0 parts by mass or lower, softening of the resin can be reduced, and the cellulose nanofiber resin composition tends to be assured of strength allowing it to withstand use in a gear, for example.

The lubricant oil content in the cellulose nanofiber resin composition of this embodiment is preferably within the range specified above from the viewpoint of improving the wear properties during sliding, and exhibiting excellent stable slidability.

<Tensile Yield Strength Increase>

With the resin composition of the invention, the tensile yield strength tends to be drastically improved compared to the thermoplastic resin (F) alone. The tensile yield strength increase is the value calculated by the following formula (1):

$$\text{Tensile yield strength increase} = (b/c-1)/a \qquad (1),$$

from the mass content of the cellulose nanofibers (A) in the resin composition (a) (i.e. the value with the total mass of the resin composition as 1), the tensile yield strength of the resin composition (b) and the tensile yield strength of the thermoplastic resin (F) (c). A larger value corresponds to more excellent dispersibility of the cellulose nanofibers (A) in the resin composition, and effective functioning of the cellulose as a filler.

The lower limit for the tensile yield strength increase is preferably 0.6, more preferably 0.7, even more preferably 0.8, yet more preferably 0.9 and most preferably 1.0. The tensile yield strength increase is most preferably greater than 1.0. The upper limit for the tensile yield strength increase is not particularly restricted, but from the viewpoint of easier production it is preferably 30.0 and more preferably 20.0, for example.

<Flexural Modulus Increase>

With the resin composition of the invention, the flexural modulus tends to be drastically improved compared to the thermoplastic resin (F) alone. The flexural modulus increase is the value calculated by the following formula (2):

$$\text{Flexural modulus increase} = (d/e - 1)/a \quad (2),$$

from the mass content of the cellulose nanofibers (A) in the resin composition (a), the flexural modulus of the resin composition (d) and the flexural modulus of the thermoplastic resin (F) (e). A larger value corresponds to more excellent dispersibility of the cellulose nanofibers (A) in the resin composition, and effective functioning of the cellulose nanofibers (A) as a filler. The lower limit for the flexural modulus increase is preferably 2.3, more preferably 2.5, even more preferably 2.8 and most preferably 3.0. The flexural modulus increase is most preferably greater than 3.0. The upper limit for the flexural modulus increase is not particularly restricted, but from the viewpoint of easier production it is preferably 30.0 and more preferably 20.0, for example.

The apparatus used to produce the resin composition of the embodiment is not restricted, and any commonly employed kneader may be used. Examples of such kneaders to be used include, but are not limited to, single-screw and multiscrew kneading extruders, rolls and Banbury mixers. A twin-screw extruder equipped with a reduced pressure device and a side feeder is preferred.

The resin composition of the invention may be provided in a variety of different forms. Specifically, it may be in the form of resin pellets, sheets, fiber, plates or rods, with the form of resin pellets being more preferred for easier post-working and easier transport. The preferred form of pellets may be round, elliptical or cylindrical, depending on the system used for cutting during extrusion. Pellets cut by the method known as "underwater cutting" are usually round, pellets cut by the method known as "hot cutting" are usually round or elliptical, and pellets cut by the method known as "strand cutting" are usually cylindrical. The preferred size for round pellets is 1 mm to 3 mm, as the diameter of the pellets. The preferred diameter for cylindrical pellets is 1 mm to 3 mm, and the preferred length is 2 mm to 10 mm. The diameter and length are preferably above the specified lower limits from the viewpoint of operational stability during extrusion, and they are preferably lower than the specified upper limits from the viewpoint of seizing in the molding machine in post-working.

The following methods are specific examples of methods for producing a resin composition.

(1) A method of using a single-screw or twin-screw extruder for melt kneading of a mixture of cellulose nanofibers, a surface treatment agent, a thermoplastic resin and optional components as necessary, and extrusion into a strand form, and cooling solidification in a water bath to obtain molded pellets.

(2) A method of using a single-screw or twin-screw extruder for melt kneading of a mixture of cellulose nanofibers, a surface treatment agent, a thermoplastic resin and optional components as necessary, and extrusion into a rod-like or tubular form and cooling to obtain an extrusion molded article.

(3) A method of using a single-screw or twin-screw extruder for melt kneading of a mixture of cellulose nanofibers, a surface treatment agent, a thermoplastic resin and optional components as necessary, and extrusion with a T-die to obtain a molded sheet or film.

The following methods are specific examples of methods for melt kneading a mixture of the cellulose nanofibers, surface treatment agent and thermoplastic resin.

(1) A method of melt kneading together the thermoplastic resin, the cellulose nanofibers mixed in the desired proportion, and the surface treatment agent mixed powder.

(2) A method of melt kneading the thermoplastic resin and if necessary the surface treatment agent, and then adding the cellulose nanofiber powder mixed in the desired proportion and if necessary the surface treatment agent, and melt kneading the mixture.

(3) A method of melt kneading the thermoplastic resin, the cellulose nanofibers mixed in the desired proportion, the surface treatment agent mixed powder and water, and then mixing the cellulose nanofibers mixed in the desired proportion and water, and if necessary the surface treatment agent, and melt kneading them together.

(4) A method of melt kneading the thermoplastic resin and if necessary the surface treatment agent, and then adding the thermoplastic resin mixed in the desired proportion, the cellulose nanofibers, the surface treatment agent mixed powder and water, and melt kneading the mixture.

(5) A method of melt kneading with the additions of (1) to (4) above, divided at the top and sides in any desired proportion, using a single-screw or twin-screw extruder.

For example, the following methods are methods of melt kneading when the resin composition includes cellulose nanofibers (A), a surface treatment agent (B), a binder component (D) and a thermoplastic resin (F).

(1) A method of melt kneading together the thermoplastic resin (F) with the cellulose nanofiber aqueous dispersion or dried cellulose nanofibers (such as powder) comprising the cellulose nanofibers (A), surface treatment agent (B) and binder component (D), which have been mixed in the desired proportion.

(2) A method of melt kneading the thermoplastic resin (F) and the surface treatment agent (B) if necessary, and then adding the cellulose nanofiber aqueous dispersion or dried cellulose nanofibers (such as powder) that contain the cellulose nanofibers (A), surface treatment agent (B) and binder component (D) which have been mixed in the desired proportion, and further melt kneading the mixture.

(3) A method of melt kneading the thermoplastic resin (F) and the binder component (D) if necessary, and then further melt kneading the cellulose nanofiber aqueous dispersion or dried cellulose nanofibers (such as powder) that contain the cellulose nanofibers (A), surface treatment agent (B) and binder component (D) which have been mixed in the desired proportion.

(4) A method of melt kneading a cellulose nanofiber aqueous dispersion containing the thermoplastic resin (F) and the cellulose nanofibers (A), surface treatment agent (B) and binder component (D) if necessary, and then further melt kneading the cellulose nanofiber aqueous dispersion or dried cellulose nanofibers (such as powder) that contain the cellulose nanofibers (A), surface treatment agent (B) and binder component (D) which have been mixed in the desired proportion.

(5) A method of melt kneading with at least two of the additions of (1) to (4) above, divided at the tops and sides in any desired proportion, using a single-screw or twin-screw extruder.

For example, the following methods are methods of melt kneading when the resin composition includes cellulose nanofibers (A), a surface treatment agent (B), an antioxidant (E) and a thermoplastic resin (F).

(1) A method of melt kneading together the thermoplastic resin, and a mixed powder of the cellulose nanofibers (A), surface treatment agent (B) and antioxidant (E), mixed in the desired proportion.

(2) A method of melt kneading the thermoplastic resin (F) and if necessary the surface treatment agent (B) and antioxidant (E), and then adding the cellulose nanofiber (A) powder and if necessary the surface treatment agent (B) and antioxidant (E), mixed in the desired proportion, and melt kneading the mixture.

(3) A method of melt kneading the thermoplastic resin (F), and a mixed powder of the cellulose nanofibers (A), the surface treatment agent (B) and the antioxidant (E) mixed in the desired proportion, and then mixing the cellulose nanofibers (A), water, and if necessary the surface treatment agent (B), mixed in the desired proportion, and melt kneading them together.

(4) A method of melt kneading the thermoplastic resin (F) and if necessary the surface treatment agent (B), and then adding a mixed powder of the thermoplastic resin (F), cellulose nanofibers (A), surface treatment agent (B) and antioxidant (E) mixed in the desired proportion, and water, and further melt kneading the mixture.

(5) A method of melt kneading with the additions of (1) to (4) above, divided at the top and sides in any desired proportion, using a single-screw or twin-screw extruder.

<Members>

The resin composition of this embodiment can be molded into the form of a member in the following manner. The method of molding the resin composition is not particularly restricted, and any known molding method may be employed. The molding may be carried out by any molding method such as extrusion molding, injection molding, vacuum forming, blow molding, injection compression molding, decorative molding, mixed material molding, gas assisted injection molding, foam injection molding, low-pressure molding, ultrathin injection molding (ultra high-speed injection molding), in-mold composite molding (insert molding or outsert molding), for example.

The uses of a member of this embodiment obtained from the resin composition described above are preferably uses that require properties such as high coatability, sliding resistance and heat-induced low dimensional change after molding.

The uses of a member of this embodiment include, but are not limited to, uses for common thermoplastic resin compositions. Specific examples of such uses include, but are not limited to, mechanism components such as cams, sliders, levers, arms, clutches, felt clutches, idler gears, pulleys, rollers, soft rollers, key stems, key tops, shutters, reels, shafts, joints, axes, bearings and guides; outsert molding resin parts, insert molding resin parts, office automation equipment members such as chassis, trays, side plates, printers and copying machines; camera or video equipment parts such as VTRs (Video tape recorder), video movies, digital video cameras, cameras and digital cameras; cassette players, optical disk drives such as DAT, LD (Laser disk), MD (Mini disk), CD (Compact disk) [including CD-ROM (Read only memory), CD-R (Recordable) and CD-RW (Rewritable)], DVD (Digital versatile disk) [including DVD-ROM, DVD-R, DVD+R, DVD-RW, DVD+RW, DVD-R DL, DVD+R DL, DVD-RAM (Random access memory) and DVD-Audio], Blu-ray® Disc and HD-DVD; music, image and data devices such as MFD (Multi Function Display), MO (Magneto-Optical Disk), navigation systems and mobile personal computers, communication device parts in cellular phones and facsimiles; electrical device parts; and electronic device parts. The molded article of this embodiment can serve as a material for automobile parts, including fuel related parts such as gasoline tanks, fuel pump modules, valves and gasoline tank flanges; door-related parts such as door locks, door handles, window regulators and speaker grills; seat belt peripheral parts such as seat belt slip rings and press buttons, parts such as combination switch parts, switches and clips; mechanical parts for extracting and inserting mechanical pencil pen tips or mechanical pencil cores; opening and closing mechanical parts for wash basins, drainage ports and drain plugs; automatic vending machine opening and closing lock mechanisms and product discharge mechanical parts; clothing cord stoppers, adjustors and buttons; watering nozzles and watering hose connecting joints; construction parts such as stair railings and flooring material supports; disposable cameras, toys, fasteners, chains, conveyors, buckles, sports goods, automatic vending machines, furniture, musical instruments, industrial machinery parts (for example, electromagnetic device housings, roll materials, transport arms and medical equipment members), general machine parts, automobile/railway/vehicle parts (for example, outer platings, chassis, aerodynamic members, seats and internal transmission friction materials), ship members (for example, hulls and seats), aviation-related parts (for example, fuselages, wings, tail units, rotor blades, fairings, cowls, doors, seats and interior finishing materials), spacecraft, artificial satellite members (motor cases, wings, structures and antennas), electronic and electrical components (for example, personal computer housings, cellular phone housings, OA devices, AV devices, telephone sets, facsimiles, household electrical appliances and toy parts), construction and civil engineering materials (for example, reinforcing metal substitute materials, truss structures and suspension bridge cables), daily household items, sports and leisure goods (for example, golf club shafts, fishing rods, and tennis and badminton rackets), wind power generation housing members, and containers and packaging materials, or materials for high-pressure vessels filled with hydrogen gas, such as fuel cells.

When the member of this embodiment is a resin composite film, it can be suitably used for reinforcement of a laminated sheet in a printed circuit board. In addition, it can be suitably applied in industrial parts such as, for example, insulating tubes, insulating levers, arc extinguishing plates, operating rods, insulating spacers, cases, wind channels, end bells and wind ukes for generators, transformers, rectifiers, circuit breakers and controllers, switch boxes and cases for standard electrical goods, cross bars, insulating shafts, fan blades, mechanical parts, transparent resin bases, speaker diaphragms, eta diaphragms, television screens and fluorescent lamp covers, antennas, horn covers, radomes, cases, mechanical parts and circuit boards for communication devices and aerospace purposes, aircraft, rockets, electronic device parts for aircraft, rockets and artificial satellites, railway parts, ship parts, bathtubs, wastewater treatment tanks, corrosion-resistant equipment, chairs, safety helmets, pipes, tank lorries, cooling towers, breakwaters, underground tanks, containers and housing equipment.

<Bonding and Adsorption>

For the resin composition of this embodiment, the surface treatment agent (B) and/or binder component (D) may be bonded (by chemical bonding such as ionic bonding or covalent bonding, for example) or adsorbed (by chemical adsorption or physical adsorption, for example) with the thermoplastic resin (F) and/or cellulose nanofibers (A). A typical example of physical adsorption is a phenomenon in which an adsorbate (the binder component (D) with the surface treatment agent (B)) is concentrated on the surface of a solid adsorbent (thermoplastic resin (F) and/or cellulose nanofibers (A)) by Van der Waals forces acting between the solid adsorbent. Because Van der Waals forces are generally much weaker interactions than chemical bonding (ionic bonding or covalent bonding), physically adsorbed molecules are easily desorbed by physical procedures such as heating and pressure reduction.

The phenomenon of physical adsorption can be easily confirmed by a method commonly known to those skilled in the art. The confirmation method is not restricted, and the following is an example.

First, the molded article composed of the resin composition is subjected to surface analysis. The components surrounding the thermoplastic resin (F) or cellulose nanofibers (A) of the molded article can be confirmed by infrared spectroscopy analysis. Time-Of-Flight Secondary Ion Mass Spectrometry or local pyrolysis GC-MS analysis.

The following procedure is then conducted. The thermoplastic resin (F) of the resin composition is dissolved. The solution and the cellulose nanofibers (A) are separated to isolate the cellulose component. The solution (i.e. the dissolved thermoplastic resin (F)) is then reprecipitated to extract the thermoplastic resin (F), and the solution is dried. The dried components are analyzed by appropriate methods, and if the components match the components detected by surface analysis, then it can be confirmed that the components are the physically adsorbed components.

Chemical bonding differs from physical adsorption in that it is irreversible by any physical procedure. When the binder component (D) and surface treatment agent (B) are chemically bonded with the thermoplastic resin (F) and/or cellulose nanofibers (A), the binder component (D) and surface treatment agent (B) can be easily decomposed by thermal decomposition, hydrolysis or alkaline decomposition of the thermoplastic resin (F) and cellulose nanofibers (A).

The phenomenon of chemical bonding can be easily confirmed by a method commonly known to those skilled in the art. The confirmation method is not restricted, and the following is an example.

First, the thermoplastic resin (F) and cellulose nanofibers (A) of the resin composition are isolated. The thermoplastic resin (F) of the resin composition is dissolved. The solution and the cellulose nanofibers (A) are separated to isolate the cellulose component. The solution (i.e. the dissolved thermoplastic resin (F)) is then reprecipitated to extract the thermoplastic resin (F), and the solution is dried. The isolated thermoplastic resin (F) and cellulose nanofibers (A) can be analyzed directly by $^1$H-NMR or $^{13}$C-NMR analysis, allowing confirmation of the chemically bonded components.

The following procedure is then conducted. The isolated thermoplastic resin (F) and cellulose nanofibers (A) are subjected to thermal decomposition, hydrolysis and alkaline decomposition, and the decomposed components are analyzed by infrared spectroscopy, GC-MS, LC-MS, Time-Of-Flight Secondary Ion Mass Spectrometry, $^1$H-NMR or $^{13}$C-NMR, to determine the structure of the components before decomposition. If the components detected before and after decomposition match, then it can be confirmed that the components are the chemically bonded components.

<Linear Expansion Coefficient>

Since the resin composition of this embodiment includes cellulose nanofibers (A), it can exhibit lower linear expansibility than a conventional molded article. Specifically, the linear expansion coefficient of the molded resin in a temperature range of 0° C. to 60° C. is preferably 60 ppm/K or lower. The linear expansion coefficient is more preferably 50 ppm/K or lower, even more preferably 45 ppm/K or lower, yet more preferably 40 ppm/K or lower and most preferably 35 ppm/K or lower. The lower limit for the linear expansion coefficient is not particularly restricted, but from the viewpoint of easier production it is preferably 5 ppm/K and more preferably 10 ppm/K, for example.

<Coatability>

Since the resin composition of the embodiment includes the cellulose nanofibers (A), the surface treatment agent (B) and a polyurethane, it can exhibit more excellent coatability than a conventional molded article. The reason that such excellent coatability is exhibited is not completely understood, but it is conjectured that the coating material components penetrate the interfacial regions that are closely adhering with the cellulose nanofibers (A), surface treatment agent (B) and polyurethane, producing an excellent outer appearance on the surface.

Second Embodiment

According to one aspect of this disclosure there is provided.
  a dispersion comprising a surface treatment agent (B), a binder component (D) and water, wherein the surface treatment agent (B) is a water-soluble polymer with a hydrophilic segment and a hydrophobic segment and having a number-average molecular weight of 200 to 30,000, and the binder component (D) is a polyurethane (preferably a modified polyurethane with a blocked polyisocyanate group).

According to another aspect of the disclosure there is provided:
  a cellulose nanofiber aqueous dispersion comprising cellulose nanofibers (A), a surface treatment agent (B), a binder component (D) and water, wherein the surface treatment agent (B) is a water-soluble polymer with a hydrophilic segment and a hydrophobic segment and having a number-average molecular weight of 200 to 30,000, and the binder component (D) is a polyurethane (preferably a modified polyurethane with a blocked polyisocyanate group), and dried cellulose nanofibers that are the dried form of the cellulose nanofiber aqueous dispersion.

According to yet another aspect of the disclosure there is provided:
  a cellulose nanofiber resin composition comprising cellulose nanofibers (A), a surface treatment agent (B), a binder component (D) and a thermoplastic resin (F), wherein the surface treatment agent (B) is a water-soluble polymer with a hydrophilic segment and a hydrophobic segment and having a number-average molecular weight of 200 to 30,000, and the binder component (D) is a polyurethane (preferably one or more selected from the group consisting of blocked isocyanates, and polyurethanes bonded to the cellulose nanofibers (A) or the thermoplastic resin (F), or both).

According to yet another aspect, the resin composition further comprises water, and is in the form of an aqueous dispersion. According to yet another aspect, the resin composition is in dried form.

One aspect of this disclosure provides a molded resin formed from the aforementioned cellulose nanofiber resin composition.

The preferred aspects of the cellulose nanofibers (A) of the second embodiment are the same as described above for the cellulose nanofibers (A) of the first embodiment.

A surface treatment agent (B) which is a water-soluble polymer with a hydrophilic segment and a hydrophobic segment and having a number-average molecular weight of 200 to 30.000, according to the second embodiment, is preferred from the viewpoint of handleability and cost. The surface treatment agent according to one aspect has at least an ethylene oxide segment as the hydrophilic segment and has at least a propylene oxide segment as the hydrophobic segment, and according to another aspect, it is a copolymer of polyethylene glycol and polypropylene glycol. Preferred examples of surface treatment agents that are water-soluble polymers with a hydrophilic segment and a hydrophobic segment and having a number-average molecular weight of 200 to 30,000, may include the same examples mentioned above for the surface treatment agent (B) according to the first embodiment.

The preferred aspects of the polyurethane (especially a modified polyurethane) as the binder component (D) for the second embodiment are the same as mentioned above for the polyurethane (especially modified polyurethane) of the first embodiment.

The properties and production methods for the cellulose nanofiber aqueous dispersion, dried cellulose nanofibers, cellulose nanofiber resin composition and molded resin according to the second embodiment may also include the same examples mentioned for the first embodiment.

EXAMPLES

The present invention will now be further explained by examples, with the understanding that these examples are in no way limitative on the invention.
<Starting Materials and Evaluation Methods>
The starting materials and evaluation methods used will now be explained.
<Cellulose Nanofibers (A)>
(a-1) Cellulose A After cutting linter pulp, an autoclave was used to heat it for 3 hours in hot water at 120° C. or higher to remove the hemicellulose portion and obtained refined pulp, which was pressed and beaten into highly chopped fibers and fibrils to a solid content of 1.5 mass % in purified water, and then defibrated with a high-pressure homogenizer (10 times at an operating pressure of 85 MPa) at the same concentration to obtain defibrated cellulose. For the beating treatment, a disc refiner was used for 2.5 hours of treatment with a high-cutting beating blade (hereunder referred to as "cutting blade"), and then a high-defibrating beating blade (hereunder referred to as "defibrating blade") was used for another 2 hours of beating to obtain cellulose A.
(a-2) Cellulose B Cellulose B was prepared by the method described in Example 1 in paragraph [0108] of International Patent Publication No. WO2017/159823.
<Degree of Polymerization of Cellulose Nanofibers (A)>

This was measured by a reduced relative viscosity method using a copper-ethylenediamine solution, as specified in Crystalline Cellulose Verification Test (3) of "Japanese Pharmacopeia, 14th Edition (Hirokawa Shoten)".
<Crystalline Fonn and Crystallinity of Cellulose Nanofibers (A)>

An X-ray diffraction device (Multipurpose X-ray diffraction device by Rigaku Corp.) was used to measure the diffraction image by a powder method (ordinary temperature), and the degree of crystallinity was calculated by the Segal method. The crystalline form was also measured from the obtained X-ray diffraction image.
<L/D of Cellulose Nanofibers (A)>

A purified water suspension of the cellulose nanofibers (A) at 1 mass % concentration was prepared and dispersed with a high-shear homogenizer (for example, an "Excel ED-7 Autohomogenizer", trade name of Nippon Seiki Co., Ltd., processing conditions: rotational speed=15,000 rpm×5 minutes) to produce an aqueous dispersion which was diluted with purified water to 0.1 to 0.5 mass %, and this was cast onto mica and air-dried, the ratio (LD) was determined for the long diameter (L) and short diameter (D) of a particle image, obtained by measurement with an atomic force microscope (AFM), and the value was converted to the average value for 100 to 150 particles.
<Mean Fiber Size of Cellulose Nanofibers (A)>

The cellulose nanofibers (A) were kneaded as a 40 mass % solid in a planetary mixer ("5DM-03-R", trade name of Shinagawa Machinery Works Co., Ltd., hook-type stirring blade) for 30 minutes at 126 rpm, room temperature, ordinary pressure. Next, a purified water suspension was prepared to a 0.5 mass % solid content, a high-shear homogenizer ("Excel ED-7 Autohomogenizer", trade name of Nippon Seiki Co., Ltd. treatment conditions: rotational speed=15,000 rpm×5 minutes) was used for dispersion, and centrifugal separation was carried out (centrifugation for 10 minutes with a "Model 6800 Centrifugal Separator", trade name of Kubota Corp., Rotor type Model RA-400, under treatment conditions of centrifugal force: 39,200 m²/s, obtaining the resulting supernatant, and further centrifuging it at 116,000 m²/s for 45 minutes). The supernatant liquid after centrifugation was used to measure the 50% cumulative particle diameter (volume-average particle size) in the volume frequency particle size distribution obtained using a laser diffraction/scattering method-based particle size distribution meter ("LA-910", trade name of Horiba. Ltd., ultrasonic treatment for 1 minute, refractive index: 1.20), and the value was used as the mean diameter.
[Table 1]

TABLE 1

| | | Cellulose nanofibers (A) | | | | | | |
|---|---|---|---|---|---|---|---|---|
| | | Crystallinity (%) | Mean fiber size | Crystalline form | L/D | Polymerization degree | Cutting blade | Defibrating blade |
| a-1 | Cellulose A | 80 | 90 mm | Type I | 450 | 450 | 2.5 | 2 |
| a-2 | Cellulose B | 78 | 80 mm | Type I | 200 | 300 | — | — |

<Surface Treatment Agent (B)>

(b-1) In a 2 L autoclave there were placed 11 parts by mass of polypropylene oxide (Mn 2000) and 0.6 part by mass of KOH as a catalyst, and after nitrogen exchange, 100 parts by mass of polyethylene oxide (Mn 9000) was added by successive introduction over a period of 4 hours at 160° C. Upon completion of the reaction, the mixture was neutralized with 1.2 parts by mass of lactic acid to obtain b-1.

(b-2) In a 2 L autoclave there were placed 25 parts by mass of polypropylene oxide (Mn 3250) and 0.6 part by mass of KOH as a catalyst, and after nitrogen exchange, 100 parts by mass of polyethylene oxide (Mn 6375) was added by successive introduction over a period of 4 hours at 160° C. Upon completion of the reaction, the mixture was neutralized with 1.2 parts by mass of lactic acid to obtain b-2.

(b-3) In a 2 L autoclave there were placed 28 parts by mass of polypropylene oxide (Mn 1750) and 0.6 part by mass of KOH as a catalyst, and after nitrogen exchange, 100 parts by mass of polyethylene oxide (Mn 3125) was added by successive introduction over a period of 4 hours at 160° C. Upon completion of the reaction, the mixture was neutralized with 1.2 parts by mass of lactic acid to obtain b-3.

(b-4) In a 2 L autoclave there were placed 130 parts by mass of polypropylene oxide (Mn 2000) and 0.6 part by mass of KOH as a catalyst, and after nitrogen exchange, 100 parts by mass of polyethylene oxide (Mn 750) was added by successive introduction over a period of 4 hours at 160° C. Upon completion of the reaction, the mixture was neutralized with 1.2 parts by mass of lactic acid to obtain b-4.

(b-5) In a 2 L autoclave there were placed 150 parts by mass of polypropylene oxide (Mn 2100) and 0.6 part by mass of KOH as a catalyst, and after nitrogen exchange, 100 parts by mass of polyethylene oxide (Mn 700) was added by successive introduction over a period of 4 hours at 160° C. Upon completion of the reaction, the mixture was neutralized with 1.2 parts by mass of lactic acid to obtain b-5.

(b-6) In a 2 L autoclave there were placed 150 parts by mass of polypropylene oxide (Mn 2120) and 0.6 part by mass of KOH as a catalyst, and after nitrogen exchange, 100 parts by mass of polyethylene oxide (Mn 690) was added by successive introduction over a period of 4 hours at 160° C. Upon completion of the reaction, the mixture was neutralized with 1.2 parts by mass of lactic acid to obtain b-6.

(b-7) In a 2 L autoclave there were placed 160 parts by mass of polypropylene oxide (Mn 2150) and 0.6 part by mass of KOH as a catalyst, and after nitrogen exchange, 100 parts by mass of polyethylene oxide (Mn 675) was added by successive introduction over a period of 4 hours at 160° C. Upon completion of the reaction, the mixture was neutralized with 1.2 parts by mass of lactic acid to obtain b-7.

(b-8) In a 2 L autoclave there were placed 160 parts by mass of polypropylene oxide (Mn 2050) and 0.6 part by mass of KOH as a catalyst, and after nitrogen exchange, 100 parts by mass of polyethylene oxide (Mn 625) was added by successive introduction over a period of 4 hours at 160° C. Upon completion of the reaction, the mixture was neutralized with 1.2 parts by mass of lactic acid to obtain b-8.

(b-9) In a 2 L autoclave there were placed 180 parts by mass of polypropylene oxide (Mn 2000) and 0.6 part by mass of KOH as a catalyst, and after nitrogen exchange, 100 parts by mass of polyethylene oxide (Mn 550) was added by successive introduction over a period of 4 hours at 160° C. Upon completion of the reaction, the mixture was neutralized with 1.2 parts by mass of lactic acid to obtain b-9.

(b-10) In a 2 L autoclave there were placed 58 parts by mass of polyethylene oxide (Mn 1300) and 0.6 part by mass of KOH as a catalyst, and after nitrogen exchange, 100 parts by mass of polypropylene oxide (Mn 1100) was added by successive introduction over a period of 4 hours at 160° C. Upon completion of the reaction, the mixture was neutralized with 1.2 parts by mass of lactic acid to obtain b-10.

(b-11) In a 2 L autoclave there were placed 57 parts by mass of polyethylene oxide (Mn 1200) and 0.6 part by mass of KOH as a catalyst, and after nitrogen exchange, 100 parts by mass of polypropylene oxide (Mn 1050) was added by successive introduction over a period of 4 hours at 160° C. Upon completion of the reaction, the mixture was neutralized with 1.2 parts by mass of lactic acid to obtain b-11.

(b-12) In a 2 L autoclave there were placed 47 parts by mass of polyethylene oxide (Mn 1000) and 0.6 part by mass of KOH as a catalyst, and after nitrogen exchange, 100 parts by mass of polypropylene oxide (Mn 1050) was added by successive introduction over a period of 4 hours at 160° C. Upon completion of the reaction, the mixture was neutralized with 1.2 parts by mass of lactic acid to obtain b-12.

(b-13) In a 2 L autoclave there were placed 230 parts by mass of polypropylene oxide (Mn 1950) and 0.6 part by mass of KOH as a catalyst, and after nitrogen exchange, 100 parts by mass of polyethylene oxide (Mn 425) was added by successive introduction over a period of 4 hours at 160° C. Upon completion of the reaction, the mixture was neutralized with 1.2 parts by mass of lactic acid to obtain b-13.

(b-14) In a 2 L autoclave there were placed 250 parts by mass of polypropylene oxide (Mn 1750) and 0.6 part by mass of KOH as a catalyst, and after nitrogen exchange, 100 parts by mass of polyethylene oxide (Mn 325) was added by successive introduction over a period of 4 hours at 160° C. Upon completion of the reaction, the mixture was neutralized with 1.2 parts by mass of lactic acid to obtain b-14.

(b-15) In a 2 L autoclave there were placed 400 parts by mass of polypropylene oxide (Mn 1900) and 0.6 part by mass of KOH as a catalyst, and after nitrogen exchange, 100 parts by mass of polyethylene oxide (Mn 250) was added by successive introduction over a period of 4 hours at 160° C. Upon completion of the reaction, the mixture was neutralized with 1.2 parts by mass of lactic acid to obtain b-15.

(b-16) In a 2 L autoclave there were placed 550 parts by mass of polypropylene oxide (Mn 1870) and 0.6 part by mass of KOH as a catalyst, and after nitrogen exchange, 100 parts by mass of polyethylene oxide (Mn 165) was added by successive introduction over a period of 4 hours at 160° C. Upon completion of the reaction, the mixture was neutralized with 1.2 parts by mass of lactic acid to obtain b-16.

(b-17) In a 2 L autoclave there were placed 700 parts by mass of polypropylene oxide (Mn 1750) and 0.6 part by mass of KOH as a catalyst, and after nitrogen exchange, 100 parts by mass of polyethylene oxide (Mn 125) was added by successive introduction over a period of 4 hours at 160° C. Upon completion of the reaction, the mixture was neutralized with 1.2 parts by mass of lactic acid to obtain b-17.

(b-18) In a 2 L autoclave there were placed 1200 parts by mass of polypropylene oxide (Mn 1850) and 0.6 part by mass of KOH as a catalyst, and after nitrogen exchange, 100 parts by mass of polyethylene oxide (Mn 75) was added by successive introduction over a period of 4 hours at 160° C. Upon completion of the reaction, the mixture was neutralized with 1.2 parts by mass of lactic acid to obtain b-18.

(b-19) In a 2 L autoclave there were placed 1800 parts by mass of polypropylene oxide (Mn 1900) and 0.6 part by mass of KOH as a catalyst, and after nitrogen exchange, 100 parts by mass of polyethylene oxide (Mn 50) was added by successive introduction over a period of 4 hours at 160° C. Upon completion of the reaction, the mixture was neutralized with 1.2 parts by mass of lactic acid to obtain b-19.

(b-20) Polyethylene oxide (Mn 31,000) was used.

(b-21) Polyethylene oxide (Mn 150) was used.

(b-22) In a 2 L autoclave there were placed 100 parts by mass of glycerin (Mn 92) and 0.6 part by mass of KOH as a catalyst, and after nitrogen exchange, 340 parts by mass of polyethylene oxide (Mn 325) was added by successive introduction over a period of 4 hours at 160° C. Upon completion of the reaction, 680 parts by mass of polypropylene oxide (Mn 650) was added by successive introduction over a period of 4 hours at 160° C. Upon completion of the reaction, the mixture was neutralized with 1.2 parts by mass of lactic acid to obtain b-22.

(b-23) In a 2 L autoclave there were placed 100 parts by mass of pentaerythritol (Mn 136) and 0.6 part by mass of KOH as a catalyst, and after nitrogen exchange, 330 parts by mass of polyethylene oxide (Mn 450) was added by successive introduction over a period of 4 hours at 160° C. Upon completion of the reaction, 660 parts by mass of polypropylene oxide (Mn 900) was added by successive introduction over a period of 4 hours at 160° C. Upon completion of the reaction, the mixture was neutralized with 1.2 pats by mass of lactic acid to obtain b-23.

(b-24) NONIPOL 40 (polyoxyethylenenonylphenyl ether) by Sanyo Chemical Industries, Ltd. was used.

(b-25) NONIPOL 85 (polyoxyethylenenonylphenyl ether) by Sanyo Chemical Industries, Ltd. was used.

(b-26) NONIPOL 100 (polyoxyethylenenonylphenyl ether) by Sanyo Chemical Industries, Ltd. was used.

(b-27) NONIPOL 160 (polyoxyethylenenonylphenyl ether) by Sanyo Chemical Industries, Ltd. was used.

(b-28) BLAUNON RCW-20 (PEG-10 hydrogenated castor oil) by Aoki Oil Industrial Co., Ltd. was used. This substance has a static surface tension of 42.4 mN/m, a dynamic surface tension of 52.9 mN/m and a boiling point at ordinary pressure of higher than 100° C.

(b-29) IONET DL-200 (polyethyleneglycol laurate diester) by Sanyo Chemical Industries, Ltd. was used.

(b-30) IONET DS-300 (polyethyleneglycol stearate diester) by Sanyo Chemical Industries, Ltd. was used.

(b-31) SEDORAN SF-506 by Sanyo Chemical Industries, Ltd. was used.

(b-32) NAROACTY CL-20 (polyoxyethylenealkyl ether) by Sanyo Chemical Industries, Ltd. was used.

(b-33) In a 2 L autoclave there were placed 140 parts by mass of polypropylene oxide (Mn 1000) and 0.6 part by mass of KOH as a catalyst, and after nitrogen exchange, 100 parts by mass of polyethylene oxide (Mn 350) was added by successive introduction over a period of 4 hours at 160° C. Upon completion of the reaction, the mixture was neutralized with 1.2 parts by mass of lactic acid to obtain a-7.

(b-34) In a 2 L autoclave there were placed 150 parts by mass of polypropylene oxide (Mn 2100) and 0.6 part by mass of KOH as a catalyst, and after nitrogen exchange, 100 parts by mass of polyethylene oxide (Mn 700) was added by successive introduction over a period of 4 hours at 160° C. Upon completion of the reaction, the mixture was neutralized with 1.2 parts by mass of lactic acid to obtain b-3.

<Molecular Weight Measurement of Surface Treatment Agent (B)>

For each surface treatment agent, measurement was performed under the following conditions by GPC for molecular weights of 10.000 or greater and by HPLC for molecular weights of lower than 10,000.

Each surface treatment agent was measured under the following conditions.

[Gpc Measurement]

For a solid at ordinary temperature, it was heated at above the melting point to a melt and then dissolved in water for measurement.

Apparatus: HLC-8320GPC EcoSEC (Tosoh Corp.)

Column: Shodex GPC KD-802+KD-80 (Showa Denko K.K.)

Eluent: 0.01 M LiBr in DMF

Flow rate: 1.0 mL/min

Detector: RI

Measuring temperature: 50° C.

[HPLC Measurement]

For a solid at ordinary temperature, it was heated at above the melting point to a melt and then dissolved in water for measurement.

Apparatus: HP-1260 (Agilent Technologies)

Column: TSKgel ODS-80 Ts (Tosoh Corp.)

Mobile phase: Solvent gradient with water/acetonitrile mobile phase

Detector: Evaporative light scattering detector (ELSD)

Measuring temperature: 40° C.

Flow rate: 1 mL/min

Sample concentration: 1 mg/mL

Injection rate: 10 µL

<Hydrophobic Segment/Hydrophilic Segment Ratio of Surface Treatment Agent (B)>

The value of the molecular weight of the propylene oxide used divided by the molecular weight of the ethylene oxide used was recorded as the hydrophobic segment/hydrophilic segment ratio.

<Melting Point of Surface Treatment Agent (B)>

For a solid at ordinary temperature, it was heated at above the melting point to a melt and then filled into an aluminum pan for measurement.

Apparatus: DSC8500 by Perkin-Elmer

Measuring temperature: −60 to 100° C.

<Cloud Point of Surface Treatment Agent (B)>

For a solid at ordinary temperature, it was heated at above the melting point to a melt and then dissolved in water for use as the sample.

Apparatus: SV-10A by A&D Co., Ltd.

Measuring concentrations: 0.5 mass %, 1.0 mass %, 5 mass %

Measuring temperature: 0 to 90° C.

When a cloud point was not exhibited by this method, the visualizable sealed glass container was sealed. The temperature was then increased and the point at which the precipitated aqueous solution became cloudy was visually confirmed and recorded as the cloud point.

<HLB Value of Surface Treatment Agent (B)>

For (b-1) to (b-23), (b-33) and (b-34), the Griffin method was used to determine the HLB value according to the following formula.

HLB value=20×(total formula weight of hydrophilic groups/molecular weight)

(In the formula, the formula weight of hydrophilic groups is the formula weight of polyethylene oxide segments.)

For (b-24) to (b-32), the HLB values listed in Table 2 are the manufacturer's catalog values.

[Table 2]

TABLE 2

| | Surface treatment agent (B) | | | | | | | |
|---|---|---|---|---|---|---|---|---|
| | PPG molecular weight | PEG molecular weight | Overall | Hydrophobic group/hydrophilic group ratio | Cloud point (1 wt % aqueous solution) | HLB | Structure | Melting point |
| b-1 | 2000 | 18,000 | 20,000 | 0.111 | ≥110° C. | 18.0 | ABA | 63 |
| b-2 | 3250 | 12750 | 16,000 | 0.255 | 105 | 15.9 | ABA | 57 |
| b-3 | 1750 | 6250 | 8000 | 0.280 | ≥110° C. | 15.6 | ABA | 53 |
| b-4 | 2000 | 1500 | 3500 | 1.333 | 69 | 8.6 | ABA | Paste |
| b-5 | 2100 | 1400 | 3500 | 1.500 | 65 | 8.0 | ABA | Paste |
| b-6 | 2120 | 1380 | 3500 | 1.536 | 60 | 7.9 | ABA | Paste |
| b-7 | 2150 | 1350 | 3500 | 1.593 | 60 | 7.7 | ABA | Paste |
| b-8 | 2050 | 1250 | 3300 | 1.640 | 60 | 7.6 | ABA | Paste |
| b-9 | 2000 | 1100 | 3100 | 1.818 | 56 | 7.1 | ABA | Paste |
| b-10 | 2200 | 1300 | 3500 | 1.692 | 58 | 7.4 | BAB | Paste |
| b-11 | 2100 | 1200 | 3300 | 1.750 | 57 | 7.3 | BAB | Paste |
| b-12 | 2100 | 1000 | 3100 | 2.100 | 55 | 6.5 | BAB | Paste |
| b-13 | 1950 | 850 | 2800 | 2.294 | 54 | 6.1 | ABA | Paste |
| b-14 | 1750 | 650 | 2400 | 2.692 | 30 | 5.4 | ABA | Paste |
| b-15 | 1900 | 500 | 2400 | 3.800 | 28 | 4.2 | ABA | Paste |
| b-16 | 1870 | 330 | 2200 | 5.667 | 28 | 3.0 | ABA | Paste |
| b-17 | 1750 | 250 | 2000 | 7.000 | 24 | 2.5 | ABA | −30 |
| b-18 | 1850 | 150 | 2000 | 12.333 | 23 | 1.5 | ABA | −30 |
| b-19 | 1900 | 100 | 2000 | 19.000 | 22 | 1.0 | ABA | −30 |
| b-20 | 0 | 31,000 | 31,000 | — | ≥110° C. | 20.0 | A | 65 |
| b-21 | 0 | 150 | 150 | — | ≥110° C. | 20.0 | A | −55 |
| b-22 | 650 | 325 | 3000 | 2.000 | 56 | 6.5 | 3-branch | Paste |
| b-23 | 900 | 450 | 5500 | 2.000 | 56 | 6.5 | 4-branch | Paste |
| b-24 | | | NONIPOL 40 | | 35 | 8.0 | — | ≤−10 |
| b-25 | | | NONIPOL 85 | | 41 | 11.7 | — | <0 |
| b-26 | | | NONIPOL 100 | | 45 | 12.6 | — | ≤10 |
| b-27 | | | NONIPOL 160 | | 50 | 15.2 | — | ≤15 |
| b-28 | | | BLAUNON RCW-20 | | 60 | 9.7 | — | 16 |
| b-29 | | | IONET DL-200 | | 15 | 6.6 | — | Paste |
| b-30 | | | IONET DS-300 | | 15 | 7.3 | — | 35 |
| b-31 | | | SEDORAN SF-506 | | 20 | 6.1 | — | Paste |
| b-32 | | | NAROACTY CL-20 | | 20 | 5.7 | — | 11 |
| b-33 | 1000 | 700 | 1700 | 1.429 | 63 | 8.2 | ABA | Paste |
| b-34 | 2100 | 700 | 2800 | 3.000 | 65 | 8.0 | ABA | Paste |

<Water-Soluble Organic Solvent (C)>

The solvents listed in Table 3 were used. The relative permittivities used for c-2 were the numeral values listed for Ip770 to 777 in Foundations of Chemistry Handbook of The Chemical Society of Japan, 5th Revised Edition. The relative permittivities other than c-2 were those measured using an HP4284A Precision LCR meter by Hewlett Packard (liquid measuring electrode: HP 16452Ak solid measuring electrode: HP 16451B3).

[Table 3]

TABLE 3

| | Water-soluble organic solvent (C) | | |
|---|---|---|---|
| | Name | Boiling point | Relative permittivity (25° C.) |
| c-1 | Diethyleneglycol ethyl methyl ether | 176 | 5.8 |
| c-2 | Propylene glycol | 188 | 32.0 |
| c-3 | Triethyleneglycol dimethyl ether | 216 | 6.3 |
| c-4 | Diethyleneglycol dibutyl ether | 256 | 6.5 |
| c-5 | Triethyleneglycol butyl methyl ether | 261 | 6.7 |
| c-6 | Triethyleneglycol monomethyl ether | 249 | 6.9 |
| c-7 | Polyethyleneglycol monomethyl ether | 300 | 7.2 |

<Binder Component (D)>

The binder components listed in Table 4 were used.

[Table 4]

TABLE 4

| | Binder component (D) (BI) and comparison binder component | | | |
|---|---|---|---|---|
| | Manufacturer | Product name | Product No. | Functional groups |
| d-1 | Asahi Kasei Corp. | DURANATE ™ | WT30-100 | Isocyanate group |
| d-2 | Asahi Kasei Corp. | DURANATE ™ (Number-average molecular weight: <5000) | WT32-B875P | BI |

TABLE 4-continued

| | Binder component (D) (BI) and comparison binder component | | | |
|---|---|---|---|---|
| | Manufacturer | Product name | Product No. | Functional groups |
| d-3 | Meisei Chemical Works, Ltd. | — | NBP-211 | BI |
| d-4 | Meisei Chemical Works, Ltd. | MEIKANATE | DM-3031CONC | BI |
| d-5 | Meisei Chemical Works, Ltd. | MEIKANATE | WEB | BI |
| d-6 | Meisei Chemical Works, Ltd. | MEIKANATE | TP-10 | BI |
| d-7 | Dai-ichi Kogyo Seiyaku Co., Ltd. | SUPERFLEX | 170 | BI |
| d-8 | Dai-ichi Kogyo Seiyaku Co., Ltd. | SUPERFLEX | 130 | BI |
| d-9 | Dai-ichi Kogyo Seiyaku Co., Ltd. | SUPERFLEX | 150 | BI |
| d-10 | Dai-ichi Kogyo Seiyaku Co., Ltd. | SUPERFLEX | 460 | BI |
| d-11 | Sumitomo Seika Chemicals Co., Ltd. | SEPOLSION | PA200 | Carboxyl group, amino group and amide bond |
| d-12 | Toyochem Co., Ltd. | TOCRYL | BCX-6107 | Carbonyl group |

<Antioxidant (E)>
The antioxidants listed in Table 5 were used. In the case of c-4, it was used after dissolution in hexane, addition of acetone and reprecipitation. The others were used after dissolution using acetone.
[Table 5]

TABLE 5

| | Antioxidant (E) | | | |
|---|---|---|---|---|
| Name | Supplier | Type | | Melting point [° C.] |
| e-1 | IRGANOX 1098 | BASF Japan | Phenol-based | 161 |
| e-2 | IRGANOX 245 | BASF Japan | Phenol-based | 79 |
| e-3 | IRGAFOS 168 | BASF Japan | Phosphorus-based | 186 |
| e-4 | SUMILIZER TP-D | Sumitomo Chemical Co., Ltd. | Sulfur-based | 52 |
| e-5 | IRGANOX 1010 | BASF Japan | Phenol-based | 49 |
| e-6 | IRGANOX 1035 | BASF Japan | Phenol-based and thioether-based | 141 |
| e-7 | TINUVIN 770 | BASF Japan | HALS | 42 |

<Thermoplastic Resin (F)>
The resins listed in Table 6 were used.
[Table 6]

TABLE 6

| | Thermoplastic resin (F) | | | | |
|---|---|---|---|---|---|
| | Name | Company | Trademark | Grade | Number-average molecular weight |
| f-1 | PA | Ube Industries, Ltd. | UBENYLON | 1013B | 18,000 |
| f-2 | PP | Prime Polymer Co., Ltd. | PRIME POLYPRO | J105G | ≥5000 |
| f-3 | POM | Asahi Kasei Corp. | TENAC | 4520 | 70,000 |

<Production-1 Cellulose Nanofiber Aqueous Dispersion>
The surface treatment agent (B) was loaded into distilled water in a 20° C. environment, placed in a sealed container and allowed to stand overnight for dissolution. Homogeneous aqueous dissolution was confirmed on the following day, to obtain an aqueous solution of the surface treatment agent (B). For examples using an antioxidant (C), the surface treatment agent (B) was loaded into distilled water in a 20° C. environment, placed in a sealed container and allowed to stand overnight for dissolution. The antioxidant (C) was separately dissolved in a solvent that dissolves it. On the following day it was confirmed that the aqueous solution of the surface treatment agent was homogeneous, and the antioxidant (C) solution was added to obtain an aqueous solution of the surface treatment agent (B). The aqueous solution of the surface treatment agent (B) that was obtained was loaded into a cellulose nanofiber slurry (10 to 20 mass % solid content), and a BLh3000 high-power general purpose stirrer by Shinto Scientific Co., Ltd. was used for stirring for 30 minutes to obtain a homogeneous cellulose nanofiber aqueous dispersion.

For examples using a binder component (D) or a comparison binder component, the surface treatment agent (B) was loaded into distilled water in a 20° C. environment, placed in a sealed container and allowed to stand overnight for dissolution. Homogeneous aqueous dissolution was confirmed on the following day, to obtain an aqueous solution of the surface treatment agent (B). The binder component was added to the aqueous solution of the surface treatment agent (B) and a BLh3000 high-power general purpose stirrer by Shinto Scientific Co., Ltd. was used for stirring for 10 minutes to obtain a homogeneous dispersion A.

The obtained dispersion A was loaded into a cellulose nanofiber slurry (10 to 20 mass % solid content), and a BLh3000 high-power general purpose stirrer by Shinto Scientific Co., Ltd. was used for stirring for 10 minutes to obtain a homogeneous cellulose nanofiber aqueous dispersion.

<Production-2 Dried Cellulose Nanofibers>
The obtained cellulose nanofiber aqueous dispersion was stirred using an ACM-5LVT by Kodaira Seisakusho Co., Ltd., while carrying out reduced pressure drying for 1 hour at 40° C., to obtain a homogeneous crumb-like mass. An Inert Oven DN43HI by Yamato Scientific Co., Ltd. was used to dry the mass for 24 hours at 120° C. in a nitrogen atmosphere, to obtain dried cellulose nanofibers.

<Production-3 Resin Composition>

Using a twin-screw extruder (TEM-26SS extruder by Toshiba Machine Co., Ltd. (L/D=48, vented)), and setting the cylinder temperature to 260° C. for a polyamide-based material, 190° C. for a polypropylene-based material and 200° C. for a polyoxymethylene-based material, the thermoplastic resin (F) was supplied to a quantitative feeder through the main throat section of the extruder, the cellulose nanofiber aqueous dispersion or dried cellulose nanofibers were supplied using a quantitative feeder from the side of the extruder, and the resin kneaded blend was extruded into a strand form under conditions with an extrusion output of 15 kg/h and a screw rotational speed of 250 rpm, and quenched in a strand bath and cut with a strand cutter to obtain resin composition pellets.

<Resin Composition Odor>

The pellets immediately leaving the strand cutter in [Production-3] were collected in an amount of 1 kg in a paper bag with a length of 50 cm and a width of 25 cm, and the odor was assessed by 5 evaluators. The assessment value was recorded as the average for the 5 evaluators, rounded to the first decimal place.

The following scale was used.
1: No odor detected.
2: Slight odor detected.
3: Odor detected.
4: Strong odor detected.
5: Very strong odor detected.

<Production-4 Molded Article>

An injection molding machine (EC-75NII by Toshiba Machine Co., Ltd.) was used to cast a multipurpose test piece conforming to ISO294-3.

Polyamide-based material: Conditions conforming to JIS K6920-2

Polypropylene-based material: Conditions conforming to JIS K6921-2

Polyoxymethylene-based material: Conditions conforming to JIS K7364-2

The starting resin (the thermoplastic resin alone) and the resin composition (the cellulose nanofiber resin composition) were measured for tensile yield strength and tensile breaking elongation according to ISO527 and for flexural modulus according to ISO179.

Since polyamide-based materials undergo changes due to moisture absorption, these were stored in an aluminum moisture-proof bag immediately after casting to minimize moisture absorption.

<Molding Machine Retentivity>

In addition to casting the multipurpose test piece conforming to ISO294-3 using the previous injection molding machine, another injection molding machine (EC-75NI by Toshiba Machine Co., Ltd.) was used for casting under injection conditions with an injection time of 35 seconds and a cooling time of 15 seconds, with the cylinder temperature set to +20° C. (standard temperature for each resin mentioned above) and with a residence time of 30 minutes, to obtain a flat plate with a thickness of 2 mm, a length of 120 mm and a width of 80 nm. The die temperature was set to 70° C. The flat plate was cast and the degree of yellowing of the cast piece was evaluated. The numerical values corresponding to the degree of yellowing of the cast pieces are listed in the tables. Smaller values were judged to be more excellent molding machine retentivity.

1: No discoloration found.
2: Faint yellowing found.
3: Slight yellowing found.
4: Yellowing found.
5: Yellowing visible even from a distance.

<Moldablity>

In addition to casting the multipurpose test piece conforming to ISO294-3 using the previous injection molding machine, another injection molding machine (EC-75NI by Toshiba Machine Co., Ltd.) was used for casting under injection conditions with an injection time of 35 seconds and a cooling time of 15 seconds, with the cylinder temperature set to 250° C., to obtain a flat plate with a thickness of 2 mm, a length of 120 mm and a width of 80 mm. The die temperature was set to 70° C. The flat plate die was used for casting of 50 pieces, and the number of defective moldings was counted. Defective molding was defined as silver streaks, sink marks, contamination or other outer appearance defects.

The numerical values corresponding to the number of defects generated are listed in the tables.

Smaller values were judged to be more excellent moldability.

1: No defective molding found.
2: No more than 3 defective moldings found.
3: More than 3 but no more than 5 defective moldings found.
4: More than 5 but no more than 10 defective moldings found.
5: More than 10 defective moldings found.

<Property Evaluating Conditions and Mechanical Property Measurement>

<Dispersion A, Outer Appearance Examination>

After stirring of dispersion A obtained in Production-1 was complete, it was placed in a 20 ml Laboran screw tube bottle by As One Corp. and the color of dispersion A was observed.

<Dispersion a, Precipitate Examination>

After stiing of dispersion A obtained in Production-1 was complete, it was placed in a 20 ml Laboran screw tube bottle by As One Corp., and the dispersion was allowed to stand for 48 hours. The outer appearance of precipitation in dispersion A after standing was visually examined.

A: Uniformly dispersed, no visible precipitation.
B: Dispersed, but slight visible precipitation.
C: Precipitation confirmed.

<Property Evaluating Conditions and Mechanical Property Measurement>

<Cellulose Nanofiber Aqueous Dispersion, Dilution Test>

The cellulose nanofiber aqueous dispersion obtained in Production-1 was placed in a 20 ml Laboran screw tube bottle by As One Corp., and diluted with distilled water to a cellulose concentration of 0.1 mass %. After stirring to prepare a homogeneous cellulose nanofiber aqueous dispersion, one drop was dropped onto a glass slide, and a cover glass was placed over the droplet. The cover glass was pressed, and the cellulose nanofiber aqueous dispersion protruding from the cover glasses was removed using a Kimwipe by Nippon Paper Crecia. The cellulose nanofiber aqueous dispersion between the glass slide-covers was visually observed using a VHX1000 and VH-Z100UR by Keyence Corp.

A: Uniformly dispersed, no visible aggregation.
B: Dispersed, but slight visible aggregation.
C: Aggregation confirmed.

<Dried Cellulose Nanofibers, Redispersion Test-1>

The dried cellulose nanofibers obtained in Production-2 were placed in a 20 ml Laboran screw tube bottle by As One Corp., and diluted with hexafluoroisopropanol to a cellulose concentration of 1 mass %. After standing for 24 hours, stimng was continued to prepare a homogeneous cellulose nanofiber solution, and the outer appearance was visually examined. Excellent re-solubility in the organic solvent was judged to be excellent solubility in resins as well.
A: Uniformly dispersed.
B: Dispersed, but slight visible aggregation.
C: Aggregation confirmed.
<Dried Cellulose Nanofibers, Redispersion Test-2>

The dried cellulose nanofibers obtained in Production-2 were placed in a 20 ml Laboran screw tube bottle by As One Corp., and diluted with distilled water to a cellulose concentration of 1 mass %. After standing for 24 hours, stirring was continued to prepare a homogeneous cellulose nanofiber aqueous dispersion, and the outer appearance was visually examined. Excellent re-solubility in distilled water was judged to be low aggregation between the cellulose and excellent solubility in resins as well.
A: Uniformly dispersed.
B: Dispersed, but slight visible aggregation.
C: Aggregation confirmed.
<Dried Cellulose Nanofibers, Heat Resistance Test>

The weight reduction of the dried cellulose nanofibers obtained in Production-2 at 170° C. for 60 minutes in an air atmosphere was measured using a 7Series/UNIX® TGA7 by PerkinElmer. Lower weight reduction was judged to be lower decomposition of the surface treatment agent and more excellent heat resistance.
<Molded Resin, Linear Expansion Coefficient>

Measurement was performed according to ISO11359-2, in a measuring temperature range of −40 to 100° C., using a 4 mm long, 4 mm wide, 4 mm length cuboid measuring sample cut out with a precision cutting saw from the center section of each multipurpose test piece obtained in <Production-4> above, and the expansion coefficients between 0° C. and 60° C. were calculated. A lower linear expansion coefficient was evaluated to be more excellent dispersibility of the cellulose nanofibers in resins.
<Molded Resin, Abrasion Resistance>

The multipurpose test piece obtained in <Production-4> above was subjected to a sliding test using a reciprocating friction wear tester (Model AFT-15MS by Toyo Precision Parts Mfg. Co., Ltd.) and a SUS304 test piece (5 mm-diameter sphere) as the partner material, with a linear speed of 50 mm/sec, a reciprocal distance of 50 mm, a load of 9.8 N, 10,000 reciprocal passes, a temperature of 23° C., and 50% humidity. The abrasion loss was measured as the abrasion loss of the sample after the sliding test (abraded depth) using a confocal microscope (OPTELICS® H1200, Lasertec Corp.). The abraded depth was the average value of measurement with n=4. The measured locations were locations 12.5 mm from the edges of the wear marks, at equal spacings. A lower numerical value for the abraded depth was evaluated as being more excellent abrasion properties.
<Molded resin, Coatability>

The multipurpose test piece obtained in <Production-4> above was coated using an aqueous coating spray gun (W-300-141G) filled with AQUA PLANIT #240 (black) by Dai Nippon Toryo Co., Ltd., and dried at 80° C. for 30 minutes. After drying, it was allowed to stand for 48 hours in a 23° C., 50% steady temperature and humidity environment, and the outer appearance was visually examined.
A: Surface gloss and excellent outer appearance.
B: Some haze in surface gloss, but excellent outer appearance.
C: Some outer appearance defects (unlevel sections, cratering, whitening, roughness, shrinkage, cissing, blistering or cracking).
D: Considerable visible surface roughness.
E: Visible surface roughness, with cracking.

Example I (First Embodiment)

[Cellulose-Containing Aqueous Dispersions: Examples 1-1 to 1-28 and Comparative Examples 1-1 to 1-13]

The surface treatment agent (B) and cellulose nanofibers (A) were used in the proportions listed in Tables 7 to 10 to obtain cellulose-containing aqueous dispersions, by the method described in Production-1. The obtained dispersions were evaluated according to the evaluation methods described above.

[Dried Cellulose: Examples 2-1 to 2-28 and Comparative Examples 2-1 to 2-13]

The cellulose-containing aqueous dispersions obtained in the Examples mentioned above (listed in Tables 7 to 10) were used to obtain dried cellulose (listed in Tables 7 to 10), by the method described in Production-2. Each obtained dried cellulose was evaluated according to the evaluation methods described above.

[Table 7]

TABLE 7

| | | | | Comp. Example 1-1 | Comp. Example 1-2 | Comp. Example 1-3 | Comp. Example 1-4 | Comp. Example 1-5 | Comp. Example 1-6 | Example 1-1 | Example 1-2 | Example 1-3 | Example 1-4 |
|---|---|---|---|---|---|---|---|---|---|---|---|---|---|
| Cellulose nanofiber aqueous dispersion composition | Water | | wt % | 90 | 87.5 | 87.5 | 87.5 | 87.5 | 87.5 | 87.5 | 87.5 | 87.5 | 87.5 |
| | Cellulose (A) | a-1 | wt % | 10 | 10 | 10 | 10 | 10 | 10 | 10 | 10 | 10 | 10 |
| | Surface treatment agent (B) | b-1 | wt % | | 2.5 | | | | | | | | |
| | | b-2 | wt % | | | 2.5 | | | | | | | |
| | | b-3 | wt % | | | | 2.5 | | | | | | |
| | | b-4 | wt % | | | | | 2.5 | | | | | |
| | | b-5 | wt % | | | | | | 2.5 | | | | |
| | | b-6 | wt % | | | | | | | 2.5 | | | |
| | | b-7 | wt % | | | | | | | | 2.5 | | |
| | | b-8 | wt % | | | | | | | | | 2.5 | |
| | | b-9 | wt % | | | | | | | | | | 2.5 |
| CNF dispersibility | | | [—] | C | C | C | C | C | C | B | B | B | B |

TABLE 7-continued

Example 1

| Dried cellulose nanofibers | | Comp. Example 2-1 | Comp. Example 2-2 | Comp. Example 2-3 | Comp. Example 2-4 | Comp. Example 2-5 | Comp. Example 2-6 | Example 2-1 | Example 2-2 | Example 2-3 | Example 2-4 |
|---|---|---|---|---|---|---|---|---|---|---|---|
| Redispersibility-1 | [—] | C | C | C | C | C | C | B | A | A | A |
| Redispersibility-2 | [—] | C | B | A | A | B | B | B | B | B | B |

TABLE 8

Example 1

| | | | | Example 1-5 | Example 1-6 | Example 1-7 | Example 1-8 | Example 1-9 | Example 1-10 | Example 1-11 | Example 1-12 | Example 1-13 | Example 1-14 |
|---|---|---|---|---|---|---|---|---|---|---|---|---|---|
| Cellulose nanofiber aqueous dispersion composition | Water | | wt % | 87.5 | 87.5 | 87.5 | 87.5 | 87.5 | 87.5 | 87.5 | 87.5 | 87.5 | 87.5 |
| | Cellulose (A) | a-1 | wt % | 10 | 10 | 10 | 10 | 10 | 10 | 10 | 10 | 10 | 10 |
| | Surface treatment agent (B) | b-10 | wt % | 2.5 | | | | | | | | | |
| | | b-11 | wt % | | 2.5 | | | | | | | | |
| | | b-12 | wt % | | | 2.5 | | | | | | | |
| | | b-13 | wt % | | | | 2.5 | | | | | | |
| | | b-14 | wt % | | | | | 2.5 | | | | | |
| | | b-13 | wt % | | | | | | 2.5 | | | | |
| | | b-16 | wt % | | | | | | | 2.3 | | | |
| | | b-17 | wt % | | | | | | | | 2.5 | | |
| | | b-18 | wt % | | | | | | | | | 2.5 | |
| | | b-19 | wt % | | | | | | | | | | 2.5 |
| CNF dispersibility | | | [—] | B | B | B | B | B | B | B | B | B | B |

| Dried cellulose nanofibers | | Example 2-5 | Example 2-6 | Example 2-7 | Example 2-8 | Example 2-9 | Example 2-10 | Example 2-11 | Example 2-12 | Example 2-13 | Example 2-14 |
|---|---|---|---|---|---|---|---|---|---|---|---|
| Redispersibility-1 | [—] | A | A | A | A | A | A | B | B | B | B |
| Redispersibility-2 | [—] | B | B | B | B | B | B | B | C | C | C |

TABLE 9

Example 1

| | | | | Comp. Example 1-7 | Comp. Example 1-8 | Example 1-15 | Example 1-16 | Comp. Example 1-9 | Comp. Example 1-10 | Comp. Example 1-11 | Comp. Example 1-12 | Comp. Example 1-13 |
|---|---|---|---|---|---|---|---|---|---|---|---|---|
| Cellulose nanofiber aqueous dispersion composition | Water | | wt % | 87.5 | 87.5 | 87.5 | 87.5 | 87.5 | 87.5 | 87.5 | 87.5 | 87.5 |
| | Cellulose (A) | a-1 | wt % | 10 | 10 | 10 | 10 | 10 | 10 | 10 | 10 | 10 |
| | Surface treatment agent (B) | b-20 | wt % | 2.5 | | | | | | | | |
| | | b-21 | wt % | | 2.5 | | | | | | | |
| | | b-22 | wt % | | | 2.5 | | | | | | |
| | | b-23 | wt % | | | | 2.5 | | | | | |
| | | b-24 | wt % | | | | | 2.5 | | | | |
| | | b-25 | wt % | | | | | | 2.5 | | | |
| | | b-26 | wt % | | | | | | | 2.5 | | |
| | | b-27 | wt % | | | | | | | | 2.5 | |
| | | b-28 | wt % | | | | | | | | | 2.5 |
| CNF dispersibility | | | [—] | C | C | A | A | C | C | C | C | C |

| Dried cellulose nanofibers | | Comp. Example 2-7 | Comp. Example 2-8 | Example 2-15 | Example 2-16 | Comp. Example 2-9 | Comp. Example 2-10 | Comp. Example 2-11 | Comp. Example 2-12 | Comp. Example 2-13 |
|---|---|---|---|---|---|---|---|---|---|---|
| Redispersibility-1 | [—] | C | C | A | A | C | C | C | C | C |
| Redispersibility 2 | [—] | B | B | A | A | B | B | B | B | B |

[Table 10]

TABLE 10

| | | | | Example 1 | | | | | | | | | | | |
|---|---|---|---|---|---|---|---|---|---|---|---|---|---|---|---|
| | | | | Example 1-17 | Example 1-18 | Example 1-19 | Example 1-20 | Example 1-21 | Example 1-22 | Example 1-23 | Example 1-24 | Example 1-25 | Example 1-26 | Example 1-27 | Example 1-28 |
| Cellulose nanofiber aqueous dispersion composition | Water | | wt % | 87.5 | 87.5 | 87.5 | 87.5 | 86.5 | 86.5 | 86.5 | 86.5 | 86.5 | 86.5 | 86.5 | 86.5 |
| | Cellulose (A) | a-1 | wt % | | | | | | 10 | 10 | 10 | 10 | 10 | 10 | 10 |
| | | a-2 | wt % | 10 | 10 | 10 | 10 | | | | | | | | |
| | Surface treatment agent (B) | b-8 | wt % | 2.5 | | | | 2.5 | 2.5 | 2.5 | 2.5 | 2.3 | 2.3 | 2.5 | 2.5 |
| | | b-9 | wt % | | 2.5 | | | | | | | | | | |
| | | b-10 | wt % | | | | | | | | | | | | |
| | | b-11 | wt % | | | 2.5 | | | | | | | | | |
| | | b-12 | wt % | | | | 2.5 | | | | | | | | |
| | Water-soluble organic solvent (C) | c-1 | wt % | | | | | 1 | | | | | | | |
| | | c-2 | wt % | | | | | | 1 | | | | | | |
| | | c-3 | wt % | | | | | | | 1 | | | | | |
| | | c-4 | wt % | | | | | | | | 1 | | | | 1 |
| | | c-5 | wt % | | | | | | | | | 1 | | | |
| | | c-6 | wt % | | | | | | | | | | 1 | | |
| | | c-7 | wt % | | | | | | | | | | | 1 | |
| CNF dispersibility | | | [—] | A | A | A | A | A | A | A | A | A | A | A | A |
| | | | | Example 2-17 | Example 2-18 | Example 2-19 | Example 2-20 | Example 2-21 | Example 2-22 | Example 2-23 | Example 2-24 | Example 2-25 | Example 2-26 | Example 2-27 | Example 2-28 |
| Dried cellulose nanofibers | | | | | | | | | | | | | | | |
| Redispersibility-1 | | | [—] | A | A | A | A | A | A | A | A | A | A | A | A |
| Redispersibility-2 | | | [—] | B | B | B | B | A | A | A | A | A | A | A | A |

[Resin Compositions: Examples 3-1 to 3-56 and Comparative Examples 3-1 to 3-16]

The cellulose-containing aqueous dispersions (listed in Tables 7 to 10) and dried cellulose (listed in Tables 7 to 10) obtained in the Examples mentioned above were used to obtain resin compositions (listed in Tables 11 to 21), by the method described in Production-3. The obtained compositions were molded by the method described in Production-5.

The Examples and Comparative Examples listed in Tables 7 to 10 (Examples 1-1 to 1-28 and Comparative Examples 1-1 to 1-13, and Examples 2-1 to 2-28 and Comparative Examples 2-1 to 2-13) that are not listed in Tables 11 to 21, were produced by the methods described in Production-1 and -2 using the proportions listed in the respective tables, except for the thermoplastic resin (F). Compositions and molded articles were then obtained by the methods described in Production-3 and -4.

For Example 3-46-1 in Table 19, c-4 was added at 1 mass % instead of water during Production-1. The procedure was otherwise carried out in the same manner as Example 3-46. For Example 3-48-1, c-3 was added at 1 mass % instead of water during Production-1. The procedure was otherwise carried out in the same manner as Example 3-48. For Example 3-50-1, c-3 was added at 1 mass % instead of water during Production-1. The procedure was otherwise carried out in the same manner as Example 3-50.

The molded articles were evaluated according to the evaluation methods described above.

[Table 11]

TABLE 11

| | | | | Example 1 | | | | | | |
|---|---|---|---|---|---|---|---|---|---|---|
| | | | | Comp. Example 3-1 Comp. Example 1-1 | Comp. Example 3-2 Comp. Example 1-2 | Comp. Example 3-3 Comp. Example 1-3 | Comp. Example 3-4 Comp. Example 1-4 | Comp. Example 3-5 Comp. Example 1-5 | Comp. Example 3-6 Comp. Example 1-6 | Example 3-1 Example 1-1 |
| Composition | Thermoplastic resin (F) | f-1 | wt % | 90 | 87.5 | 87.5 | 87.5 | 87.5 | 87.5 | 87.5 |
| | Cellulose (A) | a-1 | wt % | 10 | 10 | 10 | 10 | 10 | 10 | 10 |
| | Surface treatment agent (B) | b-1 | wt % | | 2.5 | | | | | |
| | | b-2 | wt % | | | 2.5 | | | | |
| | | b-3 | wt % | | | | 2.5 | | | |
| | | b-4 | wt % | | | | | 2.5 | | |
| | | b-5 | wt % | | | | | | 2.5 | |
| | | b-6 | wt % | | | | | | | 2.5 |
| Mechanical properties | Tensile strength | | MPa | 82 | 92 | 94 | 104 | 116 | 116 | 119 |
| | Tensile breaking elongation | | % | 3 | 9 | 10 | 12 | 13 | 13 | 13 |
| | Tensile yield | | Present/absent | Absent | Present | Present | Present | Present | Present | Present |
| | Flexural modulus | | MPa | 3725 | 3850 | 3900 | 3950 | 4000 | 4000 | 4010 |
| | Linear expansion coefficient | | ppm/K | 61 | 45 | 43 | 38 | 35 | 35 | 33 |

TABLE 11-continued

Example 1

| | | | Comp. Example 3-1 Comp. Example 1-1 | Comp. Example 3-2 Comp. Example 1-2 | Comp. Example 3-3 Comp. Example 1-3 | Comp. Example 3-4 Comp. Example 1-4 | Comp. Example 3-5 Comp. Example 1-5 | Comp. Example 3-6 Comp. Example 1-6 | Example 3-1 Example 1-1 |
|---|---|---|---|---|---|---|---|---|---|
| Other properties | Abrasion resistance | [μm] | 92 | 35 | 10 | 5 | 3 | 3 | 3 |
| | Odor | [—] | 1 | 2 | 2 | 2 | 2 | 2 | 1 |
| | Moldability | [—] | 3 | 2 | 2 | 2 | 2 | 2 | 1 |

[Table 12]

TABLE 12

Example 1

| | | | | Example 3-2 Example 1-2 | Example 3-3 Example 1-3 | Example 3-4 Example 1-4 | Example 3-5 Example 1-5 | Example 3-6 Example 1-6 | Example 3-7 Example 1-7 | Example 3-8 Example 1-8 | Example 3-9 Example 1-9 | Example 3-10 Example 1-10 | Example 3-11 Example 1-11 | Example 3-12 Example 1-12 |
|---|---|---|---|---|---|---|---|---|---|---|---|---|---|---|
| Composition | Thermoplastic resin (F) | f-1 | wt % | 87.5 | 87.5 | 87.5 | 87.5 | 87.5 | 87.5 | 87.5 | 87.5 | 87.5 | 87.5 | 87.5 |
| | Cellulose (A) | a-1 | wt % | 10 | 10 | 10 | 10 | 10 | 10 | 10 | 10 | 10 | 10 | 10 |
| | Surface treatment agent (B) | b-7 | wt % | 2.5 | | | | | | | | | | |
| | | b-8 | wt % | | 2.5 | | | | | | | | | |
| | | b-9 | wt % | | | 2.5 | | | | | | | | |
| | | b-10 | wt % | | | | 2.5 | | | | | | | |
| | | b-11 | wt % | | | | | 2.5 | | | | | | |
| | | b-12 | wt % | | | | | | 2.5 | | | | | |
| | | b-13 | wt % | | | | | | | 2.5 | | | | |
| | | b-14 | wt % | | | | | | | | 2.5 | | | |
| | | b-15 | wt % | | | | | | | | | 2.5 | | |
| | | b-16 | wt % | | | | | | | | | | 2.5 | |
| | | b-17 | wt % | | | | | | | | | | | 2.5 |
| Mechanical properties | Tensile strength | | MPa | 119 | 124 | 126 | 119 | 118 | 118 | 118 | 104 | 103 | 100 | 94 |
| | Tensile breaking elongation | | % | 12 | 12 | 13 | 13 | 12 | 12 | 12 | 10 | 10 | 8 | 7 |
| | Tensile yield | | Present/absent | Present | Present | Present | Present | Present | Present | Present | Present | Present | Present | Present |
| | Flexural modulus | | MPa | 4020 | 4040 | 4050 | 4000 | 4050 | 4050 | 4000 | 3950 | 3950 | 3900 | 3850 |
| | Linear expansion coefficient | | ppm/K | 33 | 33 | 31 | 33 | 31 | 33 | 33 | 38 | 40 | 43 | 45 |
| Other properties | Abrasion resistance | | [μm] | 2 | 2 | 2 | 2 | 2 | 2 | 2 | 4 | 7 | 8 | 10 |
| | Odor | | [—] | 1 | 1 | 1 | 1 | 1 | 1 | 2 | 2 | 2 | 2 | 2 |
| | Moldability | | [—] | 1 | 1 | 1 | 1 | 1 | 1 | 2 | 2 | 2 | 2 | 2 |

[Table 13]

TABLE 13

Example 1

| | | | | Example 3-13 Example 1-13 | Example 3-14 Example 1-14 | Comp. Example 3-7 Comp. Example 1-7 | Comp. Example 3-8 Comp. Example 1-8 | Example 3-15 Comp. Example 1-15 | Example 3-16 Comp. Example 1-16 | Comp. Example 3-9 Comp. Example 1-9 | Comp. Example 3-10 Comp. Example 1-10 | Comp. Example 3-11 Comp. Example 1-11 | Comp. Example 3-12 Comp. Example 1-12 | Comp. Example 3-13 Comp. Example 1-13 |
|---|---|---|---|---|---|---|---|---|---|---|---|---|---|---|
| Composition | Thermoplastic resin (F) | f-1 | wt % | 87.5 | 87.5 | 87.5 | 87.5 | 87.5 | 87.5 | 87.5 | 87.5 | 87.5 | 87.5 | 87.5 |

TABLE 13-continued

Example 1

|  |  |  | Example 3-13 Example 1-13 | Example 3-14 Example 1-14 | Comp. Example 3-7 Comp. Example 1-7 | Comp. Example 3-8 Comp. Example 1-8 | Example 3-15 Example 1-15 | Example 3-16 Example 1-16 | Comp. Example 3-9 Comp. Example 1-9 | Comp. Example 3-10 Comp. Example 1-10 | Comp. Example 3-11 Comp. Example 1-11 | Comp. Example 3-12 Comp. Example 1-12 | Comp. Example 3-13 Comp. Example 1-13 |
|---|---|---|---|---|---|---|---|---|---|---|---|---|---|
|  | Cellulose (A) | a-1 wt % | 10 | 10 | 10 | 10 | 10 | 10 | 10 | 10 | 10 | 10 | 10 |
|  | Surface treatment agent (B) | b-18 wt % | 2.5 |  |  |  |  |  |  |  |  |  |  |
|  |  | b-19 wt % |  | 2.5 |  |  |  |  |  |  |  |  |  |
|  |  | b-20 wt % |  |  | 2.5 |  |  |  |  |  |  |  |  |
|  |  | b-21 wt % |  |  |  | 2.5 |  |  |  |  |  |  |  |
|  |  | b-22 wt % |  |  |  |  | 2.5 |  |  |  |  |  |  |
|  |  | b-23 wt % |  |  |  |  |  | 2.5 |  |  |  |  |  |
|  |  | b-24 wt % |  |  |  |  |  |  | 2.5 |  |  |  |  |
|  |  | b-25 wt % |  |  |  |  |  |  |  | 2.5 |  |  |  |
|  |  | b-26 wt % |  |  |  |  |  |  |  |  | 2.5 |  |  |
|  |  | b-27 wt % |  |  |  |  |  |  |  |  |  | 2.5 |  |
|  |  | b-28 wt % |  |  |  |  |  |  |  |  |  |  | 2.5 |
| Mechanical properties | Tensile strength | MPa | 90 | 90 | 85 | 85 | 128 | 130 | 90 | 85 | 83 | 80 | 100 |
|  | Tensile breaking elongation | % | 7 | 6 | 3 | 5 | 12 | 12 | 6 | 3 | 3 | 3 | 7 |
|  | Tensile yield | Present/absent | Absent | Absent | Absent | Present | Present | Present | Absent | Absent | Absent | Absent | Present |
|  | Flexoral modulus | MPa | 3850 | 3850 | 3850 | 3850 | 4100 | 4100 | 3850 | 3850 | 3850 | 3800 | 3850 |
|  | Linear expansion coefficient | ppm/K | 48 | 48 | 50 | 58 | 31 | 31 | 43 | 45 | 46 | 57 | 45 |
| Other properties | Abrasion resistance | [μm] | 15 | 20 | 35 | 35 | 2 | 2 | 15 | 13 | 12 | 11 | 10 |
|  | Odor | [—] | 2 | 2 | 2 | 2 | 2 | 2 | 5 | 5 | 5 | 5 | 4 |
|  | Moldability | [—] | 2 | 2 | 2 | 2 | 2 | 2 | 4 | 4 | 4 | 4 | 5 |

[Table 14]

TABLE 14

Example 1

|  |  |  | Example 3-3 Example 1-3 | Example 3-4 Example 1-4 | Example 3-6 Example 1-6 | Example 3-7 Example 1-7 | Example 3-17 Example 1-17 | Example 3-18 Example 1-18 | Example 3-19 Example 1-19 | Example 3-20 Example 1-20 |
|---|---|---|---|---|---|---|---|---|---|---|
| Composition | Thermoplastic resin (F) | f-1 wt % | 87.5 | 87.5 | 87.5 | 87.5 | 87.5 | 87.5 | 87.5 | 87.5 |
|  | Cellulose (A) | a-1 wt % | 10 | 10 | 10 | 10 |  |  |  |  |
|  |  | a-2 wt % |  |  |  |  | 10 | 10 | 10 | 10 |
|  | Surface treatment agent (B) | b-8 wt % | 2.5 |  |  |  |  | 2.5 |  |  |
|  |  | b-9 wt % |  | 2.5 |  |  |  |  | 2.5 |  |
|  |  | b-10 wt % |  |  |  |  |  |  |  |  |
|  |  | b-11 wt % |  |  | 2.5 |  |  |  |  | 2.5 |
|  |  | b-12 wt % |  |  |  | 2.5 |  |  |  |  |
| Mechanical properties | Tensile strength | MPa | 125 | 126 | 128 | 119 | 128 | 132 | 129 | 124 |
|  | Tensile breaking elongation | % | 12 | 12 | 13 | 12 | 12 | 13 | 12 | 12 |
|  | Tensile yield | Present/absent | Present | Present | Present | Present | Present | Present | Present | Present |
|  | Flexural modulus | MPa | 4040 | 4040 | 4050 | 4050 | 4050 | 4050 | 4050 | 4050 |
|  | Linear expansion coefficient | ppm/K | 33 | 33 | 31 | 33 | 28 | 27 | 28 | 27 |
| Other properties | Abrasion resistance | [μm] | 2 | 2 | 2 | 2 | 2 | 2 | 2 | 2 |
|  | Odor | [—] | 1 | 1 | 1 | 1 | 1 | 1 | 1 | 1 |
|  | Moldability | [—] | 1 | 1 | 1 | 1 | 1 | 1 | 1 | 1 |

[Table 15]

TABLE 15

| | | | | Example 1 | | | | | | | |
|---|---|---|---|---|---|---|---|---|---|---|---|
| | | | | Example 3-21 | Example 3-22 | Example 3-23 | Example 3-24 | Example 3-25 | Example 3-26 | Example 3-27 | Example 3-28 |
| | | | | Example 1-21 | Example 1-22 | Example 1-23 | Example 1-24 | Example 1-25 | Example 1-26 | Example 1-27 | Example 1-28 |
| Composition | Thermoplastic resin (F) | f-1 | wt % | 87.5 | 87.5 | 87.5 | 87.5 | 87.5 | 87.5 | 87.5 | 87.5 |
| | Cellulose (A) | a-1 | wt % | 10 | 10 | 10 | 10 | 10 | 10 | 10 | |
| | | a-2 | wt % | | | | | | | | 10 |
| | Surface treatment agent (B) | b-8 | wt % | 2.5 | 2.5 | 2.5 | 2.5 | 2.5 | 2.5 | 2.5 | 2.5 |
| Molded article | Organic solvent residue in composition | | ppm | 350 | 400 | 520 | 600 | 630 | 580 | 1050 | 600 |
| Mechanical properties | Tensile strength | | MPa | 125 | 126 | 126 | 125 | 125 | 125 | 125 | 130 |
| | Tensile breaking elongation | | % | 12 | 12 | 12 | 12 | 12 | 12 | 12 | 12 |
| | Tensile yield | | Present/absent | Present | Present | Present | Present | Present | Present | Present | Present |
| | Flexural modulus | | MPa | 4100 | 4100 | 4100 | 4100 | 4100 | 4100 | 4100 | 4100 |
| | Linear expansion coefficient | | ppm/K | 30 | 29 | 28 | 27 | 26 | 26 | 27 | 25 |
| Other properties | Abrasion resistance | | [μm] | 2 | 2 | 2 | 2 | 2 | 2 | 2 | 2 |
| | Odor | | [—] | 1 | 1 | 1 | 1 | 1 | 1 | 1 | 1 |
| | Moldability | | [—] | 1 | 1 | 1 | 1 | 1 | 1 | 1 | 1 |

[Table 16]

TABLE 16

| | | | | Example 1 | | | | | | | | | | | | |
|---|---|---|---|---|---|---|---|---|---|---|---|---|---|---|---|---|
| | | | | Example 3-3 Example 1-3 | Comp. Example 3-14 | Comp. Example 3-1 Comp. Example 1-1 | Example 3-29 | Example 3-30 | Example 3-31 | Example 3-32 | Example 3-33 | Example 3-34 | Example 3-35 | Example 3-36 | Example 3-37 |
| Composition | Thermoplastic resin (F) | f-1 | wt % | 87.5 | 100 | 90 | 89.95 | 89.5 | 89 | 87 | 85 | 82 | 80 | 78 | 75 |
| | Cellulose (A) | a-1 | wt % | 10 | | | 10 | 10 | 10 | 10 | 10 | 10 | 10 | 10 | 10 |
| | Surface treatment agent (B) | b-8 | wt % | 2.5 | | | 0.05 | 0.5 | 1 | 3 | 5 | 8 | 10 | 12 | 15 |
| Mechanical properties | Tensile strength | | MPa | 125 | 76 | 82 | 82 | 95 | 120 | 127 | 120 | 114 | 100 | 98 | 95 |
| | Tensile breaking elongation | | % | 12 | 40 | 3 | 4 | 8 | 11 | 15 | 15 | 20 | 25 | 30 | 50 |
| | Tensile yield | | Present/absent | Present | Present | Absent | Absent | Absent | Present | Present | Present | Present | Present | Present | Present |
| | Flexural modulus | | MPa | 4040 | 2600 | 3725 | 3725 | 3850 | 4000 | 4050 | 4000 | 4000 | 3950 | 3950 | 3850 |
| | Linear expansion coefficient | | ppm/K | 33 | 82 | 61 | 58 | 45 | 36 | 30 | 28 | 36 | 42 | 42 | 45 |
| Other properties | Abrasion resistance | | [μm] | 2 | 155 | 92 | 85 | 50 | 10 | 3 | 2 | 5 | 10 | 15 | 20 |
| | Odor | | [—] | 1 | 1 | 1 | 1 | 1 | 1 | 1 | 1 | 2 | 2 | 2 | 2 |
| | Moldability | | [—] | 1 | 2 | 3 | 2 | 2 | 1 | 1 | 1 | 2 | 2 | 2 | 2 |

[Table 17]

TABLE 17

Example 1

| | | | | Example 3-3 Example 1-3 | Comp. Example 3-14 | Comp. Example 3-1 Comp. Example 1-1 | Example 3-38 | Example 3-39 | Example 3-40 | Example 3-41 | Example 3-42 | Example 3-43 | Example 3-44 | Example 3-45 |
|---|---|---|---|---|---|---|---|---|---|---|---|---|---|---|
| Composition | Thermoplastic resin (F) | f-1 | wt % | 87.5 | 100 | 90 | 99.38 | 98.75 | 96.25 | 93.75 | 90 | 83.75 | 75 | 50 |
| | Cellulose (A) | a-1 | wt % | 10 | | 10 | 0.5 | 1 | 3 | 5 | 8 | 13 | 20 | 40 |
| | Surface treatment agent (B) | b-8 | wt % | 2.5 | | | 0.125 | 0.25 | 0.75 | 1.25 | 2 | 3.25 | 8 | 10 |
| Mechanical properties | Tensile strength | | MPa | 125 | 76 | 82 | 80 | 85 | 88 | 90 | 120 | 150 | 150 | 150 |
| | Tensile breaking elongation | | % | 12 | 40 | 3 | 20 | 15 | 13 | 12 | 10 | 8 | 8 | 8 |
| | Tensile yield | | Present/absent | Present | Present | Absent | Present | Present | Present | Present | Present | Present | Absent | Absent |
| | Flexural modulus | | MPa | 4040 | 2600 | 3725 | 2900 | 3000 | 3200 | 3400 | 4500 | 5800 | 9625 | 20,000 |
| | Linear expansion coefficient | | ppm/K | 33 | 82 | 61 | 71 | 60 | 51 | 45 | 36 | 24 | 16 | 7 |
| Other properties | Abrasion resistance | | [μm] | 2 | 155 | 92 | 100 | 60 | 25 | 4 | 3 | 1 | 1 | 1 |
| | Odor | | [—] | 1 | 1 | 1 | 1 | 1 | 1 | 1 | 1 | 1 | 1 | 2 |
| | Moldability | | [—] | 1 | 2 | 3 | 3 | 2 | 1 | 1 | 1 | 1 | 1 | 2 |

[Table 18]

TABLE 18

Example 1

| | | | | Example 3-3 Example 1-3 | Example 3-3-1 Example 2-3 | Example 3-15 Example 1-15 | Example 3-15-1 Example 2-15 | Comp. Example 3-2 Comp. Example 1-2 | Comp. Example 3-2-1 Comp. Example 2-2 | Comp. Example 3-13 Comp. Example 1-13 | Comp. Example 3-13-1 Comp. Example 2-13 |
|---|---|---|---|---|---|---|---|---|---|---|---|
| Composition | Thermoplastic resin (F) | f-1 | wt % | 87.5 | 87.5 | 87.5 | 87.5 | 87.5 | 87.5 | 87.5 | 87.5 |
| | Cellulose (A) | a-1 | wt % | 10 | 10 | 10 | 10 | 10 | 10 | 10 | 10 |
| | Surface treatment agent (B) | b-1 | wt % | | | | | 2.5 | 2.5 | | |
| | | b-8 | wt % | 2.5 | 2.5 | | | | | | |
| | | b-22 | wt % | | | 2.5 | 2.5 | | | | |
| | | b-28 | wt % | | | | | | | 2.5 | 2.5 |
| Mechanical properties | Tensile strength | | MPa | 125 | 125 | 124 | 125 | 92 | 92 | 100 | 105 |
| | Tensile breaking elongation | | % | 12 | 12 | 12 | 12 | 9 | 9 | 7 | 8 |
| | Tensile yield | | Present/absent | Present | Present | Present | Present | Present | Present | Present | Prosent |
| | Flexural modulus | | MPa | 4040 | 4050 | 4100 | 4120 | 3850 | 3850 | 3850 | 3850 |
| | Linear expansion coefficient | | ppm/K | 33 | 32 | 31 | 30 | 45 | 48 | 43 | 43 |
| Other properties | Abrasion resistance | | [μm] | 2 | 2 | 2 | 2 | 35 | 38 | 10 | 12 |
| | Odor | | [—] | 1 | 1 | 2 | 2 | 1 | 1 | 4 | 4 |
| | Moldability | | [—] | 1 | 1 | 2 | 2 | 2 | 2 | 5 | 4 |

[Table 19]

TABLE 19

Example 1

| | | | | Comp. Example 3-14 | Example 3-17 | Example 3-46 | Example 3-46-1 | Comp. Example 3-15 | Example 3-47 |
|---|---|---|---|---|---|---|---|---|---|
| Composition | Thermoplastic resin (F) | f-1 | wt % | 100 | 87.5 | 87.5 | 87.5 | | |
| | | f-2 | wt % | | | | | 100 | 87.5 |
| | | f-3 | wt % | | | | | | |
| | Cellulose (A) | a-2 | wt % | | 10 | 10 | 10 | | 10 |
| | Surface treatment agent (B) | b-8 | wt % | | 2.5 | | | | 2.5 |
| | | b-22 | wt % | | | | 2.5 | | |
| Molded article | Organic solvent residue in composition | | ppm | | | | 800 | | |

TABLE 19-continued

Example 1

| | | | | | | | | | |
|---|---|---|---|---|---|---|---|---|---|
| Mechanical properties | Tensile strength | MPa | 76 | 128 | 130 | 130 | 36 | 58 |
| | Tensile breaking elongation | % | 40 | 12 | 12 | 12 | 200 | 10 |
| | Tensile yield | Prevent/absent | Present | Present | Present | Present | Present | Absent |
| | Flexural modolus | MPa | 2600 | 4100 | 4100 | 4100 | 2200 | 2600 |
| | Linear expansion coefficient | ppm/K | 82 | 28 | 26 | 26 | 88 | 40 |
| Other properties | Abrasion resistance | [μm] | 155 | 2 | 2 | 2 | 80 | 4 |
| | Odor | [—] | 1 | 1 | 1 | 1 | 2 | 1 |
| | Moldability | [—] | 2 | 1 | 1 | 1 | 1 | 1 |

| | | | | | Example 3-48 | Example 3-48-1 | Comp. Example 3-16 | Example 3-49 | Example 3-50 | Example 3-50-1 |
|---|---|---|---|---|---|---|---|---|---|---|
| Composition | Thermoplastic resin (F) | f-1 | wt % | | | | | | | |
| | | f-2 | wt % | | 87.5 | 87.5 | | | | |
| | | f-3 | wt % | | | | 100 | 87.5 | 87.5 | 87.5 |
| | Cellulose (A) | a-2 | wt % | | 10 | 10 | | 10 | 10 | 10 |
| | Surface treatment agent (B) | b-8 | wt % | | | | | 2.5 | | |
| | | b-22 | wt % | | 2.5 | 2.5 | | | 25 | 2.5 |
| Molded article | Organic solvent residue in composition | | ppm | | | 850 | | | | 750 |
| Mechanical properties | Tensile strength | | MPa | | 60 | 60 | 63 | 105 | 108 | 108 |
| | Tensile breaking elongation | | % | | 10 | 10 | 30 | 12 | 12 | 12 |
| | Tensile yield | | Prevent/absent | | Absent | Absent | Present | Present | Present | Present |
| | Flexural modolus | | MPa | | 2650 | 2650 | 2500 | 3950 | 3950 | 3950 |
| | Linear expansion coefficient | | ppm/K | | 38 | 36 | 100 | 51 | 48 | 46 |
| Other properties | Abrasion resistance | | | | 4 | 3 | 10 | 1 | 1 | 1 |
| | Odor | | [μm] | | 1 | 1 | 1 | 1 | 1 | 1 |
| | Moldability | | [—] | | 1 | 1 | 1 | 1 | 1 | 1 |

[Table 20]

TABLE 20

Example I

| | | | | Example 3-3 Comp. Example 1-3 | Comp. Example 3-13 Comp. Example 1-13 | Example 3-51 | Example 3-52 | Example 3-53 | Example 3-54 |
|---|---|---|---|---|---|---|---|---|---|
| Composition | Thermoplastic resin (F) | f-1 | wt % | 87.5 | 87.5 | 87.5 | 87.5 | 87.5 | 87.5 |
| | Cellulose (A) | a-1 | wt % | 10 | 10 | 10 | 10 | 10 | 10 |
| | | b-8 | wt % | 2.5 | | | | | |
| | | b-28 | wt % | | 2.5 | | | | |
| | Surface treatment agent (B) | b-29 | wt % | | | 2.5 | | | |
| | | b-30 | wt % | | | | 2.5 | | |
| | | b-31 | wt % | | | | | 2.5 | |
| | | b-32 | wt % | | | | | | 2.5 |
| Mechanical properties | Tensile strength | | MPa | 125 | 100 | 105 | 105 | 110 | 105 |
| | Tensile breaking elongation | | % | 12 | 7 | 8 | 8 | 9 | 8 |
| | Tensile yield | | Present/absent | Present | Present | Present | Present | Present | Present |
| | Flexural modulus | | MPa | 4040 | 3850 | 3850 | 3900 | 3900 | 3900 |
| | Linear expansion coefficient | | ppm/K | 33 | 45 | 43 | 40 | 38 | 40 |
| Other properties | Abrasion resistance | | [μm] | 2 | 10 | 8 | 6 | 5 | 7 |
| | Odor | | [—] | 1 | 4 | 3 | 3 | 3 | 3 |
| | Moldability | | [—] | 1 | 5 | 4 | 4 | 4 | 4 |

[Table 21]

TABLE 21

| | | | Example I | | | |
|---|---|---|---|---|---|---|
| | | | Example 1-3 Example 3-3 | Example 1-15 Example 3-15 | Example 3-55 | Example 3-56 |
| Composition | Thermoplastic resin (F) f-1 | wt % | 87.5 | 87.5 | 86.5 | 86.5 |
| | Cellulose (A) a-1 | wt % | 10 | 10 | 10 | 10 |
| | Surface treatment agent b-8 | wt % | 2.5 | | 2.5 | |
| | (B) b-22 | wt % | | 2.5 | | 2.5 |
| | Binder component (D) d-6 | wt % | | | 1 | 1 |
| Mechanical properties | Tensile strength | MPa | 125 | 124 | 127 | 128 |
| | Tensile breaking elongation | % | 12 | 12 | 12 | 12 |
| | Tensile yield | Present/absent | Present | Present | Present | Present |
| | Flexural modulus | MPa | 4040 | 4100 | 4150 | 4150 |
| | Linear expansion coefficient | ppm/K | 33 | 31 | 28 | 26 |
| Other properties | Abrasion resistance | [μm] | 2 | 2 | 2 | 1 |
| | Odor | A-E | 1 | 2 | 2 | 1 |
| | Moldability | A-E | 1 | 2 | 3 | 1 |

Example II (First Embodiment)

[Cellulose Nanofiber Aqueous Dispersion: Examples 1-1 to 1-37 and Comparative Examples 1-1 to 1-7]

The method described in Production-1 was used to obtain dispersions using each of the components in the proportions listed in Tables 22 to 24. The obtained dispersions were evaluated according to the evaluation methods described above.

[Dried Cellulose Nanofibers: Examples 2-1 to 2-37 and Comparative Examples 2-1 to 2-7]

The cellulose nanofiber aqueous dispersions obtained in the Examples described above (listed in Tables 22 to 24) were used to obtain dried cellulose nanofibers (listed in Tables 22 to 24) by the method described in Production-2. Each obtained dried cellulose was evaluated according to the evaluation methods described above.

[Table 22]

TABLE 22

| | | | | Example II | | | | | | |
|---|---|---|---|---|---|---|---|---|---|---|
| | | | | Comp. Example 1-1 | Comp. Example 1-2 | Comp. Example 1-3 | Comp. Example 1-4 | Comp. Example 1-5 | Comp. Example 1-6 | Comp. Example 1-7 |
| Dispersion composition | Water | | wt % | 90.00 | 87.50 | 87.47 | 87.47 | 87.47 | 87.47 | 87.47 |
| | Cellulose (A) | a-1 | wt % | 10.00 | 10.00 | 10.00 | 10.00 | 10.00 | 10.00 | 10.00 |
| | Surface treatment agent (B) | b-1 | wt % | | 2.50 | 2.30 | | | | |
| | | b-4 | wt % | | | | | 2.50 | | |
| | | b-8 | wt % | | | | | | | |
| | | b-9 | wt % | | | | | | | |
| | | b-13 | wt % | | | | | | | |
| | | b-14 | wt % | | | | | | | |
| | | b-16 | wt % | | | | | | | |
| | | b-17 | wt % | | | | | | | |
| | | b-20 | wt % | | | | | | 2.50 | |
| | | b-22 | wt % | | | | | | | |
| | | b-28 | wt % | | | | | | | 2.50 |
| | | b-34 | wt % | | | | | 2.50 | | |
| | Antioxidant (E) | c-1 | wt % | | | 0.03 | 0.03 | 0.03 | 0.03 | 0.03 |
| CNE dispersibility | | | [—] | C | B | B | A | A | B | B |

| | | | Comp. Example 2-1 | Comp. Example 2-2 | Comp. Example 2-3 | Comp. Example 2-4 | Comp. Example 2-5 | Comp. Example 2-6 | Comp. Example 2-7 |
|---|---|---|---|---|---|---|---|---|---|
| Redispersibility-1 | | [—] | C | C | C | C | C | B | B |
| Redispersibility-2 | | [—] | C | B | B | B | B | B | B |
| Heat resistance | | [wt %] | 2.3 | 20.2 | 1.1 | 1.2 | 1.1 | 1.2 | 1.1 |

| | | | | Example 1-1 | Example 1-2 | Example 1-3 | Example 1-4 | Example 1-5 | Example 1-6 | Example 1-7 |
|---|---|---|---|---|---|---|---|---|---|---|
| Dispersion composition | Water | | wt % | 87.47 | 87.47 | 87.47 | 87.47 | 87.47 | 87.47 | 87.47 |
| | Cellulose (A) | a-1 | wt % | 10.00 | 10.00 | 10.00 | 10.00 | 10.00 | 10.00 | 10.00 |
| | Surface treatment agent (B) | b-1 | wt % | | | | | | | |
| | | b-4 | wt % | | | | | | | |
| | | b-8 | wt % | 2.50 | | | | | | |
| | | b-9 | wt % | | 2.50 | | | | | |

TABLE 22-continued

| | | | | | Example II | | | | |
|---|---|---|---|---|---|---|---|---|---|
| | b-13 | wt % | | | 2.50 | | | | |
| | b-14 | wt % | | | | 2.50 | | | |
| | b-16 | wt % | | | | | 2.50 | | |
| | b-17 | wt % | | | | | | 2.50 | |
| | b-20 | wt % | | | | | | | |
| | b-22 | wt % | | | | | | | 2.50 |
| | b-28 | wt % | | | | | | | |
| | b-34 | wt % | | | | | | | |
| Anti-oxidant (E) | c-1 | wt % | 0.03 | 0.03 | 0.03 | 0.03 | 0.03 | 0.03 | 0.03 |
| CNE dispersibility | | [—] | A | A | A | A | A | B | B |

| | | Example 2-1 | Example 2-2 | Example 2-3 | Example 2-4 | Example 2-5 | Example 2-6 | Example 2-7 |
|---|---|---|---|---|---|---|---|---|
| Redispersibility-1 | [—] | B | B | B | B | B | B | B |
| Redispersibility-2 | [—] | B | B | B | B | B | C | B |
| Heat resistance | [wt %] | 1.2 | 1.1 | 1.3 | 1.2 | 1.2 | 1.2 | 1.3 |

[Table 23]

TABLE 23

| | | | | Example II | | | | |
|---|---|---|---|---|---|---|---|---|
| | | | | Example 1-8 | Example 1-9 | Example 1-10 | Example 1-11 | Example 1-12 |
| Dispersion composition | Water | | wt % | 87.47 | 87.47 | 87.47 | 87.47 | 87.47 |
| | Cellulose (A) | a-1 | wt % | 10.00 | 10.00 | 10.00 | 10.00 | 10.00 |
| | | a-2 | wt % | | | | | |
| | Surface treatment agent (B) | b-9 | wt % | 2.50 | 2.50 | 2.30 | 2.50 | 2.50 |
| | Antioxidant (E) | c-1 | wt % | | | | | |
| | | c-2 | wt % | 0.03 | | | | |
| | | c-3 | wt % | | 0.03 | | | |
| | | c-4 | wt % | | | 0.03 | | |
| | | c-5 | wt % | | | | 0.03 | |
| | | c-6 | wt % | | | | | 0.03 |
| | | c-7 | wt % | | | | | |
| CNF dispersibility | | | [—] | 4 | A | A | A | A |

| | | Example 2-8 | Example 2-9 | Example 2-10 | Example 2-11 | Example 2-12 |
|---|---|---|---|---|---|---|
| Redispersibility-1 | [—] | B | B | B | B | B |
| Redispersibility-2 | [—] | B | B | B | B | B |
| Heat resistance | [wt %] | 1.1 | 5.1 | 6.2 | 0.9 | 1.1 |

| | | | | Example 1-13 | Example 1-14 | Example 1-15 | Example 1-16 | Example 1-17 |
|---|---|---|---|---|---|---|---|---|
| Dispersion composition | Water | | wt % | 87.47 | 87.44 | 87.44 | 87.44 | 87.44 |
| | Cellulose (A) | a-1 | wt % | 10.00 | 10.00 | 10.00 | | |
| | | a-2 | wt % | | | | 10.00 | 10.00 |
| | Surface treatment agent (B) | b-9 | wt % | 2.50 | 2.50 | 2.50 | 2.50 | 2.50 |
| | Antioxidant (E) | c-1 | wt % | | 0.03 | | 0.03 | |
| | | c-2 | wt % | | | 0.03 | | 0,03 |
| | | c-3 | wt % | | | | | |
| | | c-4 | wt % | | | | | |
| | | c-5 | wt % | | | | | |
| | | c-6 | wt % | | | | | |
| | | c-7 | wt % | 0.03 | 0.03 | 0.03 | 0.03 | 0.03 |
| CNF dispersibility | | | [—] | A | A | A | A | A |

| | | Example 2-13 | Example 2-14 | Example 2-15 | Example 2-16 | Example 2-17 |
|---|---|---|---|---|---|---|
| Redispersibility-1 | [—] | B | B | B | B | B |
| Redispersibility-2 | [—] | B | B | B | B | B |
| Heat resistance | [wt %] | 10.2 | 0.5 | 0.4 | 0.4 | 0.3 |

[Table 24]

| | | | | Example II | | | | | | | | | |
|---|---|---|---|---|---|---|---|---|---|---|---|---|---|
| | | | | Example 1-18 | Example 1-19 | Example 1-20 | Example 1-21 | Example 1-22 | Example 1-23 | Example 1-24 | Example 1-25 | Example 1-26 | Example 1-27 |
| Dispersion composition | Water | | wt % | 86.47 | 86.47 | 86.47 | 86.47 | 86.47 | 86.47 | 86.47 | 87.50 | 87.50 | 87.50 |
| | Cellulose (A) | a-1 | wt % | 10.0 | 10.0 | 10.0 | 10.0 | 10.0 | 10.0 | 10.0 | 10.0 | 10.0 | 10.0 |
| | | a-2 | wt % | | | | | | | | | | |
| | Surface treatment agent (B) | b-9 | wt % | 2.50 | 2.50 | 2.50 | 2.50 | 2.50 | 2.50 | 2.50 | 2.50 | 2.50 | 2.50 |
| | Antioxidant (E) | a-2 | wt % | 0.03 | 0.03 | 0.03 | 0.03 | 0.03 | 0.03 | 0.03 | 0.0001 | 0.0005 | 0.0005 |
| | Water-soluble organic solvent (C) | c-1 | wt % | 1.00 | | | | | | | | | |
| | | c-2 | wt % | | 3.00 | | | | | | | | |
| | | c-3 | wt % | | | 1.00 | | | | | | | |
| | | c-4 | wt % | | | | 1.00 | | | | | | |
| | | c-5 | wt % | | | | | 1.00 | | | | | |
| | | c-6 | wt % | | | | | | 1.00 | | | | |
| | | c-7 | wt % | | | | | | | 1.00 | | | |
| CNF dispersibility | | | [—] | A | A | A | A | A | A | A | A | A | A |

| | | Example 2-18 | Example 2-19 | Example 2-20 | Example 2-21 | Example 2-22 | Example 2-23 | Example 2-24 | Example 2-25 | Example 2-26 | Example 2-27 |
|---|---|---|---|---|---|---|---|---|---|---|---|
| Redispersibility-1 | [—] | A | A | A | A | A | A | A | B | B | B |
| Redispersibility-2 | [—] | B | A | A | A | A | A | B | B | B | B |
| Heat resistance | [wt %] | 1.1 | 1.1 | 1.1 | 1.1 | 3.1 | 3.1 | 3.3 | 39.5 | 37.5 | 3.4 |

| | | | | Example 1-28 | Example 1-29 | Example 1-30 | Example 1-31 | Example 1-32 | Example 1-33 | Example 1-34 | Example 1-35 | Example 1-36 | Example 1-37 |
|---|---|---|---|---|---|---|---|---|---|---|---|---|---|
| Dispersion composition | Water | | | 87.49 | 87.45 | 87.50 | 87.00 | 86.50 | 86.00 | 89.00 | 88.50 | 88.00 | 86.47 |
| | Cellulose (A) | a-1 | wt % | 10.0 | 10.0 | 10.0 | 10.0 | 10.0 | 10.0 | 10.0 | 10.0 | 10.0 | |
| | | a-2 | wt % | | | | | | | | | | 10.0 |
| | Surface treatment agent (B) | b-9 | wt % | 2.50 | 2.50 | 2.50 | 2.50 | 2.50 | 2.50 | 0.50 | 0.50 | 0.50 | 2.50 |
| | Antioxidant (E) | a-2 | wt % | 0.01 | 0.05 | 0.20 | 0.50 | 1.00 | 1.50 | 0.50 | 1.00 | 1.50 | 0.01 |
| | Water-soluble organic solvent (C) | c-1 | wt % | | | | | | | | | | |
| | | c-2 | wt % | | | | | | | | | | |
| | | c-3 | wt % | | | | | | | | | | |
| | | c-4 | wt % | | | | | | | | | | |
| | | c-5 | wt % | | | | | | | | | | 3.00 |
| | | c-6 | wt % | | | | | | | | | | |
| | | c-7 | wt % | | | | | | | | | | |
| CNF dispersibility | | | [—] | A | A | A | A | A | A | A | A | A | A |

| | | Example 2-28 | Example 2-29 | Example 2-30 | Example 2-31 | Example 2-32 | Example 2-33 | Example 2-34 | Example 2-35 | Example 2-36 | Example 2-37 |
|---|---|---|---|---|---|---|---|---|---|---|---|
| Redispersibility-1 | [—] | B | B | B | B | B | B | B | B | B | B |
| Redispersibility-2 | [—] | B | B | B | B | B | B | B | B | B | B |
| Heat resistance | [wt %] | 1.8 | 0.5 | 0.2 | 0.2 | 0.2 | 0.2 | 0.2 | 0.2 | 0.2 | 0.2 |

[Resin Compositions: Examples 3-1 to 3-39 and Comparative Examples 3-1 to 3-10]

The cellulose nanofiber aqueous dispersions (listed in Tables 22 to 24) and dried cellulose (listed in Tables 22 to 24) obtained in the Examples mentioned above were used to obtain resin compositions (listed in Tables 25 to 30), by the method described in Production-3. The obtained compositions were molded by the method described in Production-5.

The Examples and Comparative Examples listed in Tables 22 to 24 (Examples 1-1 to 1-37 and Comparative Examples 1-1 to 1-7, and Examples 2-1 to 2-37 and Comparative Examples 2-1 to 2-7) that are not listed in Tables 25 to 30, were produced by the methods described in Production-1 and -2 using the proportions listed in the respective tables, except for the thermoplastic resin (F). Compositions and molded articles were then obtained by the methods described in Production-3 and -4.

The molded articles were evaluated according to the evaluation methods described above.

[Table 25]

TABLE 25

| | | | | \multicolumn{7}{c}{Example II} |
|---|---|---|---|---|---|---|---|---|---|---|
| | | | | Comp. Example 3-1 Comp. Example 2-1 | Comp. Example 3-2 Comp. Example 2-2 | Comp. Example 3-3 Comp. Example 2-3 | Comp. Example 3-4 Comp. Example 2-4 | Comp. Example 3-5 Comp. Example 2-5 | Comp. Example 3-6 Comp. Example 2-6 | Comp. Example 3-7 Comp. Example 2-7 |
| Composition | Thermoplastic resin (F) | f-1 | wt % | 90.00 | 87.50 | 87.47 | 87.47 | 87.47 | 87.47 | 87.47 |
| | Cellulose (A) | a-1 | wt % | 10.00 | 10.00 | 10.00 | 10.00 | 10.00 | 10.00 | 10.00 |
| | Surface treatment agent (B) | b-1 | wt % | | 2.50 | 2.50 | | | | |
| | | b-4 | wt % | | | | 2.50 | | | |
| | | b-8 | wt % | | | | | | | |
| | | b-9 | wt % | | | | | | | |
| | | b-13 | wt % | | | | | | | |
| | | b-14 | wt % | | | | | | | |
| | | b-16 | wt % | | | | | | | |
| | | b-17 | wt % | | | | | | | |
| | | b-20 | wt % | | | | | | 2.50 | |
| | | b-22 | wt % | | | | | | | |
| | | b-28 | wt % | | | | | | | 2.50 |
| | | b-34 | wt % | | | | | 2.50 | | |
| | Antioxidant (E) | c-1 | wt % | | | 0.03 | 0.03 | 0.03 | 0.03 | 0.03 |
| Mechanical properties | Tensile strength | | MPa | 82 | 92 | 92 | 116 | 116 | 85 | 100 |
| | Tensile breaking elongation | | % | 3 | 9 | 9 | 33 | 13 | 3 | 7 |
| | Tensile yield | | Present/absent | Absent | Present | Present | Present | Present | Absent | Present |
| | Flexural modulus | | MPa | 3725 | 3850 | 3850 | 4000 | 4000 | 3850 | 3850 |
| | Linear expansion coefficient | | ppm/K | 61 | 45 | 45 | 35 | 35 | 50 | 49 |
| Other properties | Abrasion resistance | | [μm] | 92 | 35 | 35 | 3 | 3 | 39 | 10 |
| | Odor | | 3 to 5 | 1 | 1 | 1 | 3 | 2 | 2 | 4 |
| | Molding retentivity | | 3 to 5 | 1 | 1 | 1 | 1 | 1 | 1 | 1 |
| | Moldability | | 3 to 5 | 3 | 2 | 2 | 2 | 2 | 2 | 5 |

| | | | | Example 3-1 Example 2-1 | Example 3-2 Example 2-2 | Example 3-3 Example 2-3 | Example 3-4 Example 2-4 | Example 3-5 Example 2-5 | Example 3-6 Example 2-6 | Example 3-7 Example 2-7 |
|---|---|---|---|---|---|---|---|---|---|---|
| Composition | Thermoplastic resin (F) | f-1 | wt % | 87.47 | 87.47 | 87.47 | 87.47 | 87.47 | 87.47 | 87.47 |
| | Cellulose (A) | a-1 | wt % | 10.00 | 10.00 | 10.00 | 10.00 | 10.00 | 10.00 | 10.00 |
| | Surface treatment agent (B) | b-1 | wt % | | | | | | | |
| | | b-4 | wt % | | | | | | | |
| | | b-8 | wt % | 2.50 | | | | | | |
| | | b-9 | wt % | | 2.50 | | | | | |
| | | b-13 | wt % | | | 2.50 | | | | |
| | | b-14 | wt % | | | | 2.50 | | | |
| | | b-16 | wt % | | | | | 2.50 | | |
| | | b-17 | wt % | | | | | | 2.50 | |
| | | b-20 | wt % | | | | | | | |
| | | b-22 | wt % | | | | | | | 2.50 |
| | | b-28 | wt % | | | | | | | |
| | | b-34 | wt % | | | | | | | |
| | Antioxidant (E) | c-1 | wt % | 0.03 | 0.03 | 0.03 | 0.03 | 0.03 | 0.03 | 0.03 |
| Mechanical properties | Tensile strength | | MPa | 124 | 129 | 118 | 108 | 100 | 94 | 124 |
| | Tensile breaking elongation | | % | 12 | 13 | 12 | 10 | 8 | 7 | 12 |
| | Tensile yield | | Present/absent | Present | Present | Present | Present | Present | Present | Present |
| | Flexural modulus | | MPa | 4040 | 4050 | 4000 | 3950 | 3900 | 3850 | 4100 |
| | Linear expansion coefficient | | ppm/K | 33 | 33 | 33 | 38 | 43 | 43 | 31 |
| Other properties | Abrasion resistance | | [μm] | 2 | 2 | 2 | 4 | 11 | 10 | 2 |
| | Odor | | 3 to 5 | 1 | 1 | 2 | 2 | 2 | 2 | 2 |
| | Molding retentivity | | 3 to 5 | 1 | 1 | 1 | 1 | 1 | 1 | 1 |
| | Moldability | | 3 to 5 | 1 | 1 | 2 | 2 | 2 | 2 | 2 |

[Table 26]

TABLE 26

| | | | | Example II | | | | | |
|---|---|---|---|---|---|---|---|---|---|
| | | | | Example 3-8 Example 2-8 | Example 3-9 Example 2-9 | Example 3-10 Example 2-10 | Example 3-11 Example 2-11 | Example 3-12 Example 2-12 | Example 3-13 Example 2-13 |
| Composition | Thermoplastic resin (F) | f-1 | wt % | 87.47 | 87.47 | 87.47 | 87.47 | 87.47 | 87.47 |
| | Cellulose (A) | a-1 | wt % | 10.00 | 10.00 | 10.00 | 10.00 | 10.00 | 10.00 |
| | Surface treatment agent (B) | b-9 | wt % | 2.50 | 2.50 | 2.50 | 2.50 | 2.50 | 2.50 |
| | Antioxidant (E) | e-2 | wt % | 0.03 | | | | | |
| | | e-3 | wt % | | 0.03 | | | | |
| | | e-4 | wt % | | | 0.03 | | | |
| | | e-5 | wt % | | | | 0.03 | | |
| | | e-6 | wt % | | | | | 0.03 | |
| | | e-7 | wt % | | | | | | 0.03 |
| Mechanical properties | Tensile strength | | MPa | 129 | 129 | 129 | 129 | 129 | 129 |
| | Tensile breaking elongation | | % | 13 | 13 | 13 | 13 | 13 | 13 |
| | Tensile yield | | Present/absent | Present | Present | Present | Present | Present | Present |
| | Flexural modulus | | MPa | 4050 | 4050 | 4050 | 4050 | 4050 | 4050 |
| | Linear expansion coefficient | | ppm/K | 31 | 31 | 31 | 31 | 31 | 31 |
| Other properties | Abrasion resistance | | [μm] | 2 | 2 | 2 | 2 | 2 | 2 |
| | Odor | | 1 to 5 | 1 | 1 | 1 | 1 | 1 | 1 |
| | Molding retentivity | | 1 to 5 | 1 | 1 | 1 | 2 | 1 | 1 |
| | Moldability | | 1 to 5 | 1 | 1 | 1 | 1 | 1 | 1 |

[Table 27]

TABLE 27

| | | | | Example II | | | |
|---|---|---|---|---|---|---|---|
| | | | | Example 3-14 Example 2-14 | Example 3-15 Example 2-15 | Example 3-16 Example 2-16 | Example 3-17 Example 2-17 |
| Composition | Thermoplastic resin (F) | f-1 | wt % | 87.44 | 87.44 | 87.44 | 87.44 |
| | Cellulose (A) | a-1 | wt % | 10.00 | 10.00 | | |
| | | 8-2 | wt % | | | 10.00 | 10.00 |
| | Surface treatment agent (B) | b-s | wt % | 2.50 | 2.50 | 2.50 | 2.50 |
| | Antioxidant (E) | e-1 | wt % | 0.03 | | 0.03 | |
| | | e-2 | wt % | | 0.03 | | 0.03 |
| | | e-7 | wt % | 0.03 | 0.03 | 0.03 | 0.03 |
| Mechanical properties | Tensile strength | | MPa | 129 | 129 | 130 | 130 |
| | Tensile breaking elongation | | % | 13 | 13 | 13 | 13 |
| | Tensile yield | | Present/absent | Present | Present | Present | Present |
| | Flexural modulus | | MPa | 4050 | 4050 | 4050 | 4050 |
| | Linear expansion coefficient | | ppm/K | 31 | 31 | 27 | 27 |
| Other properties | Abrasion resistance | | [μm] | 2 | 2 | 2 | 2 |
| | Odor | | 1 to 5 | 1 | 1 | 1 | 1 |
| | Molding retentivity | | 1 to 5 | 1 | 1 | 1 | 1 |
| | Moldability | | 1 to 5 | 1 | 1 | 1 | 1 |

[Table 28]

TABLE 28

| | | | | Example II | | | | | | |
|---|---|---|---|---|---|---|---|---|---|---|
| | | | | Example 3-18 Example 2-18 | Example 3-19 Example 2-19 | Example 3-20 Example 2-20 | Example 3-21 Example 2-21 | Example 3-22 Example 2-22 | Example 3-23 Example 2-23 | Example 3-24 Example 2-24 |
| Composition | Thermoplastic resin (F) | f-1 | wt % | 86.47 | 86.47 | 86.47 | 86.47 | 86.47 | 86.47 | 86.47 |
| | Cellulose (A) | a-1 | wt % | 10.00 | 10.00 | 10.00 | 10.00 | 10.00 | 10.00 | 10.00 |
| | | a-2 | wt % | | | | | | | |
| | Surface treatment agent (B) | b-9 | wt % | 2.50 | 2.50 | 2.50 | 2.50 | 2.50 | 2.50 | 2.50 |
| | Antioxidant (19) | e-2 | wt % | 0.03 | 0.03 | 0.03 | 0.03 | 0.03 | 0.03 | 0.03 |
| | Water-soluble | c-1 | wt % | 1.00 | | | | | | |

TABLE 28-continued

| | | | | Example II | | | | | | |
|---|---|---|---|---|---|---|---|---|---|---|
| | | | | Example 3-18 Example 2-18 | Example 3-19 Example 2-19 | Example 3-20 Example 2-20 | Example 3-21 Example 2-21 | Example 3-22 Example 2-22 | Example 3-23 Example 2-23 | Example 3-24 Example 2-24 |
| | organic solvent (C) | c-2 | wt % | | 1.00 | | | | | |
| | | c-3 | wt % | | | 1.00 | | | | |
| | | c-4 | wt % | | | | 1.00 | | | |
| | | c-5 | wt % | | | | | 100 | | |
| | | c-6 | wt % | | | | | | 1.00 | |
| | | c-7 | wt % | | | | | | | 1.00 |
| Molded article | Organic solvent residue in composition | ppm MPa | | 350 | 400 | $20 | 600 | 630 | 580 | 1050 |
| Mechanical properties | Tensile strength | MPa | | 125 | 126 | 126 | 125 | 125 | 125 | 125 |
| | Tensile breaking elongation | % | | 12 | 12 | 12 | 12 | 12 | 12 | 12 |
| | Tensile yield | Present/absent | | Present | Present | Present | Present | Present | Present | Present |
| | Flexural modulus | MPa | | 4100 | 4100 | 4100 | 4100 | 4100 | 4100 | 4100 |
| | Linear expansion coefficient | ppm/K | | 30 | 29 | 28 | 27 | 36 | 26 | 27 |
| Other properties | Abrasion resistance | [µm] | | 2 | 2 | 2 | 2 | 2 | 2 | 2 |
| | Odor | 1 to 5 | | 1 | 1 | 1 | 1 | 1 | 1 | 1 |
| | Molding retentivity | 1 to 5 | | 1 | 1 | 1 | 1 | 1 | 1 | 1 |
| | Moldability | 1 to 5 | | 1 | 1 | 1 | 1 | 1 | 1 | 1 |

[Table 29]

TABLE 29

| | | | Example II | | | | | | | | | | | |
|---|---|---|---|---|---|---|---|---|---|---|---|---|---|---|
| | | | Example 3-25 Example 2-25 | Example 3-26 Example 2-26 | Example 3-27 Example 2-27 | Example 3-28 Example 2-28 | Example 3-29 Example 2-29 | Example 3-30 Example 2-30 | Example 3-31 Example 2-31 | Example 3-32 Example 2-32 | Example 3-33 Example 2-33 | Example 3-34 Example 2-34 | Example 3-35 Example 2-35 | Example 3-36 Example 2-36 | Example 3-37 Example 2-37 |
| Composition | Thermoplastic resin (F) | f-1 wt % | 87.50 | 87.50 | 87.30 | 87.49 | 87.45 | 87.30 | 87.00 | 86.50 | 86.00 | 89.00 | 88.50 | 88.00 | 86.47 |
| | Cellulose (A) | a-1 wt % | 10.00 | 10.00 | 10.00 | 10.00 | 10.00 | 10.00 | 10.00 | 10.00 | 10.00 | 10.00 | 10.00 | 10.00 | |
| | | a-2 wt % | | | | | | | | | | | | | 10.00 |
| | Surface treatment agent (B) | b-9 wt % | 2.50 | 2.50 | 2.50 | 2.30 | 2.30 | 2.50 | 2.50 | 2.50 | 2.50 | 0.50 | 0.50 | 0.50 | 2.50 |
| | Antioxidant (E) | e-2 wt % | 0.0001 | 0.0003 | 0.003 | 0.01 | 0.03 | 0.20 | 0.50 | 1.00 | 1.50 | 0.50 | 1.00 | 1.50 | 0.03 |
| | Water-soluble organic solvent (C) | c-4 wt % | | | | | | | | | | | | | 1.00 |
| Mechanical properties | Tensile strength | MPa | 129 | 129 | 129 | 129 | 129 | 129 | 125 | 120 | 118 | 95 | 95 | 95 | 132 |
| | Tensile breaking elongation | % | 13 | 13 | 13 | 13 | 13 | 13 | 15 | 15 | 15 | 8 | 8 | 8 | 13 |
| | Tensile yield | Present/absent | Present | Present | Present | Present | Present | Present | Present | Present | Present | Absent | Absent | Absent | Present |
| Other properties | Flexural modulus | MPa | 4050 | 4050 | 4050 | 4050 | 4050 | 4050 | 4000 | 3950 | 3900 | 3850 | 3850 | 3850 | 4100 |
| | Linear expansion coefficient | ppm/K | 31 | 31 | 31 | 31 | 31 | 31 | 33 | 37 | 41 | 45 | 45 | 45 | 25 |
| | Abrasion resistance | [μm] | 2 | 2 | 2 | 2 | 2 | 2 | 2 | 2 | 2 | 50 | 50 | 50 | 2 |
| | Odor | 1 to 5 | 1 | 1 | 1 | 1 | 1 | 1 | 1 | 1 | 1 | 1 | 1 | 1 | 1 |
| | Molding retentivity | 1 to 5 | 1 | 1 | 1 | 1 | 1 | 1 | 1 | 1 | 2 | 3 | 4 | 5 | 1 |
| | Moldability | 1 to 5 | 1 | 1 | 1 | 1 | 1 | 1 | 1 | 1 | 1 | 3 | 4 | 5 | 1 |

[Table 30]

TABLE 30

| | | | | Comp. Example 3-8 | Example 3-17 Example 2-17 | Comp. Example 3-9 | Example 3-38 Example 2-17 | Comp. Example 3-10 | Example 3-39 Example 2-17 |
|---|---|---|---|---|---|---|---|---|---|
| | | | | | Example II | | | | |
| Composition | Thermoplastic resin (F) | f-1 | wt % | 100.00 | 87.47 | | | | |
| | | f-2 | wt % | | | 100.00 | 87.47 | | |
| | | f-3 | wt % | | | | | 100.00 | 87.47 |
| | Cellulose (A) | a-2 | wt % | | 10.00 | | 10.00 | | 10.00 |
| | Surface treatment agent (B) | b-9 | wt % | | 2.50 | | 2.50 | | 2.50 |
| | Antioxidant (B) | e-2 | wt % | | 0.03 | | 0.03 | | 0.03 |
| Mechanical properties | Tensile strength | | MPa | 76 | 132 | 36 | 58 | 63 | 105 |
| | Tensile breaking elongation | | % | 40 | 13 | 200 | 10 | 30 | 12 |
| | Tensile yield | | Present/absent | Present | Present | Present | Absent | Present | Present |
| | Flexural modulus | | MPa | 2600 | 4050 | 2200 | 2600 | 2500 | 3950 |
| | Linear expansion coefficient | | ppm/K | 82 | 27 | 88 | 10 | 100 | 51 |
| Other properties | Abrasion resistance | | [μm] | 155 | 2 | 80 | 4 | 10 | 1 |
| | Odor | | 1 to 5 | 1 | 1 | 2 | 1 | 1 | 1 |
| | Molding retentivity | | 1 to 5 | 1 | 1 | 1 | 1 | 1 | 1 |
| | Moldability | | 1 to 5 | 2 | 1 | 1 | 1 | 1 | 1 |

It is seen that when suitable types of components are added in suitable amounts as shown above, the cellulose nanofiber aqueous dispersions and dried cellulose nanofibers can be easily redispersed in water or organic solvents, and have excellent dispersibility in resins. The resin compositions and molded resins have excellent mechanical properties and thermal properties, while according to one aspect they have excellent moldability and abrasion resistance for practical use, according to another aspect they have excellent heat resistance, and according to yet another aspect they have excellent moldability, abrasion resistance for practical use, odor properties and moldability.

Example II (Second Embodiment)

[Dispersions: Examples 1-1 to 1-20 and Comparative Examples 1-1 to 1-6]

The surface treatment agent (B) and binder component (D) (polyurethane) were used in the proportions listed in Tables 31 and 32 to obtain dispersions A, by the method described in Production-1. Each dispersion A was evaluated according to the evaluation methods described above.

[Cellulose-Containing Aqueous Dispersions: Examples 2-1 to 2-20-2 and Comparative Examples 2-1 to 2-6]

The dispersions A obtained in the Examples mentioned above (listed in Tables 31 and 32) were used to obtain cellulose-containing aqueous dispersions (listed in Tables 33 and 34), by the method described in Production-1. Each obtained cellulose-containing aqueous dispersion was evaluated according to the evaluation methods described above.

[Table 31]

TABLE 31

| | | | | Comp. Example 1-1 | Comp. Example 1-2 | Example 1-1 | Example 1-2 | Example 1-3 | Example 1-4 |
|---|---|---|---|---|---|---|---|---|---|
| | | | | Example III | | | | | |
| Dispersion composition | Water | | wt % | 100 | 70 | 70 | 70 | 70 | 70 |
| | Surface treatment agent (B) | b-1 | wt % | | 30 | 15 | | | |
| | | b-2 | wt % | | | | 15 | | |
| | | b-3 | wt % | | | | | 15 | |
| | | b-4 | wt % | | | | | | 15 |
| | | b-9 | wt % | | | | | | |
| | | b-14 | wt % | | | | | | |
| | | b-33 | wt % | | | | | | |
| | | b-17 | wt % | | | | | | |
| | | b-20 | wt % | | | | | | |
| | | b-21 | wt % | | | | | | |
| | Binder component (D) (polyurethane) | d-1 | wt % | | | 15 | 15 | 15 | 15 |
| | Appearance during preparation | | Color | Colorless transparent | Pale yellow | Pale white | Pale white | Pale white | Pale white |
| | Precipitation after standing for 24 hours | | [—] | A | A | B | B | B | B |

TABLE 31-continued

| | | | | Example III | | | | | |
|---|---|---|---|---|---|---|---|---|---|
| | | | | Example 1-5 | Example 1-6 | Example 1-7 | Example 1-8 | Comp. Example 1-3 | Comp. Example 1-4 |
| Dispersion composition | Water | | wt % | 70 | 70 | 70 | 70 | 70 | 70 |
| | Surface treatment agent (B) | b-1 | wt % | | | | | | |
| | | b-2 | wt % | | | | | | |
| | | b-3 | wt % | | | | | | |
| | | b-4 | wt % | | | | | | |
| | | b-9 | wt % | 15 | | | | | |
| | | b-14 | wt % | | 15 | | | | |
| | | b-33 | wt % | | | 15 | | | |
| | | b-17 | wt % | | | | 15 | | |
| | | b-20 | wt % | | | | | 15 | |
| | | b-21 | wt % | | | | | | 15 |
| | Binder component (D) (polyurethane) | d-1 | | 15 | 15 | 15 | 15 | 15 | 15 |
| | Appearance during preparation | | Color | Pale white | Pale white | Pale white | Pale white | Pale white | Pale white |
| | Precipitation after standing for 24 hours | | [—] | B | B | B | B | B | B |

[Table 32]

TABLE 32

| | | | Example 1-9 | Example 1-10 | Example 1-11 | Example 1-12 | Example 1-13 | Example 1-14 | Example 1-15 | Example 1-16 | Example 1-17 | Comp. Example 1-5 | Comp. Example 1-6 | Example 1-18 | Example 1-19 | Example 1-20 |
|---|---|---|---|---|---|---|---|---|---|---|---|---|---|---|---|---|
| Dispersion composition | Water | | wt % | 70 | 70 | 70 | 70 | 70 | 70 | 74 | 70 | 70 | 70 | 70 | 64 | 64 | 64 |
| | Surface treatment agent (B) | b-4 | wt % | 15 | 15 | 15 | 15 | 15 | 15 | 15 | 15 | 15 | 15 | 15 | 15 | 15 | 15 |
| | Binder component (D) (polyurethane) | d-2 | wt % | 15 | | | | | | | | | | | | | |
| | | d-3 | wt % | | 15 | | | | | | | | | | | | |
| | | d-4 | wt % | | | 15 | | | | | | | | | | | |
| | | d-5 | wt % | | | | 15 | | | | | | | | | | |
| | | d-6 | wt % | | | | | 15 | | | | | | | | | |
| | | d-7 | wt % | | | | | | 15 | | | | | | | | |
| | | d-8 | wt % | | | | | | | 15 | | | | | 15 | | |
| | | d-9 | wt % | | | | | | | | 15 | | | | | 15 | |
| | | d-10 | wt % | | | | | | | | | 15 | | | | | 15 |
| | Comparison binder component | d-11 | wt % | | | | | | | | | | 15 | | | | |
| | | d-12 | wt % | | | | | | | | | | | 15 | | | |
| | Water-soluble organic solvent (C) | c-1 | wt % | | | | | | | | | | | | 6 | | |
| | | c-2 | wt % | | | | | | | | | | | | | 6 | |
| | | c-3 | wt % | | | | | | | | | | | | | | 6 |
| Dispersion appearance test | Appearance during preparation | | Color | Pale White | Pale White | Pale white | Pale White | Pale White | Ultra-pale white | Ultra-pale white | Ultra-pale white | Ultra-pale white | Pale white | Pale white | Ultra-pale white | Ultra-pale white | Ultra-pale white |
| | Precipitation after standing for 24 hours | | [—] | B | A | A | A | A | A | A | A | A | C | C | A | A | A |

[Table 33]

TABLE 33

| | | | | Example III | | | | | |
|---|---|---|---|---|---|---|---|---|---|
| | | | | Comp. Example 2-1 | Comp. Example 2-2 | Example 2-1 | Example 2-2 | Example 2-3 | Example 2-4 |
| Dispersion composition | Water | | wt % | 90 | 87.5 | 85 | 85 | 85 | 85 |
| | Cellulose (A) | a-1 | wt % | 10 | 10 | 10 | 10 | 10 | 10 |
| | Surface treatment agent (B) | b-1 | wt % | | 2.5 | 2.5 | | | |
| | | b-2 | wt % | | | | 2.5 | | |
| | | b-3 | wt % | | | | | 2.5 | |
| | | b-4 | wt % | | | | | | 2.5 |
| | | b-9 | wt % | | | | | | |
| | | b-14 | wt % | | | | | | |
| | | b-33 | wt % | | | | | | |
| | | b-17 | wt % | | | | | | |
| | | b-20 | wt % | | | | | | |
| | | b-21 | wt % | | | | | | |
| | Binder component (D) (polyurethane) | d-1 | wt % | | | 2.5 | 2.5 | 2.5 | 2.5 |
| CNF dispersibility | | | [—] | C | C | B | B | B | B |

| | | | | Example 2-5 | Example 2-6 | Example 2-7 | Example 2-8 | Comp. Example 2-3 | Comp. Example 2-4 |
|---|---|---|---|---|---|---|---|---|---|
| Dispersion composition | Water | | wt % | 85 | 85 | 85 | 85 | 85 | 85 |
| | Cellulose (A) | a-1 | wt % | 10 | 10 | 10 | 10 | 10 | 10 |
| | Surface treatment agent (B) | b-1 | wt % | | | | | | |
| | | b-2 | wt % | | | | | | |
| | | b-3 | wt % | | | | | | |
| | | b-4 | wt % | | | | | | |
| | | b-9 | wt % | 2.5 | | | | | |
| | | b-14 | wt % | | 2.5 | | | | |
| | | b-33 | wt % | | | 2.5 | | | |
| | | b-17 | wt % | | | | 2.5 | | |
| | | b-20 | wt % | | | | | 2.5 | |
| | | b-21 | wt % | | | | | | 2.5 |
| | Binder component (D) (polyurethane) | d-1 | wt % | 2.5 | 2.5 | 2.5 | 2.5 | 2.5 | 2.5 |
| CNF dispersibility | | | [—] | B | B | B | B | B | B |

[Table 34]

TABLE 34

| | | | | Example III | | | | | | | |
|---|---|---|---|---|---|---|---|---|---|---|---|
| | | | | Example 2-9 | Example 2-10 | Example 2-11 | Example 2-12 | Example 2-13 | Example 2-14 | Example 2-15 | Example 2-16 |
| Dispersion composition | Water | | wt % | 85 | 85 | 85 | 85 | 85 | 85 | 85 | 85 |
| | Cellulose (A) | a-1 | wt % | 10 | 10 | 10 | 10 | 10 | 10 | 10 | 10 |
| | | a-2 | wt % | | | | | | | | |
| | Surface treatment agent (B) | b-4 | wt % | 2.5 | 2.5 | 2.5 | 2.5 | 2.5 | 2.5 | 2.5 | 2.5 |
| | Binder component (D) (polyurethane) | d-1 | wt % | | | | | | | | |
| | | d-2 | wt % | 2.5 | | | | | | | |
| | | d-3 | wt % | | 2.5 | | | | | | |
| | | d-4 | wt % | | | 2.5 | | | | | |
| | | d-5 | wt % | | | | 2.5 | | | | |
| | | d-6 | wt % | | | | | 2.5 | | | |
| | | d-7 | wt % | | | | | | 2.5 | | |
| | | d-8 | wt % | | | | | | | 2.5 | |
| | | d-9 | wt % | | | | | | | | 2.5 |
| | | d-10 | wt % | | | | | | | | |

TABLE 34-continued

Example III

|  |  |  |  |  |  |  |  |  |  |  |
|---|---|---|---|---|---|---|---|---|---|---|
| Comparison binder component | d-11 | wt % | | | | | | | | |
| | d-12 | wt % | | | | | | | | |
| Water-soluble organic solvent (C) | c-1 | wt % | | | | | | | | |
| | c-2 | wt % | | | | | | | | |
| | c-3 | wt % | | | | | | | | |
| CNF dispersibility | | [—] | B | A | A | A | A | A | A | A |

|  |  |  |  | Example 2-17 | Comp. Example 2-5 | Comp. Example 2-6 | Example 2-18 | Example 2-19 | Example 2-20-1 | Example 2-20-2 |
|---|---|---|---|---|---|---|---|---|---|---|
| Dispersion composition | Water | | wt % | 85 | 85 | 85 | 84 | 84 | 84 | 84 |
| | Cellulose (A) | a-1 | wt % | 10 | 10 | 10 | 10 | 10 | 10 | |
| | | a-2 | wt % | | | | | | | 10 |
| | Surface treatment agent (B) | b-4 | wt % | 2.5 | 2.5 | 2.5 | 2.5 | 2.5 | 2.5 | 2.5 |
| | Binder component (D) (polyurethane) | d-1 | wt % | | | | | | | |
| | | d-2 | wt % | | | | | | | |
| | | d-3 | wt % | | | | | | | |
| | | d-4 | wt % | | | | | | | |
| | | d-5 | wt % | | | | | | | |
| | | d-6 | wt % | | | | | | | |
| | | d-7 | wt % | | | | | | | |
| | | d-8 | wt % | | | | 2.5 | 2.5 | 2.5 | 2.5 |
| | | d-9 | wt % | | | | | | | |
| | | d-10 | wt % | 2.5 | | | | | | |
| | Comparison binder component | d-11 | wt % | | 2.5 | | | | | |
| | | d-12 | wt % | | | 2.5 | | | | |
| | Water-soluble organic solvent (C) | c-1 | wt % | | | | 1 | | | |
| | | c-2 | wt % | | | | | 1 | | |
| | | c-3 | wt % | | | | | | 1 | 1 |
| CNF dispersibility | | | [—] | A | C | C | A | A | A | A |

[Dried Cellulose: Examples 3-1 to 3-20-2 and Comparative Examples 3-1 to 3-6]

The cellulose-containing aqueous dispersions obtained in the Examples mentioned above (listed in Tables 33 and 34) were used to obtain dried cellulose (listed in Tables 35 and 36), by the method described in Production-2. Each obtained dried cellulose was evaluated according to the evaluation methods described above. For Example 34-2, the obtained cellulose nanofiber aqueous dispersion of Example 2-4 was stirred using an AC1-5LVT by Kodaira Seisakusho Co., Ltd., while carrying out reduced pressure drying for 0.5 hour at 40° C., to obtain a homogeneous crumb-like mass. An Inert Oven DN43HI by Yamato Scientific Co., Ltd. was used to dry the mass for 5 hours at 120° C. in a nitrogen atmosphere, to obtain dried cellulose nanofibers. For Example 3-4-3, the obtained cellulose nanofiber aqueous dispersion of Example 2-4 was stirred using an ACM-5LVT by Kodaira Seisakusho Co., Ltd., while carrying out reduced pressure drying for 0.5 hour at 40° C., to obtain a homogeneous crumb-like mass. An Inert Oven DN43HI by Yamato Scientific Co., Ltd. was used to dry the mass for 2 hours at 120° C. in a nitrogen atmosphere, to obtain dried cellulose nanofibers.

[Resin Compositions: Examples 4-1 to 4-63 and Comparative Examples 4-1 to 4-10]

The cellulose-containing aqueous dispersions (listed in Tables 33 and 34) and dried cellulose (listed in Tables 35 and 36) obtained in the Examples mentioned above were used to obtain resin compositions (listed in Tables 37 to 47), by the method described in Production-3.

The obtained compositions were molded by the method described in Production-4. The Examples and Comparative Examples listed in Tables 33 and 34 and Tables 35 and 36 (Examples 2-1 to 2-20-2 and Comparative Examples 2-1 to 2-6, Examples 3-1 to 3-20-2 and Comparative Examples 3-1 to 3-6) that are not listed in Tables 37 to 47, were produced by the methods described in Production-1 to -3 using the proportions listed in the respective tables, except for the thermoplastic resin (F). Compositions and molded articles were then obtained by the methods described in Production-3 and -4. For Examples 4-58 to 4-63 in Table 47, the binder component (D) (polyurethane) and thermoplastic resin (F) were stirred and dried to uniformity and then supplied by a quantitative feeder through the main throat section of the extruder, the cellulose nanofiber aqueous dispersion containing the surface treatment agent (B) was supplied using a quantitative feeder from the side of the extruder, and the resin kneaded blend was extruded into a strand form under conditions with an extrusion output of 15 kg/h and a screw rotational speed of 250 rpm, and quenched in a strand bath and cut with a strand cutter to obtain resin composition pellets. Compositions and molded articles were then obtained by the method described in Production-4. The molded articles were evaluated according to the evaluation methods described above.

TABLE 35

| | | | | Comp. Example 3-1 | Comp. Example 3-2 | Example 3-1 | Example 3-2 | Example 3-3 | Example 3-4-1 | Example 3-4-2 |
|---|---|---|---|---|---|---|---|---|---|---|
| Dispersion composition | Water | | wt % | 8.3 | 6.7 | 5.1 | 6.0 | 5.2 | 4.5 | 13.8 |
| | Cellulose (A) | a-1 | wt % | 91.7 | 74.6 | 63.3 | 62.7 | 63.2 | 63.7 | 57.5 |
| | Surface treatment agent (B) | b-1 | wt % | | 18.7 | 15.8 | | | | |
| | | b-2 | wt % | | | | 15.7 | | | |
| | | b-3 | wt % | | | | | 15.8 | | |
| | | b-4 | wt % | | | | | | 15.9 | 14.4 |
| | | b-9 | wt % | | | | | | | |
| | | b-14 | wt % | | | | | | | |
| | | b-33 | wt % | | | | | | | |
| | | b-17 | wt % | | | | | | | |
| | | b-20 | wt % | | | | | | | |
| | | b-21 | wt % | | | | | | | |
| | Binder component (D) (polyurethane) | d-1 | wt % | | | 15.8 | 15.7 | 15.8 | 15.9 | 14.4 |
| Redispersibility | | | [—] | C | C | B | B | A | A | A |

| | | | | Example 3-4-3 | Example 3-5 | Example 3-6 | Example 3-7 | Example 3-8 | Comp. Example 3-3 | Comp. Example 3-4 |
|---|---|---|---|---|---|---|---|---|---|---|
| Dispersion composition | Water | | wt % | 24.2 | 7.4 | 8.0 | 4.6 | 2.6 | 6.1 | 3.4 |
| | Cellulose (A) | a-1 | wt % | 50.5 | 61.7 | 61.3 | 63.6 | 64.9 | 62.6 | 64.4 |
| | Surface treatment agent (B) | b-1 | wt % | | | | | | | |
| | | b-2 | wt % | | | | | | | |
| | | b-3 | wt % | | | | | | | |
| | | b-4 | wt % | 12.6 | | | | | | |
| | | b-9 | wt % | | 15.4 | | | | | |
| | | b-14 | wt % | | | 15.3 | | | | |
| | | b-33 | wt % | | | | 15.9 | | | |
| | | b-17 | wt % | | | | | 16.2 | | |
| | | b-20 | wt % | | | | | | 15.6 | |
| | | b-21 | wt % | | | | | | | 16.1 |
| | Binder component (D) (polyurethane) | d-1 | wt % | 12.6 | 15.4 | 15.3 | 15.9 | 16.2 | 15.6 | 16.1 |
| Redispersibility | | | [—] | A | A | A | A | B | C | C |

[Table 36]

TABLE 36

| | | | | Example 3-9 | Example 3-10 | Example 3-11 | Example 3-12 | Example 3-13 | Example 3-14 | Example 3-15 | Example 3-16 |
|---|---|---|---|---|---|---|---|---|---|---|---|
| Dispersion composition | Water | | wt % | 5.3 | 4.5 | 4.6 | 4.7 | 4.5 | 4.9 | 4.8 | 4.8 |
| | Cellulose (A) | a-1 | wt % | 63.3 | 63.7 | 63.6 | 63.5 | 63.7 | 63.4 | 63.5 | 63.5 |
| | | a-2 | wt % | | | | | | | | |
| | Surface treatment agent (B) | b-4 | wt % | 15.8 | 15.9 | 15.9 | 15.9 | 15.9 | 15.8 | 15.9 | 15.9 |
| | Binder component (D) (polyurethane) | d-1 | wt % | | | | | | | | |
| | | d-2 | wt % | 12.8 | | | | | | | |
| | | d-3 | wt % | | 15.9 | | | | | | |
| | | d-4 | wt % | | | 15.9 | | | | | |
| | | d-5 | wt % | | | | 15.9 | | | | |
| | | d-6 | wt % | | | | | 15.9 | | | |
| | | d-7 | wt % | | | | | | 15.8 | | |
| | | d-8 | wt % | | | | | | | 15.9 | |
| | | d-9 | wt % | | | | | | | | 15.9 |
| | | d-10 | wt % | | | | | | | | |
| | Comparison binder component | d-11 | wt % | | | | | | | | |
| | | d-12 | wt % | | | | | | | | |
| | Warer-soluble organic solvent (C) | c-1 | wt % | | | | | | | | |
| | | c-2 | wt % | | | | | | | | |
| | | c-3 | wt % | | | | | | | | |
| Redispersibility | | | [—] | A | A | A | A | A | A | A | A |

TABLE 36-continued

Example III

|  |  |  |  | Example 3-17 | Comp. Example 3-5 | Comp. Example 3-6 | Example 3-18 | Example 3-19 | Example 3-20-1 | Example 3-20-2 |
|---|---|---|---|---|---|---|---|---|---|---|
| Dispersion composition | Water |  | wt % | 4.7 | 4.8 | 4.6 | 4.8 | 4.8 | 4.9 | 4.9 |
|  | Cellulose (A) | a-1 | wt % | 63.5 | 63.5 | 63.6 | 61.7 | 61.3 | 60.0 |  |
|  |  | a-2 | wt % |  |  |  |  |  |  | 59.9 |
|  | Surface treatment agent (B) | b-4 | wt % | 15.9 | 15.9 | 15.9 | 15.4 | 15.3 | 15.0 | 15.0 |
|  | Binder component (D) (polyurethane) | d-1 | wt % |  |  |  |  |  |  |  |
|  |  | d-2 | wt % |  |  |  |  |  |  |  |
|  |  | d-3 | wt % |  |  |  |  |  |  |  |
|  |  | d-4 | wt % |  |  |  |  |  |  |  |
|  |  | d-5 | wt % |  |  |  |  |  |  |  |
|  |  | d-6 | wt % |  |  |  |  |  |  |  |
|  |  | d-7 | wt % |  |  |  |  |  |  |  |
|  |  | d-8 | wt % |  |  |  | 15.4 | 15.3 | 35.0 | 15.0 |
|  |  | d-9 | wt % |  |  |  |  |  |  |  |
|  |  | d-10 | wt % | 15.9 |  |  |  |  |  |  |
|  | Comparison binder component | d-11 | wt % |  | 15.9 |  |  |  |  |  |
|  |  | d-12 | wt % |  |  | 15.9 |  |  |  |  |
|  | Water-soluble organic solvent (C) | c-1 | wt % |  |  |  | 2.7 |  |  |  |
|  |  | c-2 | wt % |  |  |  |  | 3.2 |  |  |
|  |  | c-3 | wt % |  |  |  |  |  | 5.1 | 5.2 |
| Redispersibility |  |  | [—] | A | C | C | A | A | A | A |

[Table 37]

TABLE 37

Example III

|  |  |  |  | Comp. Example 4-1 Comp. Example 3-1 | Comp. Example 4-2 Comp. Example 3-1 | Comp. Example 4-3 Comp. Example 3-2 | Example 4-1 Example 3-1 | Example 4-2 Example 3-2 | Comp. Example 4-4 |
|---|---|---|---|---|---|---|---|---|---|
| Resin composition | Thermoplastic resin (F) | f-1 | wt % | 100 | 90 | 87.5 | 85 | 85 | 95 |
|  | Cellulose (A) | a-1 | wt % |  | 10 | 10 | 10 | 10 |  |
|  | Surface treatment agent (B) | b-1 | wt % |  |  | 2.5 | 2.5 |  |  |
|  |  | b-2 | wt % |  |  |  |  | 2.5 | 2.5 |
|  | Binder component (D) (polyurethane) | d-1 | wt % |  |  |  | 2.5 | 2.5 | 2.5 |
| Mechanical properties | Tensile strength |  | MPa | 76 | 82 | 92 | 100 | 102 | 75 |
|  | Tensile breaking elongation |  | % | 40 | 3 | 9 | 8 | 8 | 130 |
|  | Tensile yield |  | Present/absent | Present | Absent | Present | Present | Present | Present |
|  | Flexural modulus |  | MPa | 2800 | 3725 | 4200 | 4700 | 4700 | 2700 |
|  | Linear expansion coefficient |  | ppm/K | 82 | 61 | 45 | 41 | 39 | 85 |
| Other properties | Abrasion resistance |  | [μm] | 155 | 92 | 35 | 32 | 23 | 80 |
|  | Coatability |  | A-E | E | D | A | A | A | C |

[Table 38]

TABLE 38

Example III

|  |  |  |  | Example 4-1 Example 3-1 | Example 4-2 Example 3-2 | Example 4-3 Example 3-3 | Example 4-4 Example 3-4-1 | Example 4-5 Example 3-5 | Example 4-6 Example 3-6 | Example 4-7 Example 3-7 | Example 4-8 Example 3-8 | Comp. Example 4-5 Comp. Example 3-3 | Comp. Example 4-6 Comp. Example 3-4 |
|---|---|---|---|---|---|---|---|---|---|---|---|---|---|
| Resin composition | Thermoplastic resin (F) | f-1 | wt % | 85 | 85 | 85 | 85 | 85 | 85 | 85 | 85 | 85 | 85 |
|  | Cellulose (A) | a-1 | wt % | 10 | 10 | 10 | 10 | 10 | 10 | 10 | 10 | 10 | 10 |
|  | Surface treatment agent (B) | b-1 | wt % | 2.5 |  |  |  |  |  |  |  |  |  |
|  |  | b-2 | wt % |  | 2.5 |  |  |  |  |  |  |  |  |
|  |  | b-3 | wt % |  |  | 2.5 |  |  |  |  |  |  |  |
|  |  | b-4 | wt % |  |  |  | 2.5 |  |  |  |  |  |  |
|  |  | b-9 | wt % |  |  |  |  | 2.5 |  |  |  |  |  |

TABLE 38-continued

Example III

| | | | | Example 4-1 / Example 3-1 | Example 4-2 / Example 3-2 | Example 4-3 / Example 3-3 | Example 4-4 / Example 3-4-1 | Example 4-5 / Example 3-5 | Example 4-6 / Example 3-6 | Example 4-7 / Example 3-7 | Example 4-8 / Example 3-8 | Comp. Example 4-5 Comp. Example 3-3 | Comp. Example 4-6 Comp. Example 3-4 |
|---|---|---|---|---|---|---|---|---|---|---|---|---|---|
| | | b-14 | wt % | | | | | | | 2.5 | | | |
| | | b-33 | wt % | | | | | | | | 2.5 | | |
| | | b-17 | wt % | | | | | | | | | 2.5 | |
| | | b-20 | wt % | | | | | | | | | | 2.5 | |
| | | b-21 | wt % | | | | | | | | | | 2.5 |
| | Binder component (D) (polyurethane) | d-1 | wt % | 2.5 | 2.5 | 2.5 | 2.5 | 2.5 | 2.5 | 2.5 | 2.5 | 2.5 | 2.5 |
| Mechanical properties | Tensile strength | | MPa | 100 | 102 | 105 | 110 | 115 | 115 | 115 | 95 | 85 | 85 |
| | Tensile breaking elongation | | % | 8 | 8 | 8 | 8 | 9 | 10 | 9 | 7 | 5 | 5 |
| | Tensile yield | | Present/absent | Present | Present | Present | Present | Present | Present | Present | Present | Absent | Present |
| | Flexural modulus | | MPa | 4700 | 4700 | 4750 | 4800 | 4900 | 4850 | 4800 | 4500 | 4200 | 4100 |
| | Linear expansion coefficient | | ppm/K | 41 | 39 | 38 | 37 | 35 | 34 | 35 | 40 | 50 | 52 |
| Other properties | Abrasion resistance | | [μm] | 32 | 23 | 21 | 20 | 18 | 18 | 18 | 19 | 23 | 25 |
| | Coatability | | A-E | A | A | A | A | A | A | A | B | B | B |

[Table 39]

TABLE 39

Example III

| | | | | Example 4-4 / Example 3-4-1 | Example 4-9 / Example 3-9 | Example 4-10 / Example 3-10 | Example 4-11 / Example 3-11 | Example 4-12 / Example 3-12 | Example 4-13 / Example 3-13 |
|---|---|---|---|---|---|---|---|---|---|
| Resin composition | Thermoplastic resin (F) | f-1 | wt % | 85 | 85 | 85 | 85 | 85 | 85 |
| | Cellulose (A) | a-1 | wt % | 10 | 10 | 10 | 10 | 10 | 10 |
| | Surface treatment agent (B) | b-4 | wt % | 2.5 | 2.5 | 2.5 | 2.5 | 2.5 | 2.5 |
| | Binder component (D) (polyurethane) | d-1 | wt % | 2.5 | | | | | |
| | | d-2 | wt % | | 2.5 | | | | |
| | | d-3 | wt % | | | 2.5 | | | |
| | | d-4 | wt % | | | | 2.5 | | |
| | | d-5 | wt % | | | | | 2.5 | |
| | | d-6 | wt % | | | | | | 2.5 |
| | | d-7 | wt % | | | | | | |
| | | d-8 | wt % | | | | | | |
| | | d-9 | wt % | | | | | | |
| | | d-10 | wt % | | | | | | |
| | Comparison binder component | d-11 | wt % | | | | | | |
| | | d-12 | wt % | | | | | | |
| Mechanical properties | Tensile strength | | MPa | 110 | 110 | 110 | 110 | 120 | 120 |
| | Tensile breaking elongation | | % | 8 | 8 | 8 | 8 | 8 | 8 |
| | Tensile yield | | Present/absent | Present | Present | Present | Present | Present | Present |
| | Flexural modulus | | MPa | 4800 | 4850 | 4850 | 4850 | 4950 | 5000 |
| | Linear expansion coefficient | | ppm/K | 37 | 35 | 35 | 33 | 25 | 28 |
| Other properties | Abrasion resistance | | [μm] | 20 | 15 | 10 | 8 | 5 | 8 |
| | Coatability | | A-E | A | A | A | A | A | A |

| | | | | Example 4-14 / Example 3-14 | Example 4-15 / Example 3-15 | Example 4-16 / Example 3-16 | Example 4-17 / Example 3-17 | Comp. Example 4-7 Comp. Example 3-5 | Comp. Example 4-8 Comp. Example 3-6 |
|---|---|---|---|---|---|---|---|---|---|
| Resin composition | Thermoplastic resin (F) | f-1 | wt % | 85 | 85 | 85 | 85 | 85 | 85 |
| | Cellulose (A) | a-1 | wt % | 10 | 10 | 10 | 10 | 10 | 10 |
| | Surface treatment agent (B) | b-4 | wt % | 2.5 | 2.5 | 2.5 | 2.5 | 2.5 | 2.5 |
| | Binder component (D) (polyurethane) | d-1 | wt % | | | | | | |
| | | d-2 | wt % | | | | | | |
| | | d-3 | wt % | | | | | | |
| | | d-4 | wt % | | | | | | |
| | | d-5 | wt % | | | | | | |
| | | d-6 | wt % | | | | | | |
| | | d-7 | wt % | 2.5 | | | | | |
| | | d-8 | wt % | | 2.5 | | | | |

TABLE 39-continued

| | | | | Example III | | | | | |
|---|---|---|---|---|---|---|---|---|---|
| | | d-9 | wt % | | | 2.5 | | | |
| | | d-10 | wt % | | | | 2.5 | | |
| | Comparison binder | d-11 | wt % | | | | | 2.5 | |
| | component | d-12 | wt % | | | | | | 2.5 |
| Mechanical | Tensile strength | | MPa | 125 | 120 | 120 | 120 | 95 | 90 |
| properties | Tensile breaking elongation | | % | 10 | 10 | 10 | 10 | 15 | 15 |
| | Tensile yield | | Present/absent | Present | Present | Present | Present | Present | Present |
| | Flexural modulus | | MPa | 4600 | 4600 | 4600 | 4550 | 4300 | 4200 |
| | Linear expansion coefficient | | ppm/K | 30 | 32 | 32 | 32 | 40 | 42 |
| Other | Abrasion resistance | | [μm] | 8 | 8 | 8 | 8 | 15 | 20 |
| properties | Coatability | | A-E | A | A | A | A | A | A |

[Table 40]

TABLE 40

| | | | | Example III | | | |
|---|---|---|---|---|---|---|---|
| | | | | Example 4-18 Example 3-18 | Example 4-19 Example 3-19 | Example 4-20 Example 3-20-1 | Example 4-21 Example 3-20-2 |
| Resin | Thermoplastic resin (F) | f-1 | wt % | 84 | 84 | 84 | 84 |
| composition | Cellulose (A) | b-1 | wt % | 10 | 10 | 10 | |
| | | b-2 | wt % | | | | 10 |
| | Surface treatment agent (B) | b-4 | wt % | 2.5 | 2.5 | 2.5 | 2.5 |
| | Binder component (D) (polyurethane) | d-8 | wt % | 2.5 | 2.5 | 2.5 | 2.5 |
| Molded article | Organic solvent residue in composition | | ppm | 650 | 700 | 800 | 800 |
| Mechanical | Tensile strength | | MPa | 120 | 120 | 120 | 125 |
| properties | Tensile breaking elongation | | % | 10 | 10 | 10 | 10 |
| | Tensile yield | | Present/absent | Present | Present | Present | Present |
| | Flexural modulus | | MPa | 4700 | 4700 | 4750 | 4800 |
| | Linear expansion coefficient | | ppm/K | 30 | 28 | 27 | 25 |
| Other | Abrasion resistance | | [μm] | 7 | 7 | 7 | 5 |
| properties | Coatability | | A-E | A | A | A | A |

[Table 41]

TABLE 41

| | | | | Example III | | | | | |
|---|---|---|---|---|---|---|---|---|---|
| | | | | Example 4-13 Example 3-13 | Comp. Example 4-1 | Comp. Example 4-2 Comp. Example 3-1 | Example 4-22 | Example 4-23 | Example 4-24 |
| Resin | Thermoplastic resin (F) | f-1 | wt % | 85 | 100 | 90 | 87.45 | 87 | 86.5 |
| composition | Cellulose (A) | a-1 | wt % | 10 | | 10 | 10 | 10 | 10 |
| | Surface treatment agent (B) | b-4 | wt % | 2.5 | | | 0.05 | 0.5 | 1 |
| | Binder component (D) (polyurethane) | d-6 | wt % | 2.5 | | | 2.5 | 2.5 | 2.5 |
| Mechanical | Tensile strength | | MPA | 120 | 76 | 82 | 85 | 91 | 92 |
| properties | Tensile breaking elongation | | % | 8 | 40 | 3 | 10 | 9 | 9 |
| | Tensile yield | | Present/absent | Present | Present | Absent | Present | Present | Present |
| | Flexural modulus | | MPa | 5000 | 2800 | 3725 | 3900 | 4150 | 4200 |
| | Linear expansion coefficient | | ppm/K | 28 | 82 | 61 | 58 | 45 | 41 |
| Other | Abrasion resistance | | [μm] | 8 | 155 | 92 | 90 | 75 | 52 |
| properties | Coatability | | A-E | A | E | D | D | C | B |
| | | | | Example 4-25 | Example 4-26 | Example 4-27 | Example 4-28 | Example 4-29 | Example 4-30 |
| Resin | Thermoplastic resin (F) | f-1 | wt % | 84.5 | 82.5 | 79.5 | 77.5 | 75.5 | 72.5 |
| composition | Cellulose (A) | a-1 | wt % | 10 | 10 | 10 | 10 | 10 | 10 |

TABLE 41-continued

Example III

| | | | | | | | | |
|---|---|---|---|---|---|---|---|---|
| | Surface treatment agent (B) | b-4 | wt % | 3 | 5 | 8 | 10 | 12 | 15 |
| | Binder component (D) (polyurethane) | d-6 | wt % | 2.5 | 2.5 | 2.5 | 2.5 | 2.5 | 2.5 |
| Mechanical properties | Tensile strength | | MPA | 120 | 115 | 100 | 95 | 94 | 90 |
| | Tensile breaking elongation | | % | 8 | 9 | 12 | 15 | 20 | 25 |
| | Tensile yield | | Present/absent | Present | Present | Present | Present | Present | Present |
| | Flexural modulus | | MPa | 5050 | 4900 | 4700 | 4300 | 4200 | 4100 |
| | Linear expansion coefficient | | ppm/K | 27 | 35 | 40 | 42 | 45 | 47 |
| Other properties | Abrasion resistance | | [μm] | 8 | 15 | 21 | 25 | 28 | 32 |
| | Coatability | | A-E | A | A | A | A | A | A |

[Table 42]

TABLE 42

Example III

| | | | | | Example 4-13 Example 3-13 | Comp. Example 4-1 | Comp. Example 4-2 Comp. Example 3-1 | Example 4-31 Example 3-13 | Example 4-32 Example 3-13 |
|---|---|---|---|---|---|---|---|---|---|
| Resin composition | Thermoplastic resin (F) | f-1 | | wt % | 85 | 100 | 90 | 99.25 | 92.5 |
| | Cellulose (A) | a-1 | | wt % | 10 | | 10 | 0.5 | 5 |
| | Surface treatment agent (B) | b-4 | | wt % | 2.5 | | | 0.125 | 1.25 |
| | Binder component (D) (polyurethane) | b-6 | | wt % | 2.5 | | | 0.125 | 1.25 |
| Mechanical properties | Tensile strength | | | MPa | 120 | 76 | 82 | 80 | 84 |
| | Tensile breaking elongation | | | % | 8 | 40 | 3 | 40 | 10 |
| | Tensile yield | | | Present/absent | Present | Present | Absent | Present | Present |
| | Flexural modulus | | | MPa | 5000 | 2800 | 3725 | 2900 | 3100 |
| | Linear expansion coefficient | | | ppm/K | 28 | 82 | 61 | 75 | 45 |
| Other properties | Abrasion resistance | | | [μm] | 8 | 155 | 92 | 90 | 45 |
| | Coatability | | | A-E | A | E | D | D | A |

| | | | | | Example 4-33 Example 3-13 | Example 4-34 Example 3-13 | Example 4-35 Example 3-13 | Example 4-36 Example 3-13 |
|---|---|---|---|---|---|---|---|---|
| Resin composition | Thermoplastic resin (F) | f-1 | | wt % | 88 | 80.5 | 70 | 40 |
| | Cellulose (A) | a-1 | | wt % | 8 | 13 | 20 | 40 |
| | Surface treatment agent (B) | b-4 | | wt % | 2 | 3.25 | 5 | 10 |
| | Binder component (D) (polyurethane) | b-6 | | wt % | 2 | 3.25 | 5 | 10 |
| Mechanical properties | Tensile strength | | | MPa | 95 | 130 | 130 | 130 |
| | Tensile breaking elongation | | | % | 10 | 8 | 8 | 8 |
| | Tensile yield | | | Present/absent | Present | Absent | Absent | Absent |
| | Flexural modulus | | | MPa | 3100 | 5800 | 9700 | 20050 |
| | Linear expansion coefficient | | | ppm/K | 13 | 24 | 16 | 7 |
| Other properties | Abrasion resistance | | | [μm] | 40 | 3 | 3 | 1 |
| | Coatability | | | A-E | A | A | A | C |

[Table 43]

TABLE 43

Example III

| | | | | | Example 4-13 Example 3-13 | Comp. Example 4-1 | Comp. Example 4-2 Comp. Example 3-1 | Example 4-37 | Example 4-38 | Example 4-39 | Example 4-40 |
|---|---|---|---|---|---|---|---|---|---|---|---|
| Resin composition | Thermoplastic resin (F) | f-1 | | wt % | 85 | 100 | 90 | 87.45 | 86.5 | 85.5 | 84.5 |
| | Cellulose (A) | a-1 | | wt % | 10 | | 10 | 10 | 10 | 10 | 10 |
| | Surface treatment agent (B) | b-4 | | wt % | 2.5 | | | 2.5 | 2.5 | 2.5 | 2.5 |

TABLE 43-continued

| | | | | Example III | | | | | | |
|---|---|---|---|---|---|---|---|---|---|---|
| | Binder component (D) | d-6 | wt % | 2.5 | | | 0.05 | 1 | 2 | 3 |
| | (polyurethane) | d-8 | wt % | | | | | | | |
| Mechanical properties | Tensile strength | | MPa | 120 | 76 | 82 | 105 | 120 | 120 | 120 |
| | Tensile breaking elongation | | % | 8 | 40 | 3 | 8 | 8 | 8 | 8 |
| | Tensile yield | | Present/absent | Present | Present | Absent | Present | Present | Present | Present |
| | Flexural modulus | | MPa | 5000 | 2800 | 3725 | 4400 | 5100 | 5050 | 4950 |
| | Linear expansion coefficient | | ppm/K | 28 | 82 | 61 | 40 | 26 | 24 | 23 |
| Other properties | Abrasion resistance | | [μm] | 8 | 155 | 92 | 30 | 7 | 7 | 8 |
| | Coatability | | A-E | A | E | D | A | A | A | A |

| | | | | Example 4-41 | Example 4-15 Example 3-15 | Example 4-42 | Example 4-43 | Example 4-44 | Example 4-45 | Example 4-46 |
|---|---|---|---|---|---|---|---|---|---|---|
| Resin composition | Thermoplastic resin (F) | f-1 | wt % | 82.5 | 85 | 87.45 | 86.5 | 85.5 | 84.5 | 82.5 |
| | Cellulose (A) | a-1 | wt % | 10 | 10 | 10 | 10 | 10 | 10 | 10 |
| | Surface treatment agent (B) | b-4 | wt % | 2.5 | 2.5 | 2.5 | 2.5 | 2.5 | 2.5 | 2.5 |
| | Binder component (D) | d-6 | wt % | 5 | | | | | | |
| | (polyurethane) | d-8 | wt % | | 2.5 | 0.05 | 1 | 2 | 3 | 5 |
| Mechanical properties | Tensile strength | | MPa | 110 | 120 | 105 | 120 | 120 | 115 | 110 |
| | Tensile breaking elongation | | % | 6 | 10 | 8 | 9 | 9 | 12 | 12 |
| | Tensile yield | | Present/absent | Present | Present | Present | Present | Present | Present | Present |
| | Flexural modulus | | MPa | 4900 | 4600 | 4400 | 4800 | 4700 | 4550 | 4400 |
| | Linear expansion coefficient | | ppm/K | 21 | 32 | 42 | 33 | 33 | 35 | 37 |
| Other properties | Abrasion resistance | | [μm] | 9 | 8 | 20 | 7 | 8 | 12 | 15 |
| | Coatability | | A-E | B | A | A | A | A | A | B |

[Table 44]

TABLE 44

| | | | | Example III | | | |
|---|---|---|---|---|---|---|---|
| | | | | Example 4-13 Example 3-13 | Example 4-13-1 Example 2-13 | Example 4-15 Example 3-15 | Example 4-15-1 Example 2-15 |
| Resin composition | Thermoplastic resin (F) | f-1 | wt % | 85 | 85 | 85 | 85 |
| | Cellulose (A) | a-1 | wt % | 10 | 10 | 10 | 10 |
| | Surface treatment agent (B) | b-4 | wt % | 2.5 | 2.5 | 2.5 | 2.5 |
| | Binder component (D) (polyurethane) | d-6 | wt % | 2.5 | 2.5 | | |
| | | d-8 | wt % | | | 2.5 | 2.5 |
| Mechanical properties | Tensile strength | | MPa | 120 | 120 | 120 | 120 |
| | Tensile breaking elongation | | % | 8 | 8 | 10 | 10 |
| | Tensile yield | | Present/absent | Present | Present | Present | Present |
| | Flexural modulus | | MPa | 5000 | 5000 | 4600 | 4600 |
| | Linear expansion coefficient | | ppm/K | 28 | 26 | 32 | 30 |
| Other properties | Abrasion resistance | | [μm] | 8 | 8 | 8 | 8 |
| | Coatability | | A-E | A | A | A | A |

[Table 45]

TABLE 45

| | | | | Example III | | | | | | | | |
|---|---|---|---|---|---|---|---|---|---|---|---|---|
| | | | | Comp. Example 4-1 | Example 4-47 | Example 4-48 | Comp. Example 4-9 | Example 4-49 | Example 4-50 | Comp. Example 4-10 | Example 4-51 | Example 4-52 |
| Resin composition | Thermoplastic resin (F) | f-1 | wt % | 100 | 86.5 | 86.5 | | | | | | |
| | | f-2 | wt % | | | | 100 | 86.5 | 86.5 | | | |
| | | f-3 | wt % | | | | | | | 100 | 86.5 | 86.5 |
| | Cellulose (A) | a-2 | wt % | | 10 | 10 | | 10 | 10 | | 10 | 10 |
| | Surface treatment agent (B) | b-4 | wt % | | | 2.5 | | | 2.5 | | | 2.5 |

TABLE 45-continued

Example III

|  |  |  | Comp. Example 4-1 | Example 4-47 | Example 4-48 | Comp. Example 4-9 | Example 4-49 | Example 4-50 | Comp. Example 4-10 | Example 4-51 | Example 4-52 |
|---|---|---|---|---|---|---|---|---|---|---|---|
|  | Binder component (D) (polyurethane) | d-6 wt % |  | 1 | 1 |  | 1 |  |  | 1 |  |
|  |  | d-7 wt % |  |  | 1 |  |  | 1 |  |  | 1 |
| Mechanical properties | Tensile strength | MPa | 76 | 130 | 125 | 36 | 55 | 53 | 63 | 110 | 108 |
|  | Tensile breaking elongation | % | 40 | 10 | 13 | 200 | 25 | 23 | 30 | 13 | 12 |
|  | Tensile yield | Present/absent | Present | Present | Present | Present | Present | Present | Present | Present | Present |
|  | Flexural modulus | MPa | 2800 | 5100 | 5000 | 2200 | 2700 | 2650 | 2500 | 4100 | 4050 |
|  | Linear expansion coefficient | ppm/K | 80 | 25 | 28 | 88 | 40 | 42 | 100 | 45 | 48 |
| Other properties | Abrasion resistance | [μm] | 150 | 2 | 3 | 80 | 4 | 5 | 10 | 1 | 1 |
|  | Coatability | A-E | E | A | A | E | D | D | E | D | D |

[Table 46]

TABLE 46

Example III

|  |  |  |  | Example 4-47 | Example 4-53 | Example 4-54 | Example 4-55 | Example 4-56 | Example 4-57 |
|---|---|---|---|---|---|---|---|---|---|
| Resin composition | Thermoplastic resin (F) | f-1 | wt % | 86.5 | 86.5 | 86.5 | 86.5 | 86.5 | 86.5 |
|  | Cellulose (A) | a-2 | wt % | 10 | 10 | 10 | 10 | 10 | 10 |
|  | Surface treatment agent (B) | b-4 | wt % | 2.5 |  |  | 2.5 |  |  |
|  |  | b-22 | wt % |  | 2.5 |  |  | 2.5 |  |
|  |  | b-23 | wt % |  |  | 2.5 |  |  | 2.5 |
|  | Binder component (D) (polyurethane) | d-6 | wt % | 1 | 1 | 1 |  |  |  |
|  |  | d-7 | wt % |  |  |  | 1 | 1 | 1 |
| Mechanical properties | Tensile strength | | MPa | 130 | 130 | 130 | 125 | 125 | 125 |
|  | Tensile breaking elongation | | % | 10 | 10 | 10 | 12 | 12 | 12 |
|  | Tensile yield | | Present/absent | Present | Present | Present | Present | Present | Present |
|  | Flexural modulus | | MPa | 5100 | 5150 | 5150 | 5000 | 5000 | 5000 |
|  | Linear expansion coefficient | | ppm/K | 25 | 23 | 21 | 28 | 25 | 22 |
| Other properties | Abrasion resistance | | [μm] | 2 | 2 | 2 | 3 | 3 | 3 |
|  | Coatability | | A-E | A | A | A | A | A | A |

[Table 47]

TABLE 47

Example III

|  |  |  |  | Example 4-47 | Example 4-53 | Example 4-54 | Example 4-58 | Example 4-59 | Example 4-60 |
|---|---|---|---|---|---|---|---|---|---|
| Resin composition | Thermoplastic resin (F) | f-1 | wt % | 86.5 | 86.5 | 86.5 | 86.5 | 86.5 | 86.5 |
|  | Cellulose (A) | a-2 | wt % | 10 | 10 | 10 | 10 | 10 | 10 |
|  | Surface treatment agent (B) | b-4 | wt % | 2.5 |  |  | 2.5 |  |  |
|  |  | b-22 | wt % |  | 2.5 |  |  | 2.5 |  |
|  |  | b-23 | wt % |  |  | 2.5 |  |  | 2.5 |
|  | Binder component (D) (polyurethane) | d-6 | wt % | 1 | 1 | 1 | 1 | 1 | 1 |
|  |  | 4-7 | wt % |  |  |  |  |  |  |
| Mechanical properties | Tensile strength | | MPa | 130 | 130 | 130 | 131 | 132 | 132 |
|  | Tensile breaking elongation | | % | 10 | 10 | 10 | 10 | 10 | 10 |
|  | Tensile yield | | Present/absent | Present | Present | Present | Present | Present | Present |
|  | Flexural modulus | | MPa | 5100 | 5150 | 5150 | 5100 | 5150 | 5150 |
|  | Linear expansion coefficient | | ppm/K | 25 | 23 | 21 | 23 | 22 | 20 |
| Other properties | Abrasion resistance | | [μm] | 2 | 2 | 2 | 2 | 2 | 2 |
|  | Coatability | | A-E | A | A | A | A | A | A |

|  |  |  |  | Example 4-55 | Example 4-56 | Example 4-57 | Example 4-61 | Example 4-62 | Example 4-63 |
|---|---|---|---|---|---|---|---|---|---|
| Resin composition | Thermoplastic resin (F) | f-1 | wt % | 86.5 | 86.5 | 86.5 | 86.5 | 86.5 | 86.5 |
|  | Cellulose (A) | a-2 | wt % | 10 | 10 | 10 | 10 | 10 | 10 |

TABLE 47-continued

| | | | | Example III | | | | | |
|---|---|---|---|---|---|---|---|---|---|
| | Surface treatment agent (B) | b-4 | wt % | 2.5 | | | 2.5 | | |
| | | b-22 | wt % | | 2.5 | | | 2.5 | |
| | | b-23 | wt % | | | 2.5 | | | 2.5 |
| | Binder component (D) | d-6 | wt % | | | | | | |
| | (polyurethane) | 4-7 | wt % | 1 | 1 | 1 | 1 | 1 | 1 |
| Mechanical properties | Tensile strength | | MPa | 125 | 125 | 125 | 125 | 125 | 125 |
| | Tensile breaking elongation | | % | 12 | 12 | 12 | 12 | 12 | 12 |
| | Tensile yield | | Present/absent | Present | Present | Present | Present | Present | Present |
| | Flexural modulus | | MPa | 5000 | 5000 | 5000 | 5000 | 5000 | 5000 |
| | Linear expansion coefficient | | ppm/K | 28 | 25 | 22 | 28 | 25 | 22 |
| Other properties | Abrasion resistance | | [μm] | 3 | 3 | 3 | 3 | 3 | 3 |
| | Coatability | | A-E | A | A | A | A | A | A |

It is seen from the tables that when suitable types of components are added in suitable amounts as shown above, the cellulose nanofiber dispersions can be dispersed without aggregation of the cellulose nanofibers. It is also seen that the cellulose nanofiber aqueous dispersions and the dried cellulose nanofibers can be easily redispersed in water and have excellent dispersibility in resins. In addition, it is seen that the resin compositions and molded resins impart excellent mechanical properties and thermal properties, and have excellent coatability and abrasion resistance for practical use.

INDUSTRIAL APPLICABILITY

The cellulose nanofiber aqueous dispersion and dried cellulose nanofibers according to one aspect of the invention can be easily redispersed in water and organic solvents, and have excellent dispersibility in resins. The resin composition and molded resin according to another aspect of the invention have excellent mechanical properties and thermal properties, and also excellent moldability and abrasion resistance for practical use. The resin composition and molded resin according to yet another aspect of the invention are excellent in terms of slidability and in terms of reducing changes in outer appearance before and after molding, reducing odor, and/or coatability for practical use. The resin composition and molded resin according to still another aspect of the invention can be suitably applied for a variety of purposes that require the properties mentioned above.

The invention claimed is:

1. A cellulose nanofiber aqueous dispersion comprising cellulose nanofibers (A), a surface treatment agent (B) and water,
   wherein the surface treatment agent (B) has an HLB value of 0.1 or greater and 7.9 or less, and
   wherein the surface treatment agent (B) has a hydrophilic segment and a hydrophobic segment.

2. The cellulose nanofiber aqueous dispersion according to claim 1, wherein the surface treatment agent (B) is a nonionic surfactant.

3. The cellulose nanofiber aqueous dispersion according to claim 1, which further comprises an antioxidant (E).

4. Dried cellulose nanofibers, which are the dried product of a cellulose nanofiber aqueous dispersion according to claim 1.

5. A cellulose nanofiber resin composition comprising cellulose nanofibers (A), a surface treatment agent (B) and a thermoplastic resin (F),
   wherein the surface treatment agent (B) has an HLB value of 0.1 or greater and 7.9 or less,
   wherein the surface treatment agent (B) has a hydrophilic segment and a hydrophobic segment,
   wherein the thermoplastic resin (F) is not a polyurethane resin, and
   wherein the hydrophilic segment includes a polyoxyethylene block.

6. The cellulose nanofiber resin composition according to claim 5, wherein a number-average molecular weight of the surface treatment agent (B) is 200 to 30,000.

7. The cellulose nanofiber resin composition according to claim 5, wherein a cloud point of the surface treatment agent (B) is 10° C. or higher.

8. The cellulose nanofiber resin composition according to claim 5, wherein the hydrophobic segment includes a polyoxypropylene block.

9. The cellulose nanofiber resin composition according to claim 5, wherein the molecular structure of the surface treatment agent (B) is one selected from among ABA-type triblock structures, 3-branch structures and 4-branch structures.

10. The cellulose nanofiber resin composition according to claim 5, wherein the molecular structure of the surface treatment agent (B) is a hydrophilic segment-hydrophobic segment-hydrophilic segment triblock structure.

11. The cellulose nanofiber resin composition according to claim 5, wherein a ratio of the hydrophobic segment mass fraction to the hydrophilic segment mass fraction (hydrophobic segment mass fraction/hydrophilic segment mass fraction) of the surface treatment agent (B) is 1.5 to 20.

12. The cellulose nanofiber resin composition according to claim 5, wherein the surface treatment agent (B) is a nonionic surfactant.

13. The cellulose nanofiber resin composition according to claim 5, wherein the surface treatment agent (B) is an ether-type nonionic surfactant.

14. The cellulose nanofiber resin composition according to claim 5, which further comprises an antioxidant (E).

15. The cellulose nanofiber resin composition according to claim 5, wherein the thermoplastic resin (F) is selected from the group consisting of polyolefin-based resins, polyamide-based resins, polyester-based resins, polyacetal-based resins, polyacrylic-based resins, polyphenylene ether-based resins and polyphenylene sulfide-based resins, and mixtures of any two or more of the same.

16. The cellulose nanofiber resin composition according to claim 5, wherein a tensile yield strength increase calculated by the following formula (1):

$$\text{Tensile yield strength increase} = (b/c - 1)/a \qquad (1),$$

from the mass content of the cellulose nanofibers (A) in the resin composition (a), the tensile yield strength of the resin composition (b) and the tensile yield strength of the thermoplastic resin (F) (c), is larger than 1.0.

17. The cellulose nanofiber resin composition according to claim 5, wherein a flexural modulus increase calculated by the following formula (2):

Flexural modulus increase=$(d/e-1)/a$, from the mass content of the cellulose nanofibers (A) in the resin composition (a), the flexural modulus of the resin composition (d) and the flexural modulus of the thermoplastic resin (F) (e), is larger than 3.0.

18. A molded resin formed from a cellulose nanofiber resin composition according to claim 5.

19. A method for producing a cellulose nanofiber resin composition according to claim 5, wherein the method includes:
   kneading at least the cellulose nanofibers (A), the surface treatment agent (B), and the thermoplastic resin (F).

20. A cellulose nanofiber resin composition comprising cellulose nanofibers (A), a surface treatment agent (B) and a thermoplastic resin (F),
   wherein the surface treatment agent (B) has an HLB value of 0.1 or greater and 7.9 or less,
   wherein the surface treatment agent (B) has a hydrophilic segment and a hydrophobic segment,
   wherein the thermoplastic resin (F) is not a polyurethane resin, and
   wherein the hydrophobic segment includes a polyoxypropylene block.

21. The cellulose nanofiber resin composition according to claim 20, wherein the molecular structure of the surface treatment agent (B) is one selected from among ABA-type triblock structures, 3-branch structures and 4-branch structures.

22. The cellulose nanofiber resin composition according to claim 20, wherein a ratio of the hydrophobic segment mass fraction to the hydrophilic segment mass fraction (hydrophobic segment mass fraction/hydrophilic segment mass fraction) of the surface treatment agent (B) is 1.5 to 20.

23. The cellulose nanofiber resin composition according to claim 20, wherein the surface treatment agent (B) is an ether-type nonionic surfactant.

\* \* \* \* \*